(12) United States Patent
Sekiguchi et al.

(10) Patent No.: US 6,285,917 B1
(45) Date of Patent: *Sep. 4, 2001

(54) ELECTRIC POWER SYSTEM PROTECTION AND CONTROL SYSTEM AND DISTRIBUTED CONTROL SYSTEM

(75) Inventors: Katsuhiko Sekiguchi; Michio Masui, both of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/984,215

(22) Filed: Dec. 3, 1997

(30) Foreign Application Priority Data

| Dec. 3, 1996 | (JP) | 8-337647 |
| Dec. 3, 1996 | (JP) | 8-337648 |
| Dec. 3, 1996 | (JP) | 8-337649 |
| Dec. 3, 1996 | (JP) | 8-360072 |

(51) Int. Cl.[7] .................................................. G06F 17/00

(52) U.S. Cl. ..................... 700/239; 700/143; 700/286; 700/293; 700/295; 403/24; 403/344; 340/825.06; 340/825.17; 340/310.06; 340/870.03

(58) Field of Search ................................ 700/143, 22, 286, 700/17, 239, 95, 83, 9, 293, 10, 295, 86, 292, 6, 84; 703/3, 18; 403/24, 344; 340/825.06, 825.17, 310.06, 870.03, 10.5, 500

(56) References Cited

U.S. PATENT DOCUMENTS

| 3,939,328 | * | 2/1976 | Davis | 342/198 |
| 4,368,520 | * | 1/1983 | Hwang et al. | 700/289 |
| 5,162,986 |   | 11/1992 | Graber et al. | 700/17 |

(List continued on next page.)

FOREIGN PATENT DOCUMENTS

| 5-075628 | 3/1993 | (JP) . |
| WO 93/12566 | 6/1993 | (WO) . |

OTHER PUBLICATIONS

P.D. Amer, et al., Computer Communications Review, Association for Computing Machinery, pp. 360–367, "Measurement Management Service," 1988.

Patent Abstracts of Japan, vol. 018, No. 338 (M–1628), Jun. 27, 1994, JP 06 080334, Mar. 22, 1944.

(List continued on next page.)

*Primary Examiner*—William A. Cuchlinski, Jr.
*Assistant Examiner*—McDieunal Marc
(74) *Attorney, Agent, or Firm*—Oblon, Spivak, McClelland, Maier & Neustadt, P.C.

(57) ABSTRACT

An electric power system protection and control system, including, a plurality of protection controllers, each for executing protection and control of an electric power system by inputting a status quantity of the electric power system and for converting the status quantity into digital data, and a display controller connected to each of the protection controllers via a communication network, for displaying and controlling an operation and status of each of the protection controllers for monitoring. The display controller is provided with a program module sending unit for sending out a program module corresponding to contents for display control in the display controller to one of the protection controllers via the communication network, respectively. Each of the protection controllers is provided with, a program module receiving unit for receiving the program module from the display controller or another one of the protection controllers via the communication network, an execution unit for executing the received program module, and a transfer unit for transferring an execution result by the execution unit or the program module stored in the protection controller to the display controller or another one of the protection controllers via the communication network.

42 Claims, 47 Drawing Sheets

U.S. PATENT DOCUMENTS

| | | | |
|---|---|---|---|
| 5,291,208 | * | 3/1994 | Young ................................ 342/198 |
| 5,475,609 | | 12/1995 | Apothaker ........................... 700/292 |
| 5,530,643 | * | 6/1996 | Hodorowski ......................... 700/86 |
| 5,544,064 | | 8/1996 | Beckwith ............................ 700/293 |
| 5,696,695 | * | 12/1997 | Ehlers et al. ........................ 700/286 |
| 5,745,760 | * | 4/1998 | Kawamura et al. ................. 709/310 |
| 5,822,532 | | 10/1998 | Ikeda .................................. 709/224 |
| 5,862,171 | * | 1/1999 | Mahany .............................. 375/200 |
| 5,893,126 | * | 3/1999 | Nauckhoff .......................... 707/511 |
| 5,926,089 | * | 7/1999 | Sekiguchi et al. ................... 340/500 |

OTHER PUBLICATIONS

D. Bolam, et al., Fourth International Conference on Power System Control and Management, vol. 421, 1 page, "Experience in the Application of Substation Co–Ordinated Control and Protection with Development Trends in the Standard Control System Open Architecture," Apr. 16–18, 1996 (English Abstract Only).

Sasaki et al., An expert system for power system security control, 1989, IEEE., pp. 259–266.*

Kimura et al., Development of an expert system for estimating fault section in control center based on protective system simulation, 1992, IEEE., pp. 167–172.*

* cited by examiner

| NAME OF CONTROLLER | OPERATING RELAY | ELECTRICAL QUANTITY | | RELATED INFORMATION |
|---|---|---|---|---|
| CONTROLLER 10 | 150G 64 | Va Vb Vc | 20V 0° | — |
| CONTROLLER 40 | 150G 64 | Va Vb Vc | 15V 15° | — |

FIG.8

CONTROLLER INFORMATION

87 S : OWN CONTROLLER, 1 L B, 1 L C
(1 L A)

87 G : OWN CONTROLLER, 1 L B, 1 L C
(1 L A)

OPERATION INFORMATION

DATE: 00,DD,DD
TIME: --,XX, • •

OPERATING STATE PREDICTION KNOWLEDGE BASE

| | | | | | | |
|---|---|---|---|---|---|---|
| 1 LINE EARTH-FAULT | 1L | : 1LA | 87G. | 1LB | 87G. | 1LC | 87G |
| 1 LINE EARTH-FAULT | 2L | : 2LA | 87G. | 2LB | 87G. | 2LC | 87G |
| 2 LINES SHORT-CIRCUIT | 1L | : 1LA | 87S | -------- | | |
| 2 LINES SHORT-CIRCUIT | 2L | : 2LA | 87S | -------- | | |

FIG.14A

OPERATION INFORMATION

DATE: 00,DD,DD    1 L A   8 7 G ] OBTAINED
TIME: --,XX,··                                      AT 1LA

DATE: 00,DD,DD    1 L B   8 7 G ] OBTAINED
TIME: --,XX,··                                      AT 1LB

DATE: 00,DD,DD    1 L C   8 7 G ] OBTAINED
TIME: --,XX,··                                      AT 1LC

FIG.14B

| CONTROLLER NAME | CURRENT $I_0$ | | FLUCTUATION | |
|---|---|---|---|---|
| | RMS VALUE | PHASE | RMS VALUE | PHASE |
| CONTROLLER 1 | 101A | 15° | +1A | 0° |
| CONTROLLER 2 | 100A | 16° | +0A | +1° |
| CONTROLLER 3 | 99A | 14° | −1A | −1° |
| ⋮ | | | | |
| MEAN VALUE | 100 A | 15° | | |

FIG.24

CONTROL TABLE

| | WORKING RESULT | | | |
|---|---|---|---|---|
| | WORKING TIME: LESS THAN ONE YEAR | ABNORMALITY DETECTED | CONTROLLER OPERATED NORMALLY |
| WORKING PERIOD | 10 DAYS PERIOD | 1 DAY PERIOD | 1 MONTH PERIOD |
| PROCESSING CONTENTS | NO. OF AUTOMATIC INSPECTIONS ELECTRICAL QUANTITY RELAY OPERATION MONITORING | NO. OF AUTOMATIC INSPECTIONS ELECTRICAL QUANTITY RELAY OPERATION MONITORING | NO. OF AUTOMATIC INSPECTIONS |
| STAY TIME | 5 MINUTES | 10 MINUTES | 1 MINUTE |
| MOVING ROUTE | TO NEXT PROTECTION CONTROLLER | TO DISPLAY CONTROLLER | TO NEXT PROTECTION CONTROLLER |

FIG.28

| CONTROLLER NAME | SETTING RESULT | NEW SETTING VALUE | RELAY OPERATION |
|---|---|---|---|
| CONTROLLER 10 | NORMALLY COMPLETED | 50GT: 0.1S<br>50G: 0.5A | NONE |
| CONTROLLER 40 | ABNORMAL SETTING ELEMENT 50 GT RELATIVE VALUE LACK | 50G: 0.5A | NONE |

FIG.31

ELECTRIC POWER SYSTEM PROTECTION AND CONTROL SYSTEM AND DISTRIBUTED CONTROL SYSTEM

BACKGROUND OF THE INVENTION

1. Field of the Invention

The present invention relates to an electric power system protection and control system in combination of digital protection controllers, such as digital relays, to protect and control an electric power system by inputting status quantities of the electric power system and converting them into digital data and a display controller to display and control the monitoring of operation and status of the digital protection controllers via a communication network, and a distributed control system.

2. Description of the Related Art

Digital protection controllers, such as digital relays, are already used widely in the field of the electric power system, and are made highly functional by use of highly efficient microprocessors and memories of large capacity, etc. in recent years. In particular, for the labor saving of their operation and maintenance, it becomes possible to realize a remote operation and monitoring system for operating and monitoring the operation and status of digital protection controllers via a wide area transmission network from a long distance.

In these systems, it is possible to display electrical quantities (current and voltage quantities converted into digital data) input from an electric power system at a distant place via a transmission system in addition to the detailed information relative to the operation and status of digital protection controllers. Definite examples of these systems are disclosed in literatures, for instance, (The 1996 National Meeting of The Institute of Electrical Engineers of Japan, Lectured Theses 1529 "Development of Digital Relay Remote Operation Monitoring System").

On a system for the purpose of the remote operation of conventional digital protection controllers, such as digital relays, it takes such a form that along the remote operation menu of digital protection controllers (hereinafter referred to as "Protection Controllers"), a request is submitted from a remote personal computer via a wide area transmission network. When this request is received, the protection controller performs the process according to the request and returns a response to the personal computer that sent the request. An example of the remote operation menu is shown in FIG. 40.

A case in taken to change the setting, for example, the setting of a threshold value of the relay operation in a digital relay, according to a setting menu as an example. As shown in FIG. 41, the steps will be as shown below: First, selecting a display control menu after selecting a substation and equipment and connecting the communication according to a communication menu within a remote operation menu; and then, after further selecting the setting, setting elements to be changed are selected, numerical values to be changed are input and a writing request is submitted to EEPROMs in the protection controller, and thereafter, an operation starting request is submitted.

In this case, until a series of processings is completed, it is necessary to maintain the connection between the personal computer and the protection controllers. Accordingly, there will be a first problem that delay of communication accompanied with increase in the traffic on a communication network and drop of reliability generated from loss of communication packets.

FIG. 41 shows the change of one setting element. But so as to change plural setting elements, a required time further increases. Further, to have a personal computer generate various requests corresponding to the above-described remote operation menu, it is required for the operator to operate the personal computer to each request.

This means that when functions of a protection controller become complicated and versatiled, the number of operations increase and workload of the operator increases. Further, when plural protection controllers are required to execute the same operation, it becomes complicated as the same work is performed for different controllers, and there will be caused such a second problem that with the increase of workload, the drop of reliability due to human error will be generated.

Further, in case of such a remote operation system, plural protection controllers are operated by a single personal computer. In this case, it will become necessary to configure the system by taking differences in the substances of protection controllers (for instance, setting elements due to different protection relaying scheme) into consideration.

The configuration in this case is shown in FIG. 42. As shown in this FIG. 42, the configuration at the personal computer side is corresponding to the kinds of protection controllers. This means that with the increase in kinds of protection controllers, the volume of the corresponding software that is to be provided on a personal computer increases, and there will be such a third problem that the necessity for modification is produced and the economy and reliability of the system will become worse.

Further, in such a remote operation system, as a local network and a wide area transmission network are used, the protection controllers can be easily operated remotely at a place where they can be connected to these communication networks. In other words, the remote operation can be made similarly through personal computers installed at plural locations.

This state is shown in FIG. 43. In this case, it is necessary to provide a remote operation software that is corresponding to each protection controller to each personal computer as described above, and there will be a fourth problem that this system is inferior in the aspect of economy such as required expenses and maintenance.

Further, as it becomes possible to monitor the operation of plural protection controllers by a single personal computer in the remote operation system as described above, it is possible to compare related same items (for instance, electrical quantities of the system taken by plural protection controllers connected to the same system).

In this case, a personal computer is connected to protection controllers subject for communication and displays operating items along the remote operation menu shown in FIG. 40. If it is desired to check the state of the same items on other related controllers, a personal computer is connected similarly to the related controllers for communication and displays the items along the operation menu shown in FIG. 40.

In this case, if the number of protection controllers subject for control is increased, such operations as selection of controllers, connection for communication and selection of items become necessary for each protection controller and the operations becomes very complicated, and related other protection controllers and items are displayed independently for each protection controller. However, as they are not displayed as related protection controllers and items in the same picture, there will be such a fifth problem that the comparison of related items will become an overload for operator.

In this case, it is considered to consolidate the menu for every same related items over plural controllers. But if it is required to see different items for each controller, it will be complicated conversely, and in addition, the maintainability will become a problem when there is an increase/ modification of the controller. Further, there will be such a sixth problem that if the same protection controller is accessed simultaneously by plural display controllers, the processing load of the protection controller increases in order to respond to the access and therefore, a response is delayed.

Further, for such a remote operation system there is the possibility for demand to realize versatile functions. For instance, conventionally the protection, control and measurement of an electric power system are separated as separate controller. It is considered to consolidate these functions in the same controller. In this case, there will be a seventh problem that the processes to be incorporated in a protection controller increase and an excessive load is generated in the aspect of the economical efficiency, reliability and maintainability.

Further, when changing the specification of a protection controller, it is a general practice to stop the controller and change a ROM containing a program, and there will be an eighth problem that the drop of availability of the system and complicated changed workload.

Digital protection controllers are already used widely in the field of the electric power system, and are made highly functional by use of highly efficient microprocessors and memories of large capacity, etc. in recent years.

Definitely, there are a digital relay to judge system faults, a fault locator, a failure extension protection equipment, etc. The digital protection controllers described above are widely used in the operation of electric power systems at present.

Hereinafter, taking a digital relay as an example, a conventional technique will be described. FIG. 44 shows the construction of a basic digital relay. The digital relay is composed of an analog-to-digital conversion unit 10-1, a digital processor 10-2, an input/output interface 10-3 with such external equipment as a breaker, etc. and a bus 10-5. Further these units 10-1 through 10-3 are connected each other via bus 10-5.

Analog-to-digital conversion unit 10-1 is composed of analog filters 1-11 to 1-1n, sampling hold circuits 1-21 to 1-2n, a multiplexer 1-3 and an analog-to-digital converter 1-4. It takes status quantities of an electric power system that is an object of protection and control as n-pieces analog information A-1 to A-n and converts them into digital quantities after having held at a specified sampling interval.

On the other hand, digital processor 10-2 is composed of a CPU 2-1, a RAM 2-2, a ROM 2-3 and a non-volatile memory EEPROM 2-4. The data of electrical quantities converted to digital data described above are transferred to RAM 2-2 successively, and according to this data, setting values of the protective relay stored in EEPROM 2-4 and programs from ROM 2-3, CPU 2-1 performs various protection and control operations such as calculation relaying program.

Next, input/output interface 10-3 is an interface to perform by taking the state of external control equipment such as information on a circuit breaker, to output the operation of the protective relay, reset output, trip command, etc. to external equipment. A definite example of the construction of the digital relay is as described above.

In case of the digital relay, its principal duty is to protect an electric power system. The result of the proper protection by the digital relay is stored in RAM 2-2 as data (the operating state of the relay, electrical quantity, other related information) at the time when a trip command is output to a circuit breaker from input/output interface 10-3, and generally confirmed by operator by reading these data.

On the other hand, for labor saving in the operation and maintenance of digital protection controllers such as digital relays, it becomes possible to realize a remote operation monitoring system to monitor the operation and status of digital protection controllers remotely via a wide area transmission network in recent years. In this system, digital electrical quantities (current, voltage converted to digital data) input through an electric power system can be displayed at a remote location via a transmission system in addition to detailed information on the operation and state of digital protection controllers.

A definite example of this system is disclosed in literatures, for instance, (The 1996 National Meeting of The Institute of Electrical Engineers of Japan, Lectured Theses 1529 "Development of Digital Relay Remote Operation Monitoring System"). Examples of menu items that are usable in the remote operation monitoring system are shown in FIG. 40.

As shown in this FIG. 40, items required for the operation monitoring of the digital relay are all usable at a remote location. When this remote operation monitoring system is applied, it becomes now possible to display and check the result of the operation of such protection controllers as the digital relay on a display controller, such as a personal computer, in a remote attendance substation.

It the present digital relay and remote operation monitoring system to monitor the operation of the digital relay, if a system fault occurs as described above, the contents of operation accumulated in the operated digital relay (operated relay element, electrical quantity and other related information) are read out and checked at a remote location.

So far, if a system fault occurs and one of digital relays installed at various locations is operated, in order to check if the relay operated properly, an operator goes to the location where that digital relay is installed and checks the contents of the operation. In particular, when it is estimated that the relay has not operated properly, it is necessary to check the contents of the operation of corresponding digital relay (including a controller not in operation) more in detail and much labor is needed.

As it becomes no longer required to go to a substation where a digital relay is installed if the remote operation monitoring system described is applied, labor required for the checking work when the controller is operated decreases. However, there are such problems as described below.

First, the present remote operation monitoring system has item menus for every controller as shown in FIG. 40. When operator checks the contents of the operation of a controller as shown above, out of the menu of operations, for instance, on the "Relay Operation" screen, the relay operation when the controller is operating is checked to judge whether the proper relay element operated or an unnecessary relay element operated. On the "Electrical Quantity" screen, in what size and phase the system electrical quantity was when the controller operated, and the validity with the operating and non-operating state of relay element is judged. Further, on the "Related Information" screen, the input state of the controller when it was operating (for instance, a circuit breaker) and the state of the transmission system is checked and correlated with the relay operation.

Thus, the state of an objective controller is checked through many steps. In this case, data requested from a personal computer and response data from a digital relay go back and forth alternately as shown in FIG. 45, and the communication route between the personal computer and the digital relay must be kept maintained for a long hour until a series of processes are completed. As a result, there is such a first problem that reliability may drop due to increase in the traffic on the communication network and delay of communication and lost of communication packets resulting therefrom.

Further, in such the analyzing work when the controller is operated as described above, it is also required to collect the contents of operations of plural digital relays related to the system fault and compare them. By the comparison, normality or abnormality of the controller operation can be known. For instance, if a system fault occurred in one of two parallel transmission lines, it becomes possible to judge whether the controllers were operated normally or not operated by checking and comparing the operational contents of at least 4 controllers protecting both ends and respective lines of two transmission lines.

However, in case of the remote operation monitoring system described above, as the connection of communication with an objective controller and the selection of the screens corresponding to menu items are needed for each controller and their operation becomes very complicated. Furthermore, although the display screen of related other controllers and items are displayed independently for each controller, they are not displayed as related controllers and items in the same screen, there is a second problem that operator is excessively burdened when the operator compares related items.

In this case, it may be considered that the menus for plural controllers may be consolidated by the related same item. However, when it is desired to see different items for each controller, it becomes complicated inversely, and further, the maintainability will become a problem when controllers are increased or modified. The more system faults are taken place in a wide range and are complicated, the more these problems come out remarkably.

Further, the system fault types are generally always different. For instance, controllers that are operated change, whenever a fault occurs, depending on component elements composing an electric power system, such as transmission line, bus, transformer, etc. and fault occurring place. In other words, operator must judge which digital relay should be checked for the contents of operation, whenever a system fault occurs, according to its fault aspect and perform the required work accordingly. Thus, there is a third problem that this will make the work complicated, and further, controllers that must be checked may be missed or conversely, controllers that are not required for the checking are checked.

Further, there is a fourth problem as follows. In order to check the validity of the operation or non-operation of controllers when a system fault occurs, it is necessary for operator to know a general aspect of the fault (for instance, a single line earth fault, two line short-circuit fault, etc.) from voltage and current waveforms at the time of system fault obtained from an electric power system observation unit such as an oscillograph equipment, etc. installed independently from the digital relay. It is further necessary for operator to make the overall analysis and judgment from the general aspect of the fault, the contents of operation of the digital relays and the state of the system. Thus, much labor of operation is needed and operator may make a miss judgment depending on his ability.

As a characteristic of a digital relay, there is an automatic supervising function. The automatic supervising function is a monitoring function incorporated in the relay unit so that the system protection function, that is an obligation of a digital relay will work normally. Detailed contents are described, for instance, in the "Practical Reader for Digital Relay", p. 70 through 73, etc. edited and written by Izumi MITANI, published by Ohm Corporation.

In this respect, the automatic supervising described in this literature is roughly divided into the continuous monitoring and automatic checking. In the continuous monitoring, the monitoring function works at the periodical fixed cycle. The automatic checking is to confirm its operation by starting the output circuit process, etc. that does not regularly work, at predetermined intervals (for example, once a week), as well to detect the failure to operate mode.

By such an automatic supervising function, a failure of digital relays has been quickly detected. As a result, a probability to produce a non-correct operation like a failure to operate at occurrence of an electric power system fault or an unwanted operation at a fault of out of the zone is lowered. From the above-mentioned background, accompanied by the diffusion of digital relays, the importance of an automatic supervising function has been increased.

On the other hand, for labor saving in the operation and maintenance of digital protection controllers such as digital relays, it becomes possible to realize a remote operation monitoring system to monitor the operation and status of digital protection controllers remotely via a wide area transmission network in recent years. In this system, digital electrical quantities (current, voltage converted to digital data) input through an electric power system can be displayed at a remote location via a transmission system in addition to detailed information on the operation and state of digital protection controllers.

A definite example of this system is disclosed in literatures, for instance, (The 1996 National Meeting of The Institute of Electrical Engineers of Japan, Lectured Theses 1529 "Development of Digital Relay Remote Operation Monitoring System"). Examples of menu items that are usable in the remote operation monitoring system are shown in FIG. 40.

As shown in this FIG. 40, items required for the operation monitoring of the digital relay are all usable at a remote location. When this remote operation monitoring system is applied, it becomes now possible to display and check the result of the automatic supervising carried out in the digital relay on a display controller, such as a personal computer, in a remote office.

In the present digital relay and remote operation monitoring system to monitor the operation of the digital relay, the automatic supervising is carried out in individual digital relays as described above, resulting in the state that its result can be remotely confirmed.

On the one hand, in the operation and maintenance of digital type protection controllers including digital relays, the work called as a patrol has been carried out from conventionally. This is a work to individually confirm the status of digital relays installed in substations, etc. For instance, they are confirmed from the viewpoints of whether there is any relay element in the operating state, whether the automatic checking is conducted at precise cycle, whether there is other defective display, and whether there is any difference in the states of a adjourning plurality of controllers, etc. Besides, in case a failure occurrence or an omen of failure occurrence is recognized, the action to restore (for example, replacing the hardware, remodeling the software or changing the relay set value) is taken.

This has been carried out to confirm the result of the above automatic supervising function. To supplement this, it has been carried out to discover the mode of the failure which can not be found by the automatic supervising (for example, failure of automatic supervising function itself or partial failure that cannot be detected in the automatic supervising function).

Since such a work for a patrol like this is carried out by the work that operators go to a remote unmanned substation, and by confirming the display state and operating state of each digital relay judge and record, a large workload comes to be required. In the above remote operation monitoring system, due to the fact that operators do not go remotely, but the display of digital relays can be confirmed, it is possible to substitute a part of the work for a patrol by such system. However, there are problems as described below.

First of all, there is each item menu per each controller as shown in FIG. 40 in the present remote operation monitoring system. In case that the work corresponding to the work for a patrol as described above is carried out, for instance: the automatic checking executing number is confirmed in the "Automatic checking" picture, it is judged whether it is the correct number; it is judged whether the system electrical quantity is fetched as a correct value in the "Input electrical quantity" screen: it is confirmed whether each relay element operates unnecessary in the "Relay Operation" screen; and it is confirmed whether a failure is not detected by the automatic supervising in the "Abnormal contents" screen.

The state of the controller in object is confirmed by many procedures like this. In this case, it is necessary that the communication route between the personal computer and the digital relay is kept for a long time until a series of processing will end as shown in FIG. 46. There is a first problem that the increase in the traffic on the communication network and the lowering in reliability by the delay in communication and the loss of communication packets resulting therefrom.

Furthermore, a plurality of controllers are compared in the work for a patrol as described above, there is an advantage that an abnormality of a controller is aware relatively early. For instance, in case of two digital relays for protection of transmission line to receive electrical quantities from the same transmission line, the input electrical quantities fetched to the controllers are the same. The fact that these two quantities are different can be judged as a failure of the analog-digital conversion unit in FIG. 44 or an omen that it reaches to the failure.

Further, the automatic checking executing numbers are the same in 2 controllers whose automatic checking cycles are the same and which begin their operation at the same time. The fact that these numbers are different can be judged that there is any abnormality in the processing related to the automatic checking. There are many advantages to perform the comparison of states of a plurality of controllers.

However, in case of the remote operation monitoring system described above, as the connection of communication with an objective controller and the selection of the items are needed for each controller and their operation becomes very complicated. Furthermore, although the display screen of related other controllers and items are displayed independently for each controller, they are not displayed as related controllers and items in the same screen, there is a second problem that operator is excessively burdened when the operator compares related items.

It this case, it may be considered that the menus for plural controllers may be consolidated by the related same item. However, when it is desired to see different items for each controller, it becomes complicated inversely, and further, the maintainability will become a problem when controllers are increased or modified.

Further in recent years, there is a trend that functions to store in digital type protection controller are increased, and thereby protection controllers become complicated. An automatic supervising function including a diagnostic function for specifying a fault part increases accompanied by this. Consequently, there is a third problem in economical efficiency that the quantity of automatic supervising software in the protection controller comes to be large, and memories required come to be large.

Further, in case a change in the monitoring function is produced by the change in the operation of a controller (change in input quantity, addition of relay element, etc.), or in a case that a change is produced by the functional improvement, in the conventional system, it is required to change the contents of the ROM to store the program to realize a monitoring function and a diagnostic function. For this reason, there is a fourth problem that the controller is stopped and the availability thereof decreases.

Further, there is a fifth problem that a great time is required, in the present situation, in the work that a failure part is supposed and restored after the abnormal state of a controller is found by an operator through a patrol, and in the judgment that a time for a round of next inspection is determined from the history of the working results in the past, etc.

In the conventional remote operation monitoring system to operate and monitor from far away a protection controller like a digital relay, the protection controller is operated by the menu shown in FIG. 40. The setting work to perform by the "Setting" menu in this menu is an important work to determine a sensitivity and a characteristic of the protection and control function, and it is necessary to set without errors all the setting values of relay elements which a protection controller has.

In recent years, as the high functionality and multi functionality of protection controllers, the number of relay elements to be stored in a protection controller is in a trend of increase. Accompanied with this, the number of setting elements has been also increased. However, the change and/or confirmation method of setting values have been as conventional, and this state is shown in FIG. 47. FIG. 47 shows the data exchange between the display controller and the digital relay in case setting is performed from the remote display controller by the remote operation monitoring system.

First, a display control menu is selected after selecting a substation and equipment according to a communication menu within a remote operation menu and the communication line is connected. Then, after further selecting the setting, a setting element to be changed is selected, a numerical value to be changed is input and a writing request is submitted to an EEPROM in a protection controller, and thereafter, an operation starting request is submitted.

The above is described about the change of one setting element. In case of the change of plural setting elements, the above procedure is to be repeatedly made by the number of elements. Further, at this time, in case a state like abnormality of hardware in the controller or an operation of a relay, etc. is produced, since performing the change in setting is apt to lead to an unwanted operation of a controller, it is generally suspended. In this case, it is necessary to perform the confirmation by the other menu item in FIG. 40, and this also increases the workload.

The above is also similar in the case in which the setting work is performed by the panel for setting, etc. on the front of the digital relay without using a network. Thereupon, the setting work causes an increase in the workload and a human error accompanied with this, and there will be a first problem to drop both economical efficiency and reliability.

Further, the setting for controllers in subject is performed by many procedures like this. In case a remote operation system is used, as shown in FIG. 47, a request data from a personal computer and a response data from a digital relay mutually come and go. It is necessary to maintain a communication route between the personal computer and the digital relay until a series of processing is completed. Accordingly, there will be a second problem that a drop of reliability is generated, because of increase in traffic on the communication network, and delay of communication and loss of communication packets, etc. accompanied with it.

Further, in many cases the change in setting accompanies the change in condition of the electric power system in subject. In this case, the similar change in setting values is to be performed over plural protection controllers. But there will be a third problem that economical efficiency and reliability is lowered by repeating the setting change procedure as described above similarly against each controller.

Moreover, in case considering that setting values are changed in response to the change in the electric power system as described above, since the workload is much as described above there is a predetermined limit in the following time. The larger the range of the subject system is, the larger this delay becomes. Accordingly, there will be a fourth problem that the protection and control of the electric power system cannot stably performed.

SUMMARY OF THE INVENTION

Accordingly, one object of this invention is to provide an electric power system protection and control system composed of a plurality of protection controllers and a display controller connected via a communication network which is excellent in the operability, economical efficiency, maintainability and reliability, without increasing the load of the communication network, by utilizing the fact that the protection controllers are connected to the communication network and paying attention to the movement of a program module and the cooperation functions among protection controllers in the system.

Another object of this invention is to provide an electric power system protection and control system composed of a plurality of protection controllers and a display controller connected via a communication network which is excellent in the operability, economical efficiency, maintainability and reliability, by eliminating the operation analyzing work which is conventionally performed and without increasing the load of the communication network, by utilizing the fact that the protection controllers are connected to the communication network and paying attention to the movement of an operation analyzing program module.

Still another object of this invention is to provide an electric power system protection and control system composed of a plurality of protection controllers and a display controller connected via a communication network which is excellent in the operability, economical efficiency, maintainability and reliability, by eliminating the work for a patrol which is conventionally performed without increasing the load of the communication network, by utilizing the fact that the protection controllers are connected to the communication network and paying attention to the movement of a monitoring program module and the cooperation functions among protection controllers in the system.

Still a further object of this invention is to provide an electric power system protection and control system composed of a plurality of protection controllers and a display controller connected via a communication network which is excellent in the operability, economical efficiency, maintainability and reliability, by eliminating the setting work which is conventionally performed, extending further the range of the setting function, optimizing the setting value and the protection and control characteristics quickly and anonymously corresponding to the change in the electric power system, without increasing the load of the communication network, by utilizing the fact that the protection controllers are connected to the communication network and paying attention to the movement of a setting program module.

One object of this invention is to provide a distributed control system composed of a plurality of distributed controllers and a display controller connected via a communication network which is excellent in the operability, economical efficiency, maintainability and reliability without increasing the load of the communication network, by utilizing the fact that the distributed controllers are connected to the communication network and paying attention to the movement of a program module and the cooperation functions among distributed controllers in the system.

Another object of this invention is to provide a distributed control system composed of a plurality of distributed controllers and a display controller connected via a communication network which is excellent in the operability, economical efficiency, maintainability and reliability, by. eliminating the operation analyzing work which is conventionally performed and without increasing the load of the communication network, by utilizing the fact that the distributed controllers are connected to the communication network and paying attention to the movement of an operation analyzing program module.

Still another object of this invention is to provide a distributed control system composed of a plurality of distributed controllers and a display controller connected via a communication network which is excellent in the operability, economical efficiency, maintainability and reliability, by eliminating the work for a patrol which is conventionally performed, without increasing the load of the communication network, by utilizing the fact that the distributed controllers are connected to the communication network and paying attention to the movement of a monitoring program module and the cooperation functions among distributed controllers in the system.

Still a further object of this invention is to provide a distributed control system composed of a plurality of distributed controllers and a display controller connected via a communication network which is excellent in the operability, economical efficiency, maintainability and reliability, by eliminating the setting work which is conventionally performed, extending further the range of the setting function, optimizing the setting value and the distributed control characteristics quickly and anonymously corresponding to the change in the electric power system, without increasing the load of the communication network, by utilizing the fact that the distributed controllers are connected to the communication network and paying attention to the movement of a setting program module.

These and other objects of this invention can be achieved by providing a monitor and control system, including a plurality of processing units, each for monitoring or controlling an equipment by inputting a status quantity of the equipment, and a display controller connected to each of the processing units via a communication network, for displaying and controlling an operation and status of each of the processing units for monitoring. The display controller is provided with program module sending unit for sending out a program module corresponding to contents for display control in the display controller to each of the processing units via the communication network. each of the processing units is provided with, a program module receiving unit for receiving the program module from the display controller or another one of the processing units, an executing unit for executing the received program module, and a transfer unit for transferring an execution result by the execution unit or the program module stored in the processing unit to the display controller or another one of the processing units via the communication network.

According to one aspect of this invention, there is provided an electric power system protection and control system, including a plurality of protection controllers, each for executing protection and control of an electric power system by inputting a status quantity of the electric power system and for converting the status quantity into digital data, and a display controller connected to each of the protection controllers via a communication network, for displaying and controlling an operation and status of each of the protection controllers for monitoring. The display controller is provided with program module sending unit for sending out a program module corresponding to contents for display control in the display controller to one of the protection controllers via the communication network, respectively. Each of the protection controllers is provided with, a program module receiving unit for receiving the program module from the display controller or another one of the protection controllers via the communication network, an execution unit for executing the received program module, and a transfer unit for transferring an execution result by the execution unit or the program module stored in the protection controller to the display controller or another one of the protection controllers via the communication network.

According to another aspect of this invention, there is provided an electric power system protection and control system, including a plurality of protection controllers, each for executing protection and control of an electric power system by inputting a status quantity of the electric power system and for converting the status quantity into digital data, and a display controller connected to each of the protection controllers via a communication network, for displaying and controlling an operation and status of each of the protection controllers for monitoring. The display controller is provided with operation analyzing program module sending unit for sending out an operation analyzing program module for analyzing an operation of one of the protection controllers to one of the protection controllers via the communication network, respectively. Each of the protection controllers is provided with, an operation analyzing program module receiving unit for receiving the operation analyzing program module from the display controller or another one of the protection controllers via the communication network, a knowledge adding unit for executing the received operation analyzing program module and for giving an execution result as a knowledge of the operation analyzing program module, and a sending unit for sending the operation analyzing program module after added with the knowledge to the display controller or another one of the protection controllers via the communication network. The display controller is further provided with, a receiving unit for receiving the operation analyzing program module after added with the knowledge sent from one of the protection controllers, and a display unit for displaying a received result in the receiving unit.

According to another aspect of this invention, there is provided an electric power system protection and control system, including a plurality of protection controllers, each for executing protection and control of an electric power system by inputting a status quantity of the electric power system and for converting the status quantity into digital data, and a display controller connected to each of the protection controllers via a communication network, for displaying and controlling an operation and status of each of the protection controllers for monitoring. the display controller is provided with monitoring program module sending unit for sending out a monitoring program module for monitoring a status of one of the protection controllers to one of the protection controllers via the communication network, respectively. each of the protection controllers is provided with a monitoring program module receiving unit for receiving the monitoring program module from the display controller or another one of the protection controllers via the communication network, a knowledge adding unit for executing the received monitoring program module and for giving an execution result as a knowledge of the monitoring program module, and a sending unit for sending the monitoring program module after added with the knowledge to the display controller or another one of the protection controllers via the communication network. The display controller is further provided with a receiving unit for receiving the monitoring program module after added with the knowledge sent from one of the protection controllers, and a display unit for displaying a received result in the receiving unit.

According to another aspect of this invention, there is provided an electric power system protection and control system, including a plurality of protection controllers, each for executing protection and control of an electric power system by inputting a status quantity of the electric power system and for converting the status quantity into digital data, and a display controller connected to each of the protection controllers via a communication network, for displaying and controlling an operation and status of each of the protection controllers for monitoring. The display controller is provided with a setting program module sending unit for sending out a setting program module for setting for one of the protection controllers to one of the protection controllers via the communication network, respectively. Each of the protection controllers is provided with a setting program module receiving unit for receiving the setting program module from the display controller or another one of the protection controllers via the communication network, a knowledge adding unit for executing the received setting program module and for giving an execution result as a knowledge of the setting program module, and a sending unit for sending the setting program module after added with the knowledge to the display controller or another one of the protection controllers via the communication network. The display controller is further provided with, a receiving unit for receiving the setting program module after added with the knowledge sent from one of the protection controllers, and a display unit for displaying a received result in the receiving unit.

According to still another aspect of this invention, there is provided a distributed control system, including a plurality of distributed controllers, each for controlling an equipment to be controlled by inputting a status quantity of the equipment and for converting the status quantity into digital data and a display controller connected to each of the distributed controllers via a communication network, for displaying and controlling an operation and status of each of the distributed controllers for monitoring. The display controller is provided with a program module sending unit for sending out a program module corresponding to contents for display control in the display controller to one of the distributed controllers via the communication network, respectively. Each of the distributed controllers being provided with, a program module receiving unit for receiving the program module from the display controller or another one of the distributed controllers via the communication network, an execution unit for executing the received program module, and a transfer unit for transferring an execution result by the execution unit or the program module stored in the distributed controller to the display controller or another one of the distributed controllers via the communication network.

According to another aspect of this invention, there is provided a monitor and control device, including a plurality of processing units, each for monitoring or controlling an equipment by inputting a status quantity of the equipment; and a display controller connected to each of the processing units via a communication network, for displaying and controlling an operation and status of each of the processing units for monitoring. The display controller is provided with a program module sending unit for sending out a program module corresponding to contents for display control in the display controller to each of the processing units via the communication network. Each of the processing units is provided with, a program module receiving unit for receiving the program module from the display controller or another one of the processing units, an executing unit for executing the received program module, and a transfer unit for transferring an execution result by the execution unit or the program module stored in the processing unit to the display controller or another one of the processing units via the communication network.

According to another aspect of this invention, there is provided an electric power system protection and control device, including a plurality of protection controllers, each for executing protection and control of an electric power system by inputting a status quantity of the electric power system and for converting the status quantity into digital data, and a display controller connected to each of the protection controllers via a communication network, for displaying and controlling an operation and status of each of the protection controllers for monitoring. The display controller is provided with a program module sending unit for sending out a program module corresponding to contents for display control in the display controller to one of the protection controllers via the communication network, respectively. Each of the protection controllers is provided with, a program module receiving unit for receiving the program module from the display controller or another one of the protection controllers via the communication network, an execution unit for executing the received program module, and a transfer unit for transferring an execution result by the execution unit or the program module stored in the protection controller to the display controller or another one of the protection controllers via the communication network.

According to still another aspect of this invention, there is provided a program storing medium readable by a computer, tangibly embodying a program of instructions executable by the computer to perform method steps for a monitor and control system, including a plurality of processing units, each for monitoring or controlling an equipment by inputting a status quantity of the equipment, and a display controller connected to each of the processing units via a communication network, for displaying and controlling an operation and status of each of the processing units for monitoring. the method includes the steps of, program module sending step for sending out a program module corresponding to contents for display control in the display controller to each of the processing units via the communication network, at the display controller, program module receiving step for receiving the program module from the display controller or another one of the processing units, at each of the processing units, executing step for executing the received program module, at each of the processing units, and transfer step for transferring an execution result by the execution step or the program module stored in the processing unit to the display controller or another one of the processing units via the communication network, at each of the processing units, According to another aspect of this invention, there is provided a program storing medium readable by a computer, tangibly embodying a program of instructions executable by the computer to perform method steps for an electric power system protection and control system including, a plurality of protection controllers, each for executing protection and control of an electric power system by inputting a status quantity of the electric power system and for converting the status quantity into digital data, and a display controller connected to each of the protection controllers via a communication network, for displaying and controlling an operation and status of each of the protection controllers for monitoring. The methods includes the steps of, program module sending step for sending out a program module corresponding to contents for display control in the display controller to one of the protection controllers via the communication network, respectively, at the display controller, program module receiving step for receiving the program module from the display controller or another one of the protection controllers via the communication network at each of the protection controllers, execution step for executing the received program module at each of the protection controllers, and transfer step for transferring an execution result by the execution step or the program module stored in the protection controller to the display controller or another one of the protection controllers via the communication network at each of the protection controllers.

According to another aspect of this invention, there is provided a program storing medium readable by a computer, tangibly embodying a program of instructions executable by the computer to perform method steps for a distributed control system including, a plurality of distributed controllers, each for controlling an equipment to be controlled by inputting a status quantity of the equipment and for converting the status quantity into digital data, and a display controller connected to each of the distributed controllers via a communication network, for displaying and controlling an operation and status of each of the distributed controllers for monitoring. The methods includes the steps of, program module sending step for sending out a program module corresponding to contents for display control in the display controller to one of the distributed controllers via the communication network, respectively, at the display controller, program module receiving step for receiving the program module from the display controller or another one of the distributed controllers via the communication network at each of the distributed controllers, execution step for executing the received program module at each of the distributed controllers, and transfer step for transferring an execution result by the execution step or the program module stored in the distributed controller to the display controller or another one of the distributed controllers via the communication network at each of the distributed controllers.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 is a diagram for explaining an action of the second embodiment;

FIG. 11 is a diagram for explaining an action of the third embodiment;

FIG. 14 is a diagram for explaining an action of the fourth embodiment;

FIG. 24 is a diagram for explaining an action of the eighth embodiment;

FIG. 28 is a diagram for explaining an action of the eleventh embodiment;

FIG. 31 is a diagram for explaining an action of the twelfth embodiment;

DETAILED DESCRIPTION OF THE PREFERRED EMBODIMENTS

Figure 1:
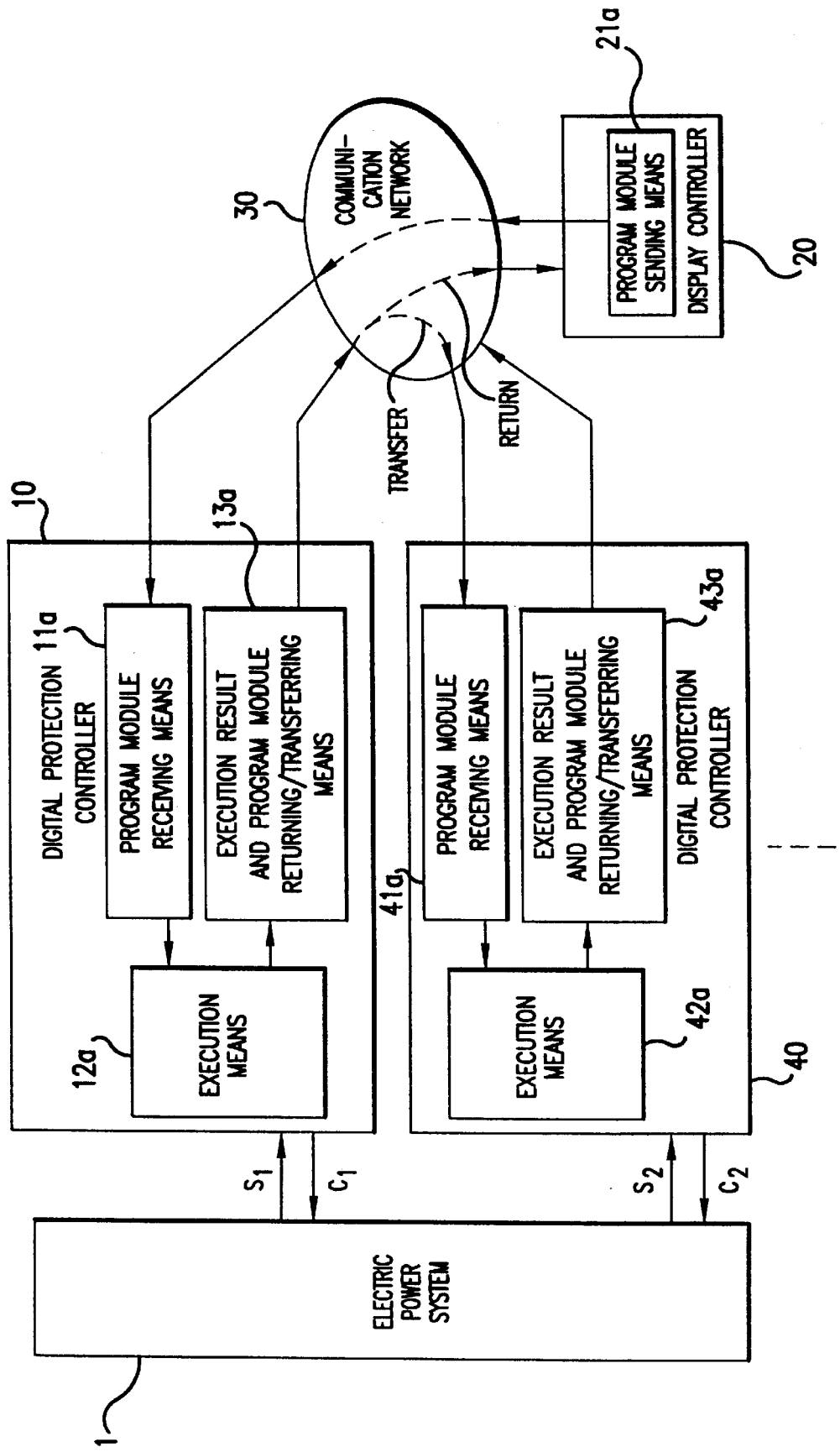
FIG. 1 is a diagram showing the construction of an electric power system protection and control system according to a first embodiment of this invention.

Referring now to the drawings, wherein like reference numerals designate identical or corresponding parts throughout the several views, the embodiments of this invention will be described below.

FIG. 1 is a diagram showing the construction of an electric power system protection and control system according to a first embodiment of this invention. In FIG. 1, 10 is a digital protection controller to perform the protection and control of an electric power system 1 by inputting a status quantity S1 from electric power system 1 that is a subject to the protection and control and outputting a protection and control output C1 to electric power system 1, and it is composed of a program module receiving means 11a, an execution means 12a and an execution result and program module returning/transferring means 13a.

Further, a display controller 20 remotely controls plural protection controllers including digital protection controller 10 and an another digital protection controller 40 in the same construction via a communication network 30, and it has a program module sending means 21a.

Figure 2:
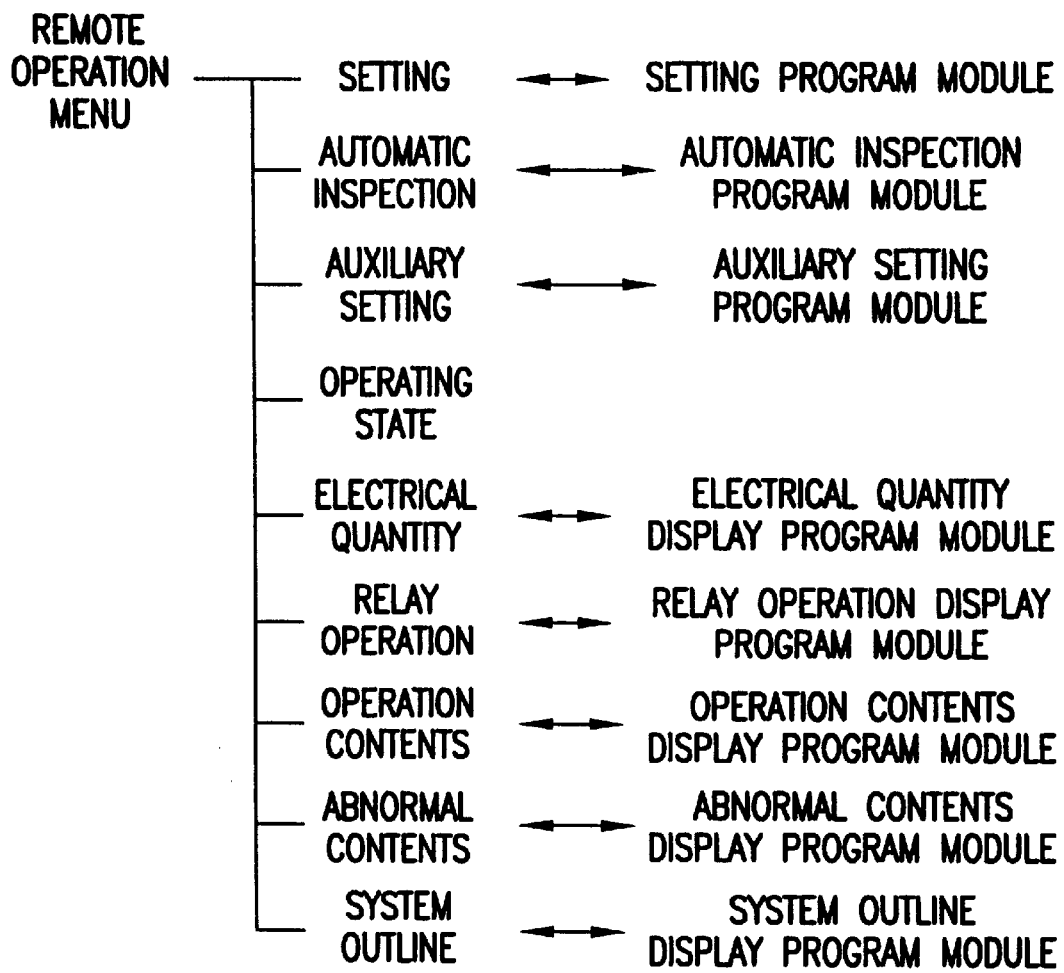
FIG. 2 is a diagram showing the correspondence between screen display menu and program modules in the first embodiment.
Figure 18:
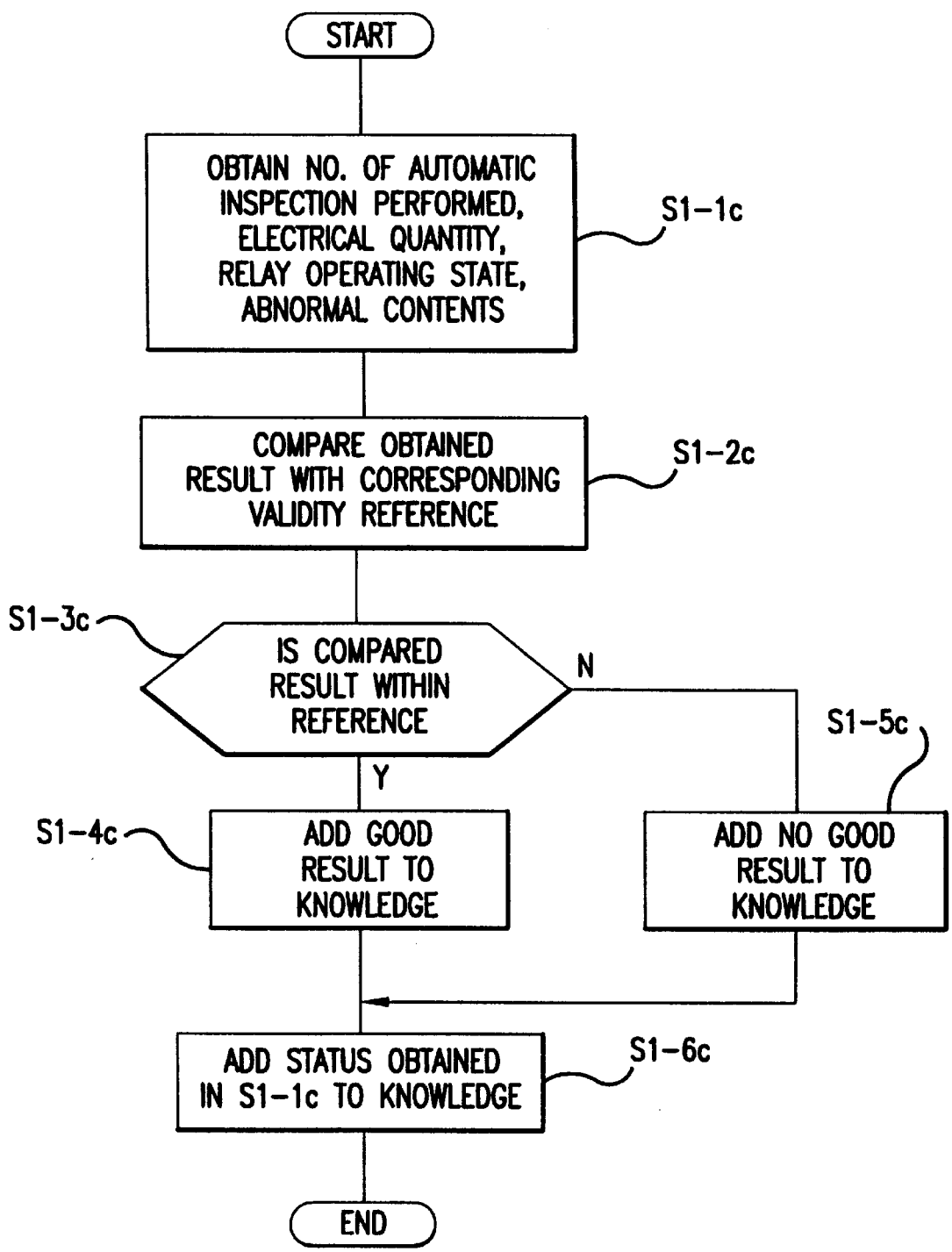
FIG. 18 is a flowchart showing the processing contents of the sixth embodiment.

As the operations of this embodiment, a program module corresponding to the contents of the display on display controller 20 is first sent out by program module sending means 21 in display controller 20 via communication network 30. For instance, program modules corresponding to items of the remote operation menu shown in FIG. 18 are sent out as shown in FIG. 2.

Here, a program module is composed of a combination of data and the description of steps to process them. For instance, in case of the setting menu described above, data are setting values corresponding to protection controllers and procedural steps can be said to be those procedural steps until these setting values are stored in a specified memory in protection controller.

Figure 3:
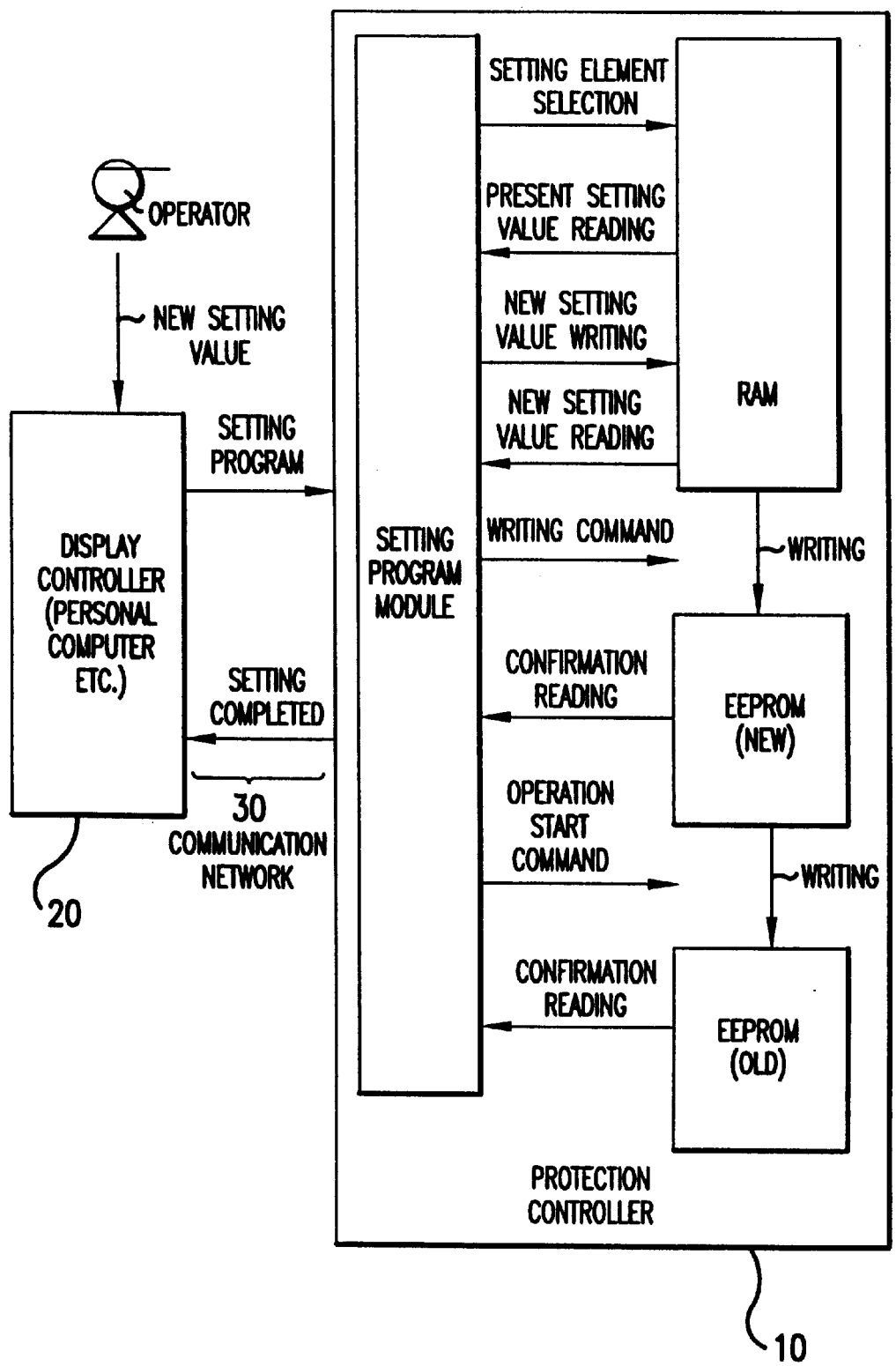
FIG. 3 is a diagram for explaining an action of the first embodiment.

The program module sent out is received by program module receiving means 11 in digital protection controller 10 via communication network 30 and executed by execution means 12. The flow of the sending, receiving and execution processes of the program module in this case are summarized as shown in FIG. 3.

The setting program module sent from the display controller is composed of set value data to be set and procedural steps (for instance, in which memory the setting values are to be stored, to which process resident in the protection controller is to be requested). As a result, the detailed process relative to the setting process is executed in the protection controller. That is, the processes are executed for such hardware resources as RAM, EEPROM (new), EEPROM (former) in the protection controller.

Figure 19:
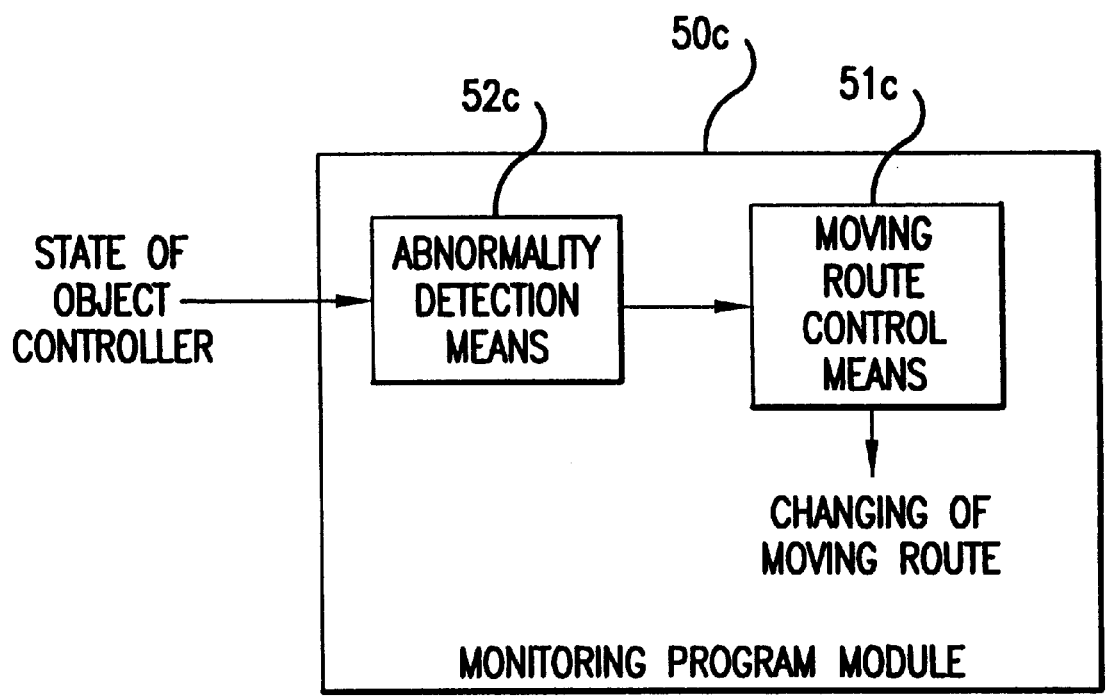
FIG. 19 is a diagram showing the construction of a part of an electric power system protection and control system according to a seventh embodiment of this invention.

These processes are carried out so far between the display controller and the protection controllers as shown in FIG. 19. In this embodiment, as the setting program module incorporating these processes is moved to the protection controller side and executed therein, the traffic on the communication network is reduced when compared with the prior art. Further the operator is required only to give new setting values to the display controller. Accordingly, such the operation as before to send requests to the protection controllers will not be required for operator.

After the program module is executed by execution means 12a, this execution result or the program module is processed by execution result and program module returning/transferring means (hereinafter referred to as returning/transferring means) 13a. For instance, in case of the setting program module described above, whether the set result is satisfactory or the set value is not within the specified range and not proper is returned to display controller 20 via communication network 30.

Further, it is also considered that the setting job is carried out in the same contents for plural protection controllers. In this case, the setting program module is transferred to other protection controller 40 using returning/transferring means 13. In protection controller 40, same means 41a, 42a and 43a as protection controller 10 are provided and the setting program module is received by a program module receiving means 41a, executed by an execution means 42a in the same manner as described above, and the execution result is returned to display controller 20 or the setting program module is transferred to other protection controller by returning/transferring means 43a, and processed similarly.

Figure 4:
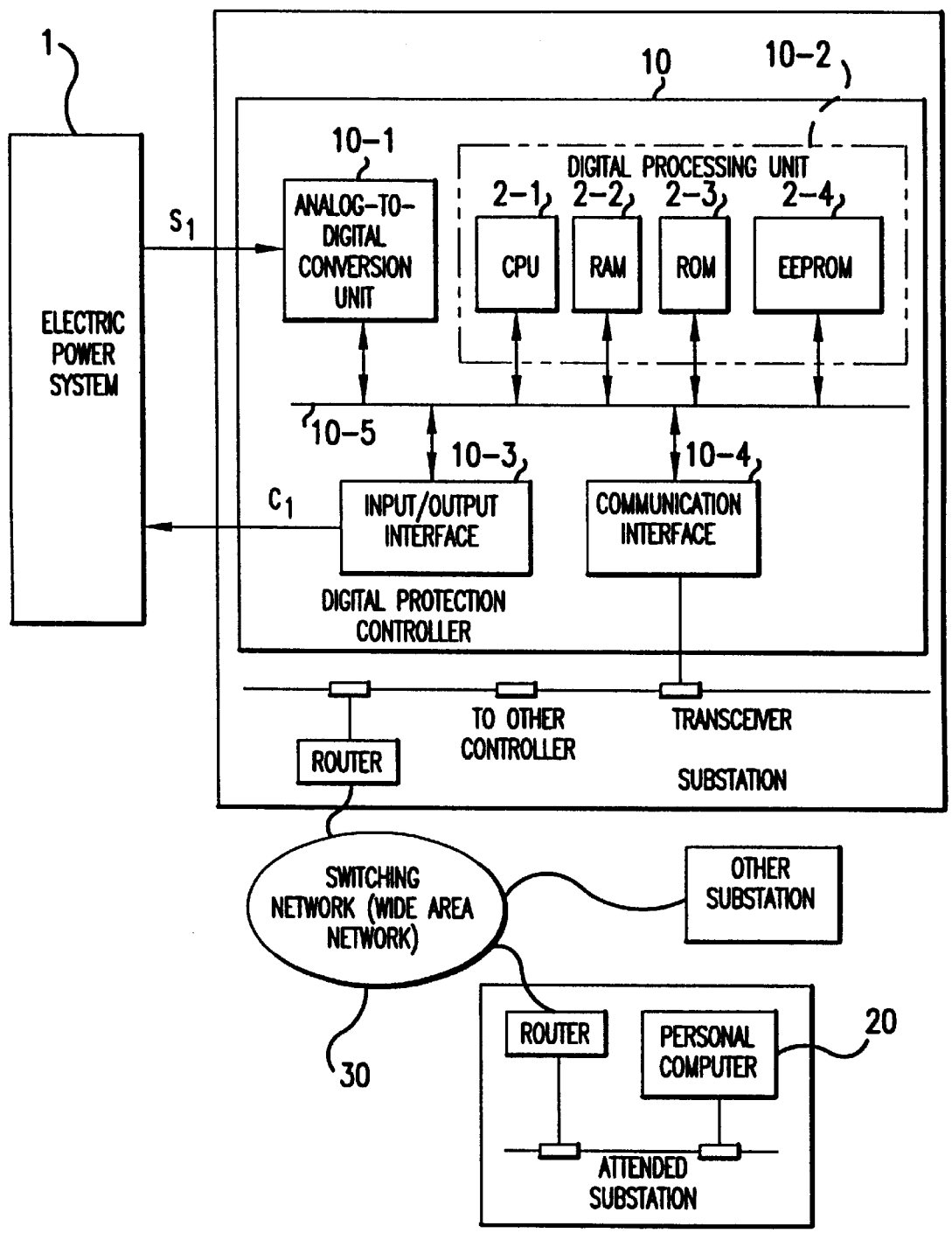
FIG. 4 is a diagram showing an example of the definite construction of the first embodiment.

A definite example of the present embodiment is shown in FIG. 4. Digital protection controller 10 is composed of an analog/digital conversion unit 10-1, a digital processing unit 10-2, an input/output interface 10-3 with external equipments such as a circuit breaker, etc., a communication interface 10-4 to interface communication network 30 and this protection controller 10 and a bus 10-5. Further, all the units 10-1 through 10-4 are mutually connected through bus 10-5.

Analog/digital conversion unit 10-1 is composed of an analog filter, a sampling hold circuit, a multiplexer, an analog-to-digital converter, etc. and taking the status quantities (for instance, current, voltage) of an electric power system that is subject to the protection and control as an analog information and after holding at a specified sampling interval, they are converted into digital quantities.

On the other hand, digital processing unit 10-2 is composed of a CPU 2-1, RAM 2-2, ROM 2-3 and non-volatile memory EEPROM 2-4. The digital converted quantities of electrical quantity data are transferred to RAM 2-2 sequentially. By these data, set values of protective relays stored in EEPROM 2-4 and programs from RAM 2-2 and ROM 2-3, CPU 2-1 performs various protection and control operations.

Here, the present invention differs from a conventional protection. controller in that a part of program is sent to RAM 2-2 through communication network 30 and processed as a program in digital processing unit 10-2. The present invention features that the program modules is sent to RAM 2-2 via communication network 30 and transferred to a RAM of another protection controller while in the conventional protection controller, programs are fixedly written in ROM 2-3. This digital processor 10-2 composes execution means 12, and a part of receiving means 11 and returning/transferring means 13.

Next, input/output interface 10-3 is an interface to take the state of external control equipment such as information on a breaker and to output protection relay operation, reset output, trip command, etc. to external equipment. Further, communication interface 10-4 is one of the features of this invention and connects an ethernet LAN with protection controller 10, as shown in FIG. 4. Part of program module receiving means 11 and returning/transferring means 13 is realized by this communication interface 10-4.

That is, the program module from communication network 30 is received here and transferred to RAM 2-2. The program module executed in digital processing unit 10-2 is sent to communication network 30 via this communication interface 10-4 and transferred to display controller 20 or another protection controller. A definite example of the construction of the electric power system protection and control system is as described above.

Further, as an example of a communication network 30, it is composed of a network connecting protection controllers in a local range such as substation by an ethernet LAN, a network connecting personal computers and work stations in office and a wide area network connecting both the networks in a wide area, as shown in FIG. 4.

The construction of an ethernet LAN is general and the explanation will be omitted here. Further, as a wide area network, switching networks such as telephone circuits are used. Display controller 20 described above is achieved by a personal computer shown in FIG. 4. Program module sending means 21 is achieved by a software in the personal computer and an interface circuit of an ethernet LAN.

Figure 5:
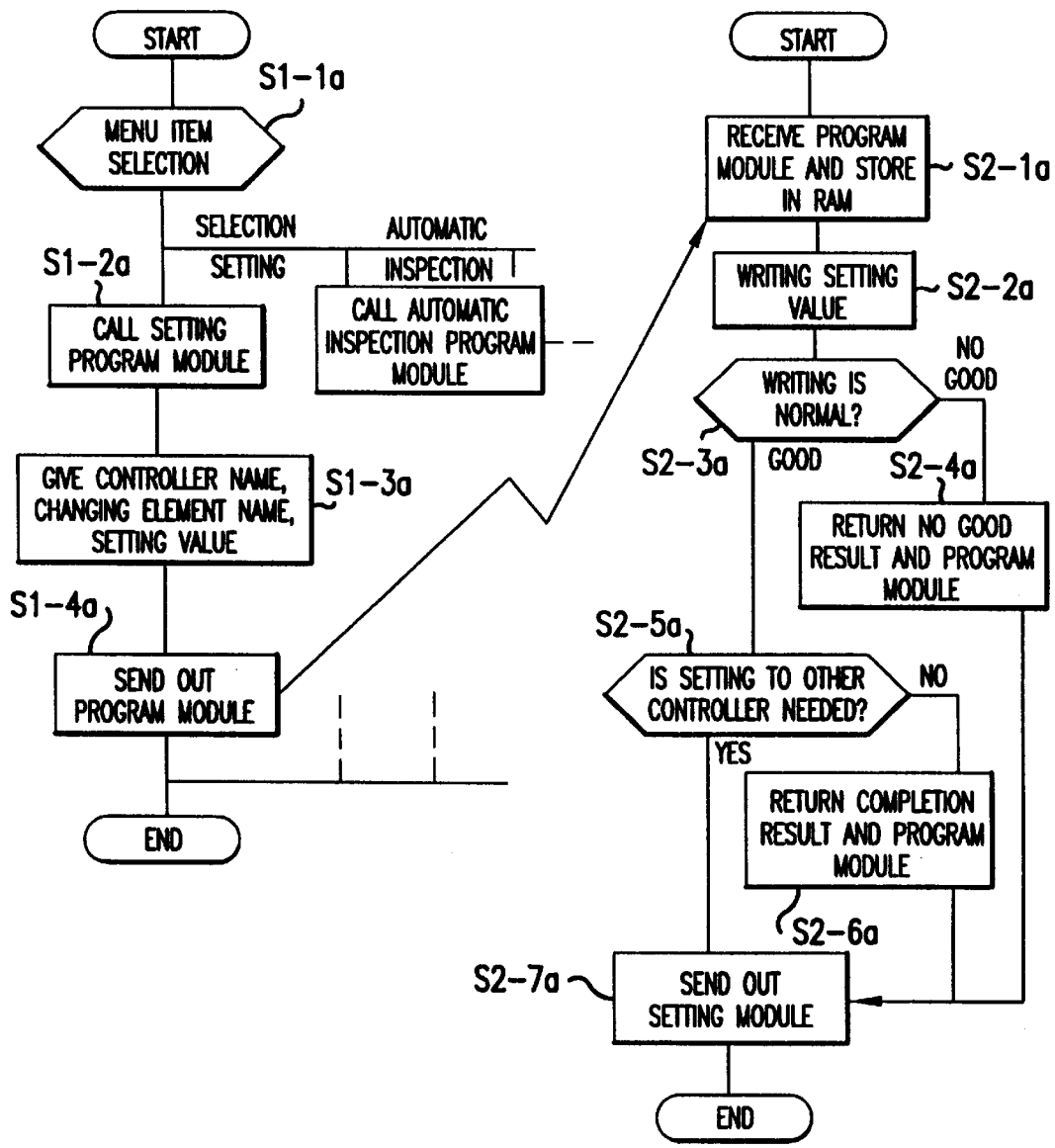
FIG. 5 is a flowchart showing the processing contents of the first embodiment.

Next, the details of actions of the present embodiment will be described using the flowchart shown in FIG. 5. First, the flowchart of the personal computer (display controller 20) side will be described. The remote operation menu described above is displayed on the display of the personal computer, and an operator selects an item in the remote operation menu in Step S1-1a. For instance, when the setting job is selected, a setting program module is read out in Step S1-2a.

In Step S1-3a, operator gives such data as a name of equipment of which setting is to be changed, a name of setting element to be changed, a set value, etc. to this setting program module. In Step S1-4a, these data are stored in the setting program module and the setting program module is sent out to communication network 30. The details of program sending means 21 are as described above.

Then, protection controller 10 receives the setting program module in Step S2-1a and stores in RAM 2-2. This operation is equivalent to program module receiving means 11a. In Step S2-2a, this setting program module writes setting values in RAM, EEPROM (new) and EEPROM (former) in order while checking them as described above. This operation is equivalent to execution means 12a.

So far, data receiving and request between the setting process and EEPROM and RAM are made via communication network 30 each time, but are all completed in protection controller 10 in this invention. Then, the execution result is judged in Step S2-3a. If it is defective (for instance, the writing into EEPROM and RAM is incomplete and specified values are not written), the setting is again needed and the defective result and the program module are returned to display controller 20 in Step S2-4a.

When the execution result is satisfactory and the setting to other controller is not needed in Step S2-5a, the completion result and the program module are similarly returned to display controller 20 in Step S2-6a. Further, if the setting to other controller is needed, a name of other controller described in the setting program module is read in Step S2-7a and the setting program module is sent out with that equipment as a destination. The operations from Steps S2-3a through S2-7a are equivalent to returning/transferring means 13a.

According to the above embodiment, as a program module itself corresponding to jobs that are performed by operator are sent to the protection controller from the display controller via the communication network for execution in the protection controller, it becomes possible to reduce the traffic on the communication network and improve the reliability. Further, as such works as operations corresponding to various requests and the same work required for plural controllers are no longer required as before, it becomes possible to reduce workload of the operator and provide a highly economical and reliable electric power system protection and control system.

Further, this invention is not limited to an electric power system only. But this invention is also applicable to a distributed control system composed of plural distributed controllers to control equipments to be controlled by taking status quantities therefrom and a display controller connected to these distributed controllers via a communication network to display and control for monitoring the operations and status of distributed controllers (or a program storage unit to store program module that is capable of operating on the distributed controllers). In this case, in the embodiments described above, the protection controllers should be read as the distributed controllers.

Figure 6:
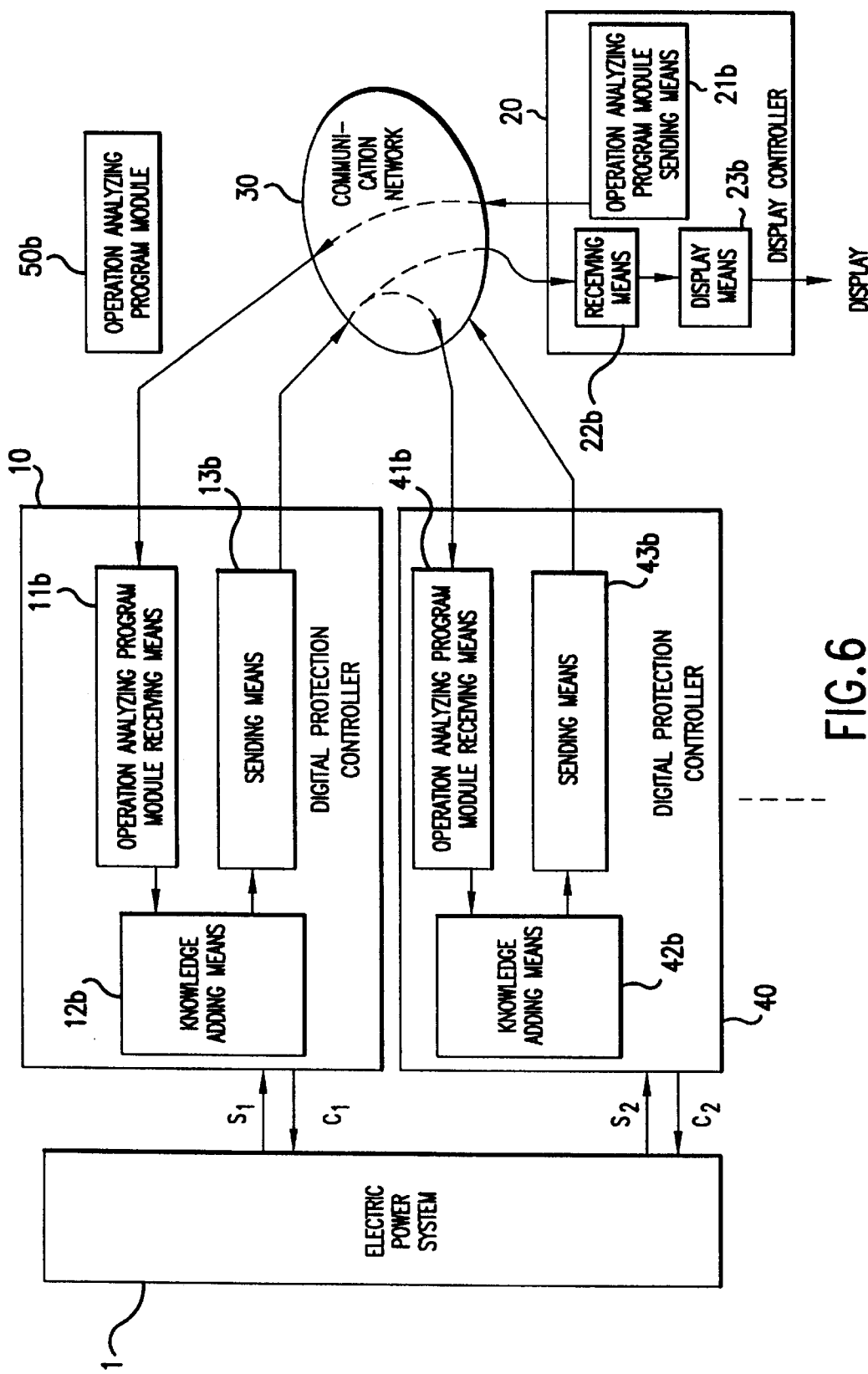
FIG. 6 is a diagram showing the construction of an electric power system protection and control system according to a second embodiment of this invention.

FIG. 6 is a block diagram showing the construction of an electric power system protection and control system according to a second embodiment of this invention. In FIG. 6, 10 is digital protection controller to carry out the protection and control of electric power system 1 by inputting status quantity S1 from electric power system 1 that is a subject to the protection and control and outputting protection and control output C1 to electric power system 1. It is composed of an operation analyzing program module receiving means 11b, a knowledge adding means 12b and a sending means 13b.

Further, display controller 20 performs the remote operation of plural controllers including digital protection controller 10 and other controller 40 in the same construction via communication network 30, and it has an operation analyzing program module sending means 21b, receiving means 22b and display means 23b.

As its operations, display controller 20 first sends out an operation analyzing program module 50b by operation analyzing program module sending means 21b via communication network 30. Operation analyzing program module 50b in this embodiment is a program module having a function to perform the (collection of operating information) equivalent to checking of the controller operation. The description of data and their processing steps is unified in the program module.

For instance, the following items are achieved as functions:

1. Obtain the relay operating status when the controllers are in operation.

2. Obtain electrical quantity when the controllers are in operation.

3. Obtain related information (input state, transmission system state) when the controllers are in operation.

Data and steps for achieving the above functions will be as follows:

Data:

A moving route for moving plural related protection controllers.

Steps:

1. Obtain the relay operating state when the controllers are in operation.

2. Obtain electrical quantity when the controllers are in operation.

3. Obtain related information (input state, transmission system state) when the controllers are in operation.

Operation analyzing program module 50b in the construction as shown above and sent out is received by operation analyzing program module receiving means 11b in digital protection controller 10 via communication network 30.

Thereafter, it is put in knowledge adding means 12b, where this program module 50 is executed. Definitely, the procedural processing of operation analyzing program-module 50b is executed.

That is, relay operation data, electrical quantity data and related information data stored in RAM when the protection controllers are in operation are added as a knowledge to operation analyzing program module 50b. Definitely, they are added as one of data of this program module 50b. Thus, this operation analyzing program module 50b is moved to each protection controller and is executed at the moved destination, and the obtained result is added to operation analyzing program module 50b as the knowledge successively.

Figure 7:
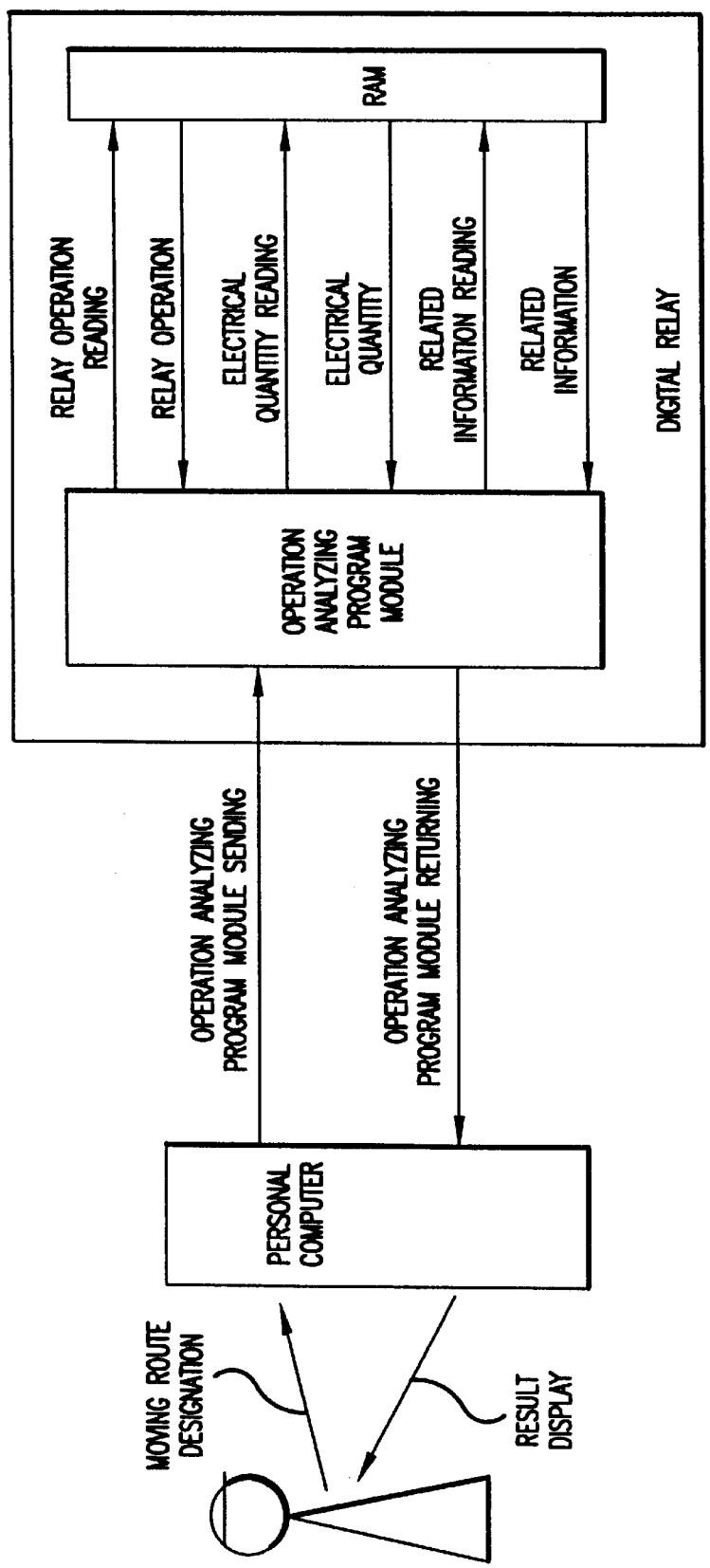
FIG. 7 is a diagram for explaining an action of the second embodiment.
Figure 45:
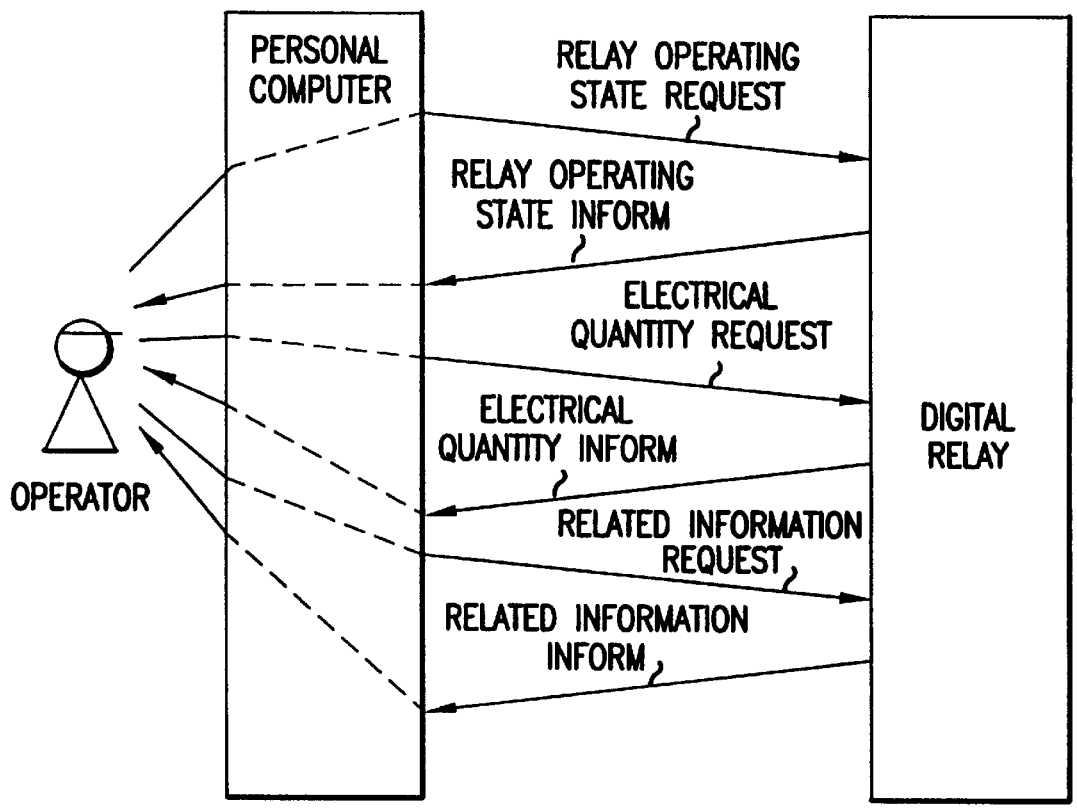
FIG. 45 is a diagram for explaining an action of another conventional electric power system protection and control system.

This state is shown in FIG. 7. As shown in FIG. 7, the operation analyzing program module moved into the protection controller is processed with RAM storing the operating information in the protection controller. Operator is required only to give a moving route to the operation analyzing program module on the display controller. Accordingly, requesting data and response data do not go back and forth complicatedly on the communication network as shown in FIG. 45.

The operation analyzing program module executed and added with the knowledge as described above is returned to display controller 20 or transferred to other protection controller 40 by sending means 13b via communication network 30. Here, whether the program module is to be returned to display controller 20 or transferred to protection controller 40 is determined according to the data that designated the moving route. This moving route data is judged by operator from the system execution aspect and given to the operation analyzing program module.

There is such a merit that when the operation analyzing program module is transferred to other protection controllers and its execution at all controllers that are objects for the operation analysis is completed. Then the operation analyzing program module is finally returned, operator is required to confirm it on the display only one time. In protection controller 40, it is provided with the similar means such as protection controller 10; that is, an operation analyzing program module receiving means 41b, a knowledge adding means 42b and a sending means 43b are provided, and the operation analyzing program module is first received by operation analyzing program module receiving means 41b, executed in knowledge adding means 42b in the same manner as described above and added with knowledge, and its execution result and the program module are returned to display controller 20 or further transferred to other protection controller by sending means 43b, and processed in the same manner.

The operation analyzing program module transferred or returned as described above is received and displayed by receiving means 22b and display means 23b of display controller 20. Contents (for instance, relay operation, electrical quantity, etc.) added by each of the protection controllers as the knowledge of the operation analyzing program module are displayed in a form of a table in display controller 20.

This state is shown in FIG. 8. FIG. 8 shows data collected by the operation analyzing program module moved to two transverse differential protection relays installed at both ends of resistance grounded neutral system parallel two circuit transmission lines when they are operated by a system fault (a single line earth-fault of No. 1 line) in a form for easy to understand by operator. In a conventional system, data are displayed on the screen by each controller and each item, and the checking work was complicated. Here, the relays (two relay elements of 150G and 64 were operated) that were operated in both controllers (controllers 10 and 40), electrical quantities (RMS value and phase) and related information are shown in a table.

A definite example of construction of this embodiment is shown in FIG. 4. Digital protection controller 10 is composed of analog-to-digital conversion unit 10-1, digital processor 10-2, input/output interface 10-3 with external equipments such as a circuit beaker, etc. communication interface 10-4 to interface communication network 30 with this protection controller 10, and bus 10-5.

Figure 44:
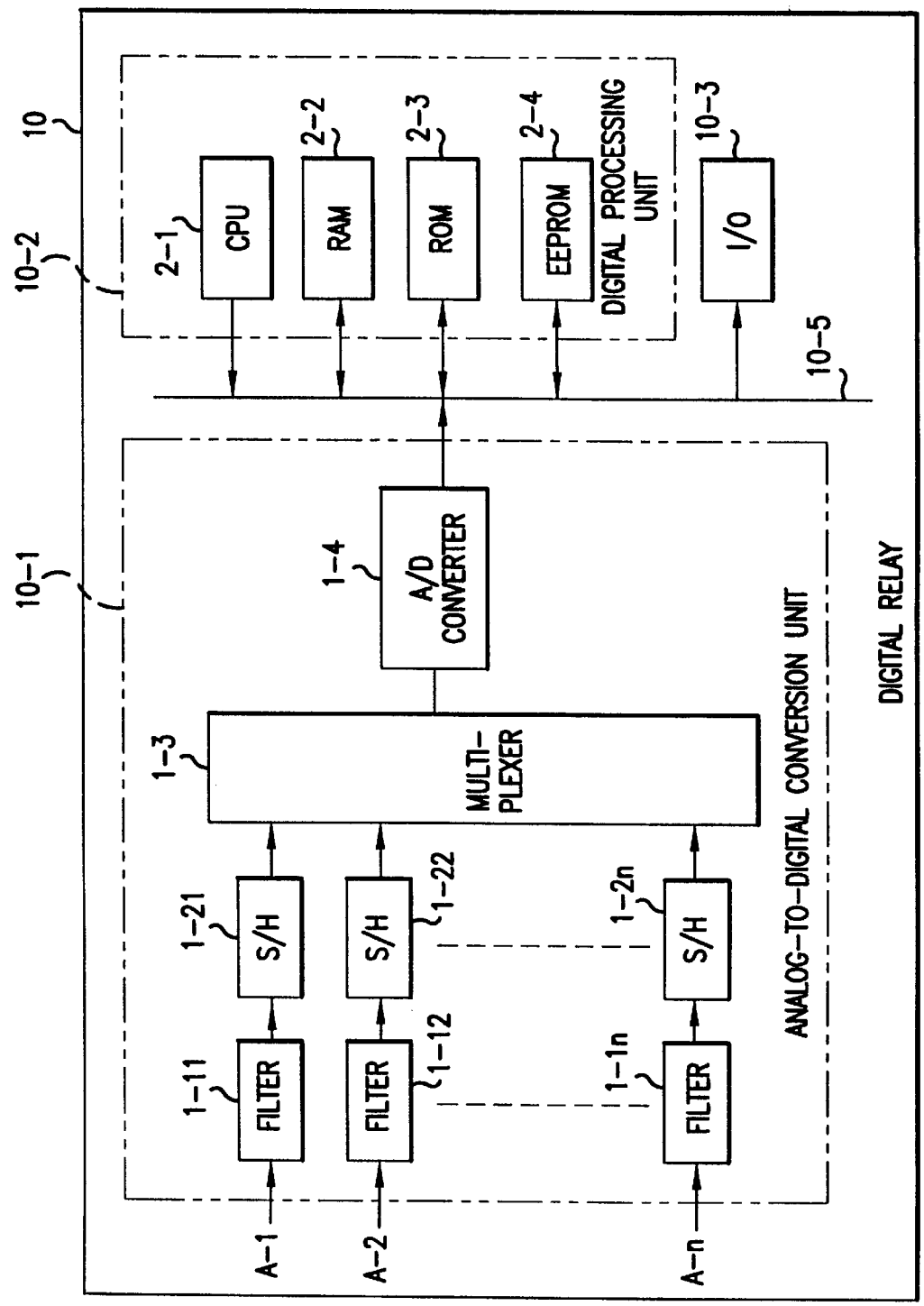
FIG. 44 is a diagram showing the construction of one example of a conventional digital relay.

All units of 10-1 through 10-4 are connected to each other via bus 10-5. Here, the component elements other than communication interface 10-4 are the same as those described for prior art as shown in FIG. 44. This invention differs from a conventional protection controller in that a part of program modules (the operation analyzing program module in this embodiment) is sent to RAM 2-2 via communication interface 10-4 from communication network 30 and processed as a program in digital processor 10-2.

The present invention features that the operation analyzing program modules is sent to RAM 2-2 via communication network 30 and transferred to a RAM of another protection controller, while in the conventional protection controller, programs are fixedly written in ROM 2-3. This digital processor 10-2 composes knowledge adding means 12b, and a part of receiving means 11b and sending means 13b.

Further, communication interface 10-4 is one of the features of this invention, and for instance, it connects an ethernet LAN with protection controller 10 as shown in this FIG. 4. Operation analyzing program module receiving means 11b and sending means 13b are partially achieved by this communication interface 10-4.

That is, the program module from communication network 30 is received here and transferred to RAM 2-2. The program module executed in digital processing unit 10-2 is sent to communication network 30 via this communication interface 10-4 and transferred to display controller 20 or another protection controller. A definite embodiment of the construction of the electric power system protection and control system is as described above.

Further, as an example of a communication network 30, it is composed of a network connecting protection controllers in a local range such as substation by an ethernet LAN, a network connecting personal computers and work stations in office and a wide area network connecting both the networks in a wide area, as shown in FIG. 4.

Further, the construction of the ethernet LAN is generally known and its explanation will be omitted.

Further, as a wide area network, switching networks such as telephone circuits are used. Display controller 20 described above is achieved by a personal computer shown in FIG. 4. Operation analyzing program module sending means 21b is achieved by a software in the personal computer and an interface circuit of an ethernet LAN.

According to this embodiment, as the operation analyzing work (in this embodiment, the collection of the operation information of controllers) so far performed by operator of protection controllers in changed so that it can be executed by the operation analyzing program module for operator. Accordingly, it is not required for a person to go to each substation for collecting the operating information of the protection controllers when a system fault occurs, and thus, it becomes possible to sharply reduce labor.

Further, the system has such a mechanism that the data obtained in connection with the controller operation can be added in the operation analyzing program module. As a result, it becomes possible for remote operator to easily get details of the operating contents of all controllers relative to system faults and to confirm them. Thus the operability of the system can be promoted.

Further, as the operation analyzing program module itself corresponding to the operation analyzing work that is so far performed by operator of the protection controllers is sent to the protection controller from the display controller via the communication network and is executed in the protection controller, the communication procedure shown in FIG. 45 is eliminated. As a result, the volume of communication on the communication network can be reduced, and reliability of the system also can be promoted.

Furthermore, the operation corresponding to requests and the same work so far performed for plural controllers are no longer needed. Operator is required only to send the operation analyzing program module to the communication network. As the operation analyzing program module itself is able to move among the protection controllers while obtaining, judging and adding the operating information in each protection controller autonomously as additional knowledge, no detailed instruction and check of operator are needed. As a result, it becomes possible to reduce the workload of operator and provide an electric power system protection and control system having a highly economical efficiency and reliability.

Figure 9:
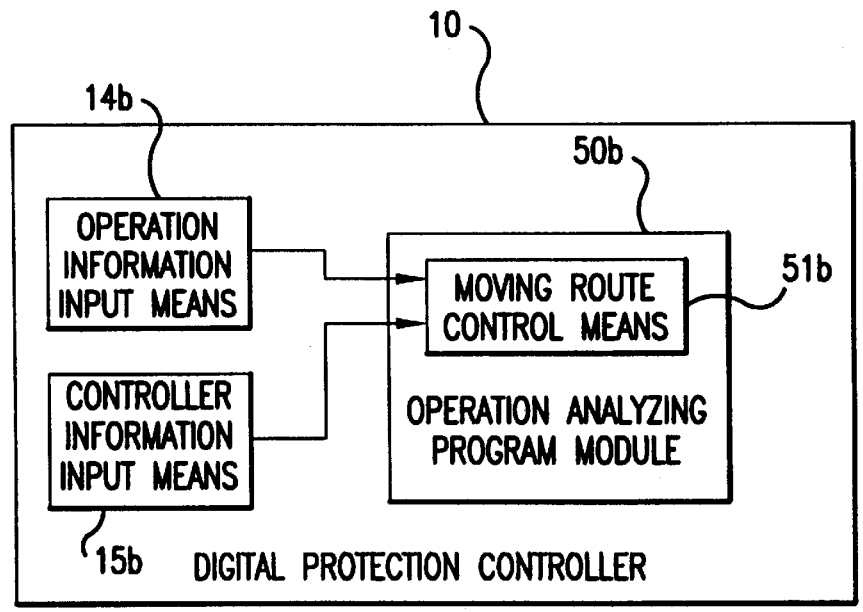
FIG. 9 is a diagram showing the construction of a part of an electric power system protection and control system according to a third embodiment of this invention.

FIG. 9 is a block diagram showing a part of an electric power system protection and control system according to a third embodiment of this invention. Further, FIG. 9 shows the status diagram of operation analyzing program module 50*b* that is receiving specified information in digital protection controller 10. In FIG. 9, the construction of operation analyzing program module 50*b* that is sent to protection controller 10 from display controller 20 and moves among the protection controllers explained in the embodiment described above is shown. Digital protection controller 10 is provided with an operating information input means 14*b* to give the controller operating information to this program module 50*b* and a controller information input means 15*b* to give information as to what range of an electric power system is made an object for the protection and control by the digital protection controllers. Operation analyzing program module 50*b* is provided with a moving route control means 51*b*, which controls the moving route of operation analyzing program module 50*b* according to these information and corrects the moving route based on the operating information and controller information of the controllers at the destination.

As a result, it becomes possible to control the optimum moving route of the operation analyzing program module corresponding to the operating state and the controller information of the protection controllers. Conventionally, in a digital relay, the range to be protected by each controller is decided and protected individually. On the other hand, when a system fault occurs, each digital relay performs the protection of the predetermined range to be protected. As operator has the information on the range to be protected by each controller, if a system fault occurs, operator goes to each substation to obtain the operating state of the related digital relay based on the occurring state of the system fault and the information owned by the operator on the protecting range.

Figure 10:
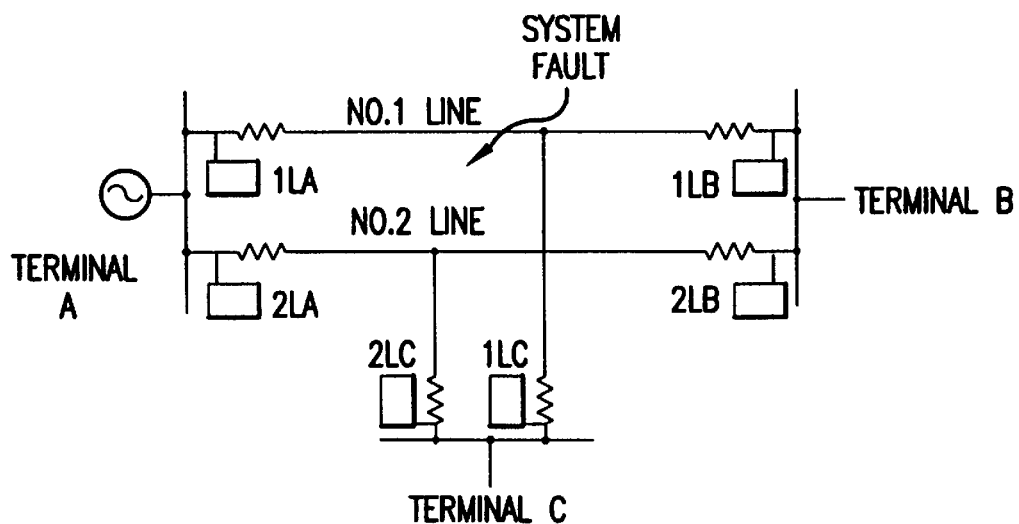
FIG. 10 is a diagram showing an example of an electric power system to which the third embodiment is applied.

For instance, in FIG. 10, total 6 controllers of current differential protective relays 1LA, 1LB, 1LC, 2LA, 2LB, 2LC are provided at terminals A, B, C for protection of 3 terminal parallel two circuit transmission lines. If a single line earth-fault occurs on No. 1 line of this system, operator judges that controllers 1LA, 1LB and 1LC relate to this system fault from the aspect of the system fault known from an oscillograph equipment etc. and the protection range of each digital relay (the transmission line section from own terminal to other two terminals). In order to obtain this operating information, operator goes to a substation wherein the controllers are provided, or communicates with each of the digital relays and collects the operating information individually using the remote operation monitoring system described above.

Accordingly, operator is needed to make the judgment as to which controller information should be obtained from the aspect of the fault and the protection range of individual relay. As a result, the workload including the information obtaining work of individual controller is much and complicated, and also, a human error tends to be produced. Further, if new faults occur frequently while obtaining information of individual controller, there is such a problem that another judgment and work for operator are required.

According to this embodiment, each digital relay has a table showing its own protecting range and the range of an electric power system related to relay elements stored therein by correlating the relay elements with related controllers as shown in FIG. 11. This is called as a controller information.

Shown in this FIG. 11 is an example in case of controller 1LA and a table showing which digital relay is related, when current differential protective relays 87S (for short-circuit) and 87G (for earth-fault) provided in controller 1LA operated. Further, as an operating information of the controller, for instance, in case of the earth-fault of No. 1 line, controller 1LA has such the operating information that shown in FIG. 11, in which the controller operating fault and the operating relay (87G in this case) are correlated.

According to this embodiment, when a system fault occurred, operator is needed to send the operation analyzing program module (the function of the second embodiment added with moving route control means 51*b* described above) only to one controller 1LA in this embodiment) that is considered to relate to this fault from the aspect of the fault obtained from an oscillograph equipment, etc.

At controller 1LA to which the operation analyzing program module is sent, after collecting such the relay operating state, electrical quantity, related information, etc. as shown in this embodiment, the above stated operating information is taken into operation analyzing program module 50*b* and collated with the above controller information by moving route control means 51*b*. As 87G is operating here, the program module moves to controllers 1LB and 1LC which are the controllers related to this fault to obtain the contents of operation similarly, and it is returned finally to the display controller which displays the obtained data to operator.

Figure 12A:
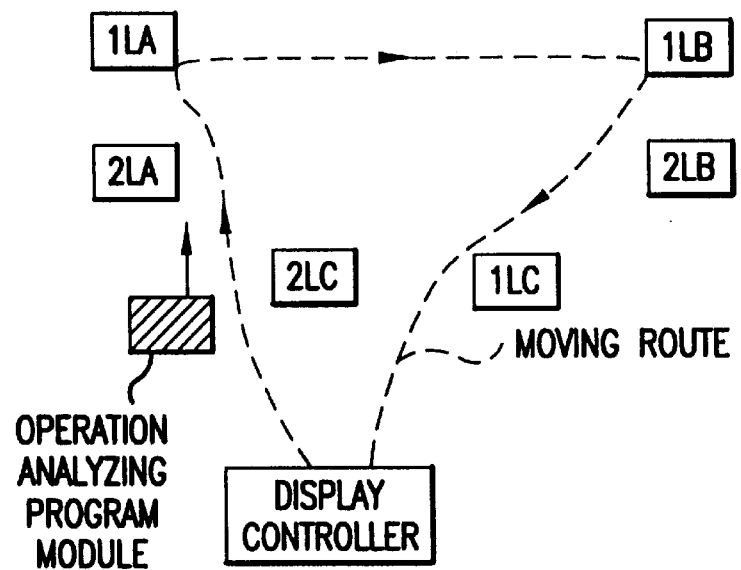
FIG. 12 is a diagram for explaining an action of the third embodiment.

Thus, without communicating with the controllers 1LB and 1LC and requesting information by operator, the operation analyzing program module decides the moving route autonomously and moves from the information retained by the digital relays. This state is shown in FIG. 12 (A). Further, if a new fault occurs while moving (for instance, moving from 1LA to 1LB), the newly occurred fault and operating relay element are added to the operating information.

Figure 12B:
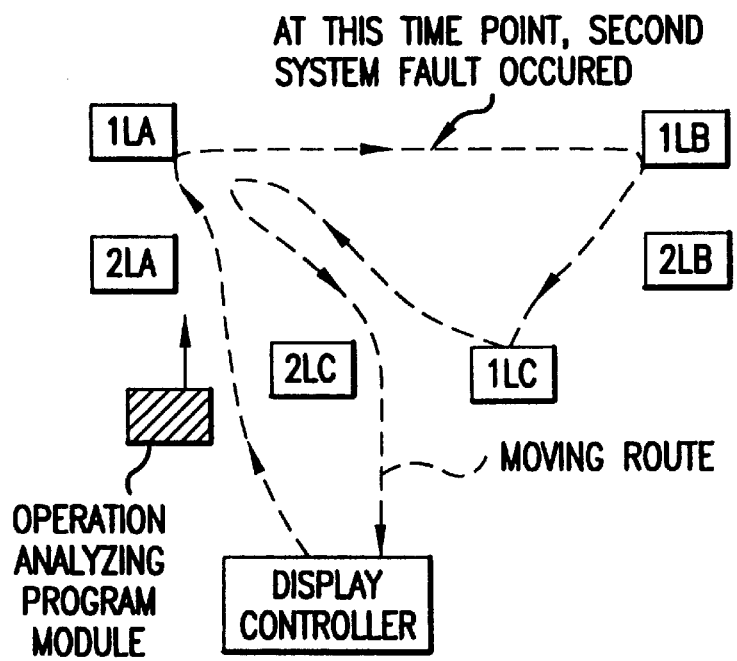

Thus, when this program module arrives at 1LB, it is able to recognize that the related controllers are 1LC and 1LA from the controller information and this updated operating information. After obtaining the contents of operation at 1LB, the program module moves to controllers 1LC, 1LA and the display controller to obtain the contents of operations. Here, as the operating contents of 1LA at the initial fault was obtained, the operating contents only at the second fault are obtained. Thus, even when plural faults are taken place continuously, all of them can be conveyed to operator. This state is shown in FIG. 12(B).

As described above, according to this embodiment, it is so made that the operation analyzing program module has own moving route and obtain the contents of operations of the controllers, by deciding a moving route by referring to the controller information and operating information retained by the protection controllers or while correcting a moving route for successively occurring system faults. Accordingly, it becomes possible to minimize the workload of operator without causing human errors and provide an electric power system protection and control system having a high economical efficiency, reliability and operability.

Further, faults occurred in the protecting section only are made objects of the controller information in the above embodiment. But, the operation analyzing program module is able to collect the operating information in the fault taken place in a wider range when the controller information is set to include the faults taken place outside the protecting sections. For instance, when an undervoltage relay (27) with an operating quantity of a bus voltage common to No. 1 and 2 lines and controllers (6 controllers shown above) corresponding to this relay (27) are registered in the operating information in the above embodiment, the undervoltage relay operates against faults of both No. 1 and 2 lines, and therefore, the operation analyzing program module is able to move to all of the 6 controllers and to collect the contents of their operations.

Thus, even when the controllers did not operate properly at complicated faults, there is such a merit that information about the relative controller can be easily collected in this modification, its effect is the same. Further, even when the controller information is not retained in the digital relay, but all controller informations of all objective controllers are retained collectively in the display controller and are given to the operation analyzing program module when it is sent out, its effect is the same.

Figure 13:
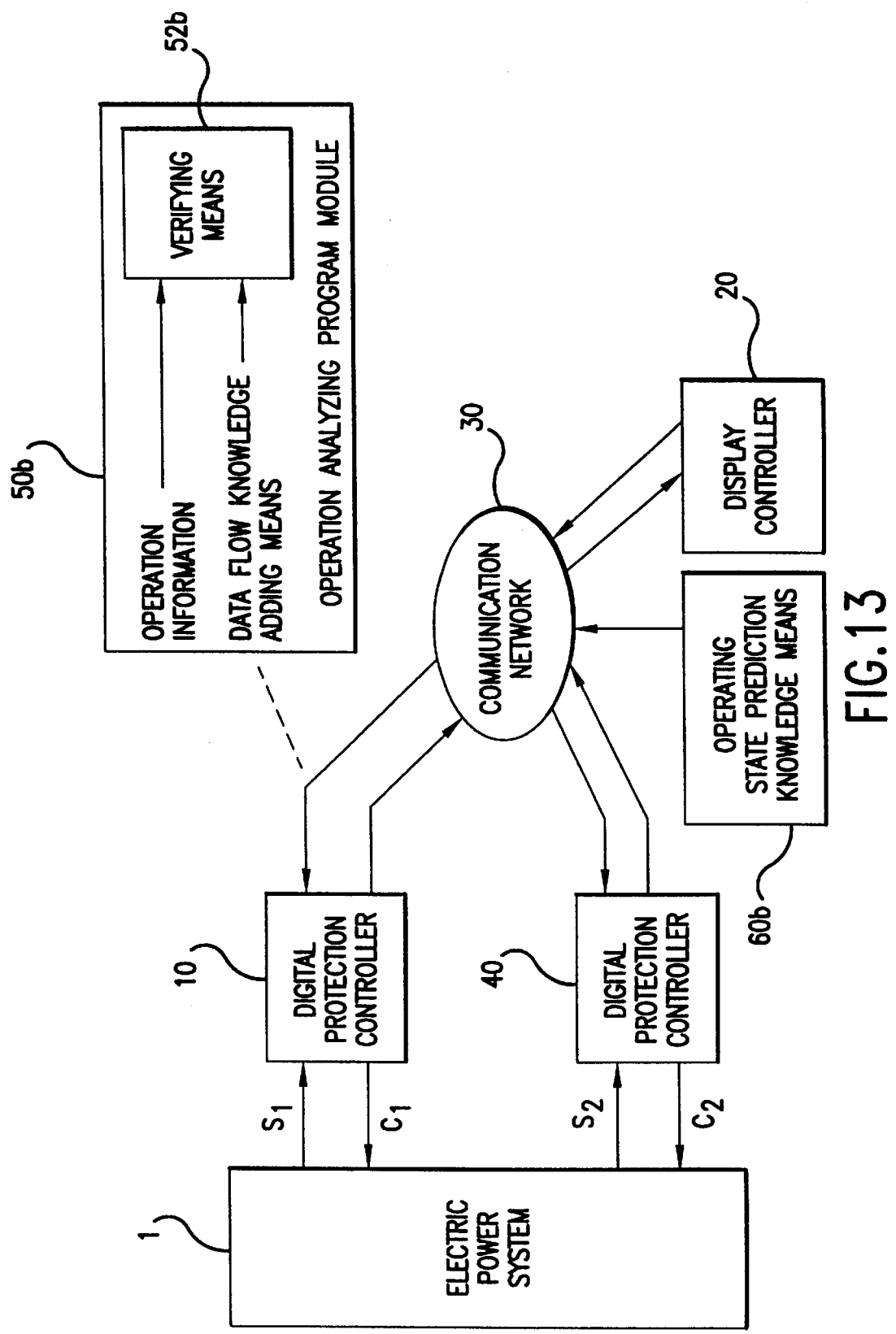
FIG. 13 is a diagram showing the construction of an electric power system protection and control system according to a fourth embodiment of this invention.

FIG. 13 is a block diagram showing the construction of an electric power system protection and control system according to a fourth embodiment of this invention.

Figure 40:
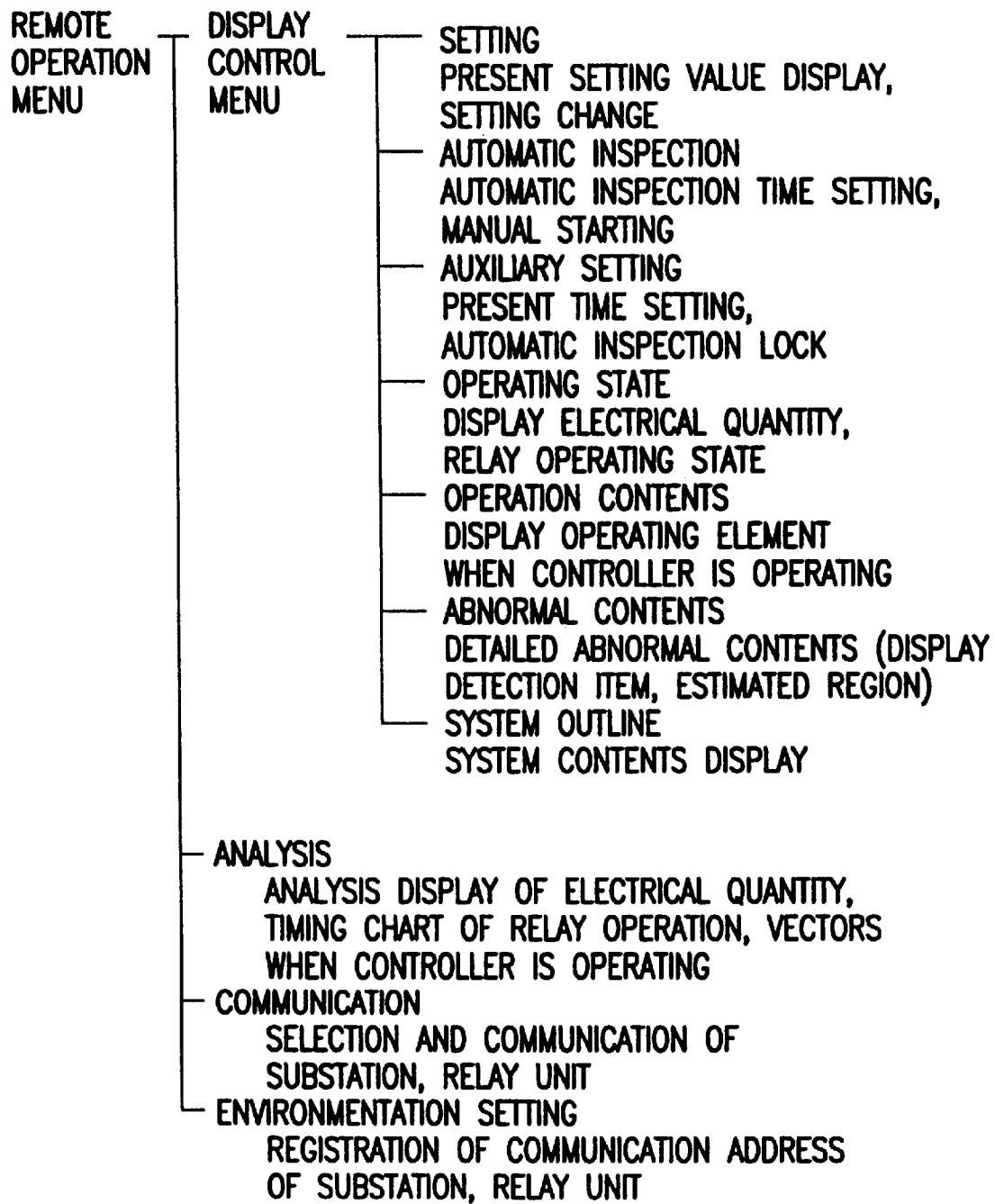
FIG. 40 is a diagram showing one example of a remote control system menu.
Figure 41:
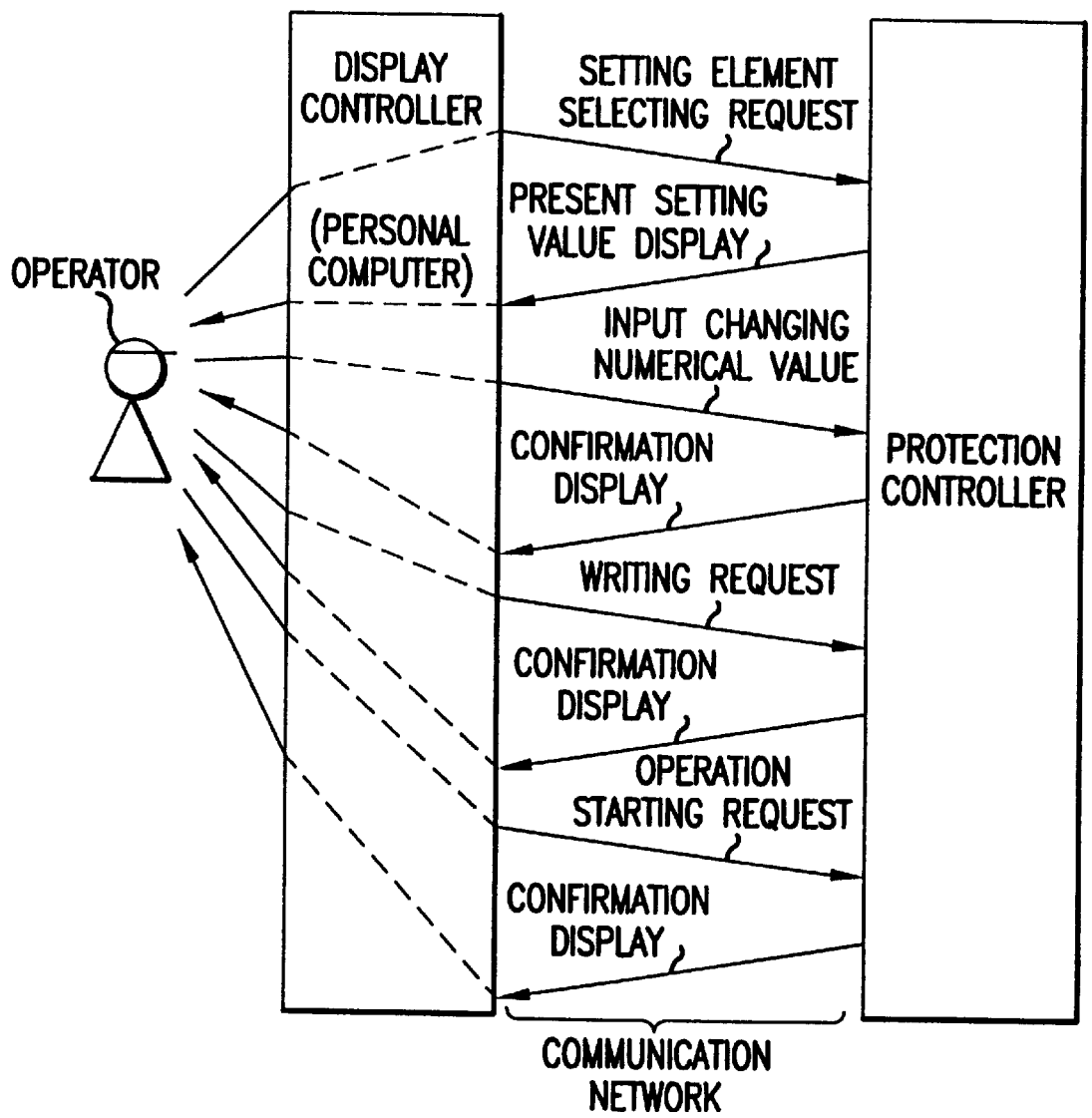
FIG. 41 is a diagram for explaining an action of a conventional electric power system protection and control system.
Figure 42:
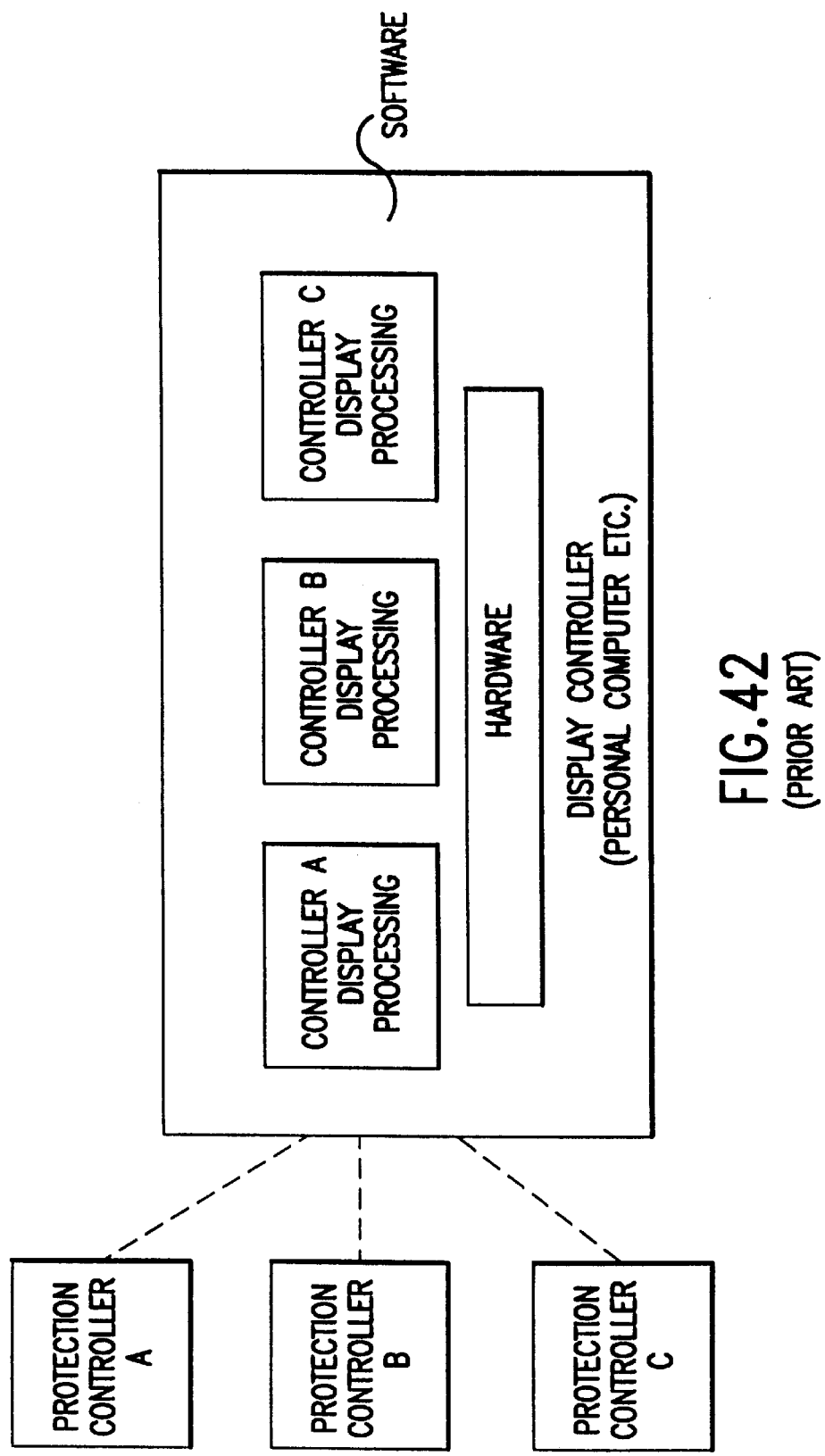
FIG. 42 is a diagram showing the construction of an example of a conventional electric power system protection and control system.
Figure 43:
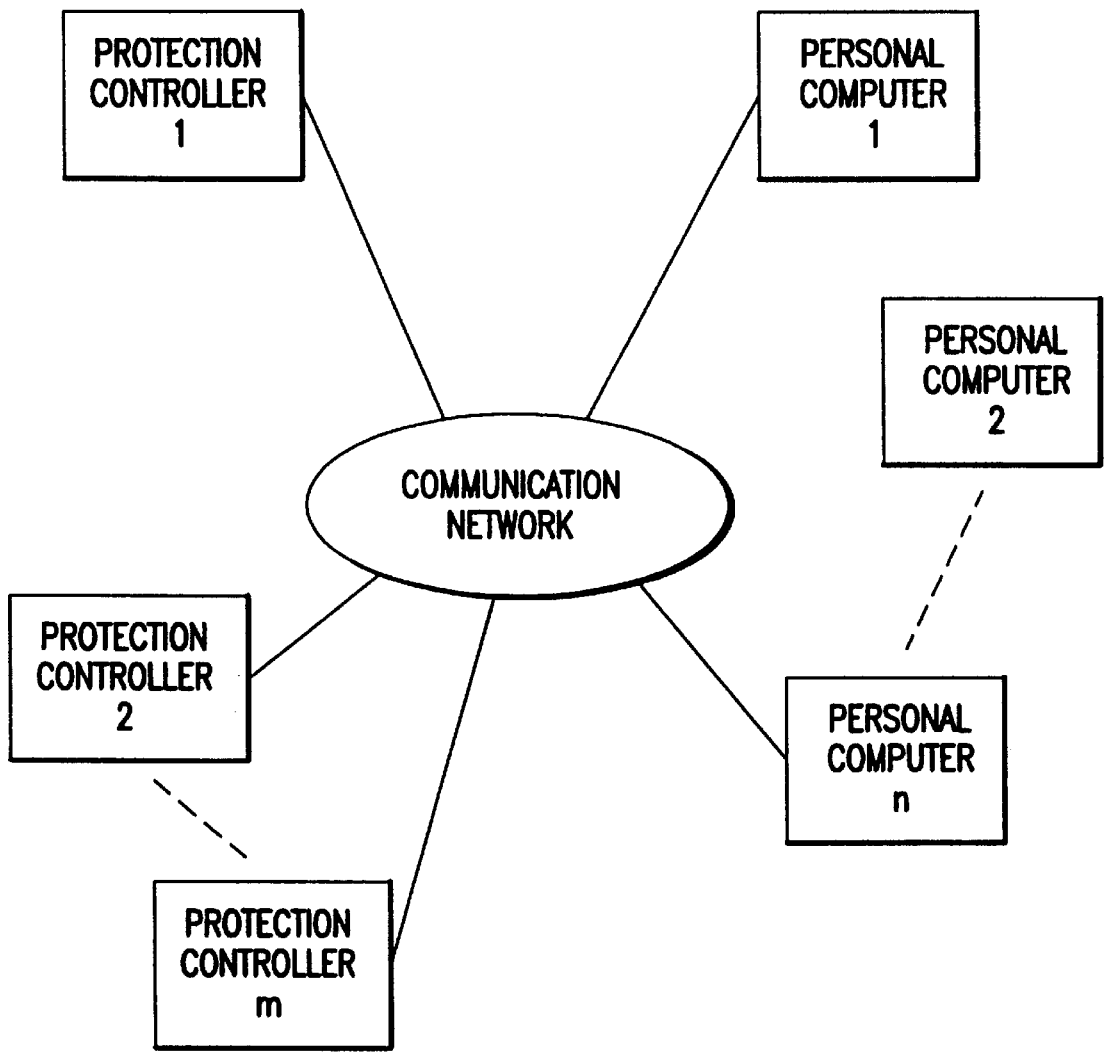
FIG. 43 is a diagram showing the construction of another example of a conventional electric power system protection and control system.

In FIGS. 13, 10 and 40 are digital protection controllers, 20 is display controller and 30 is communication network, and the construction is the same as that in the above embodiment and the detailed description will be omitted. In this embodiment, an operating state prediction knowledge base 60b storing the knowledge predicting the operating state at a system fault occurred is provided. Further, a verifying means 52b to verify validity of the operation of the protection controller by comparing the operating information collected by operating analyzing program module 50b with data from this knowledge base 60b is provided in operation analyzing program module 50b.

Here, operating state prediction knowledge base 60b is realized by a work station or a personal computer. It is a data base to correlate how the relay elements stored in the digital relays operate against predicated various faults of an objective electric power system. It is prepared in advance from the simulation of the objective electric power system.

For instance, when the electric power system shown in FIG. 10 is an object for the protection control, the contents of above knowledge base 60b takes such a form as shown in FIG. 14(A), and the predicated operation of the relay elements of the digital relays are correlated with the fault aspects. Operator gives this knowledge base 60b to operation analyzing program module 50b. According to the second embodiment of this invention, if a system fault occurs, the operation analyzing program module moves to related controllers successively to collect the contents of their operations. If the fault is the earth-fault of No. 1 line shown in FIG. 10, the relay operating states in the contents of the operation will be as shown in FIG. 14(B).

In this embodiment, the data in above knowledge base 60b are compared with this relay operating states by verifying means 52b in the operation analyzing program module. For instance, in case of the earth-fault of No. 1 line, the predicted operating relays of knowledge base 60b are 1LA, 87G, 1LB, 87G, 1LC, 87G, and the contents of operation obtained by operation analyzing program module 50b from the controllers as shown in FIG. 10 are the same, and it can be judged that the operations of the controllers are valid.

The operation analyzing program module displays this result when returned to the display controller after moving to the controllers. As a result, operator is able to know the contents of the operations of the controllers and the validity of the controller operations at the same time. On the contrary, if the contents of the knowledge base do not agree with those of the controller operations, for instance, if relay 87G of controller 1LC does not operate, it is verified by the verifying means and displayed for operator, who is able to investigate controller 1LC upon seeing the display. Conventionally, such the validity verification was made and judged by operator from his own knowledge after grasping the operating state of each digital relay individually, and accordingly both the operation and work were complicated when complicated failures occurred.

According to this embodiment, as the validity verification between the information from the knowledge base and the operating information are executed in the operation analyzing program module, while moving among controllers, the validity can be verified efficiently and rapidly. Further, as the validity verification that is conventionally judged by operator is now executed by the operation analyzing program module autonomously and operator obtains its result only, the burden on operator can be minimized.

Further, if the validity is found to be a problem when the program module is moving among the controllers, it is possible for the program module to return to the display controller after collecting the automatic supervising information relative to that controller. Thus, operator is able to rapidly obtain information relative to the controller that is possibly defective. Thus, it is possible to provide an electric power system protection and control system having highly economical efficiency, operability and reliability.

Further, in the above embodiment operator gives related data from the knowledge base to the operation analyzing program module. But the operation analyzing program module may move to the knowledge base autonomously and moves to the digital relays after obtaining related data, and in this cases, the effect is the same. Further, in this case, the knowledge base should have the communication interface and the program module receiving and sending means likewise the digital relay.

In addition, in the above embodiment, both the knowledge base and the operating information are limited to the state wherein the relays are in operation. But it is also possible to promote the accuracy of the validity verification by adding electrical quantities and various related information, when system failures occur, to the knowledge base and operating information. The effect in this modification is also equivalent to that in the above embodiment.

Figure 15:
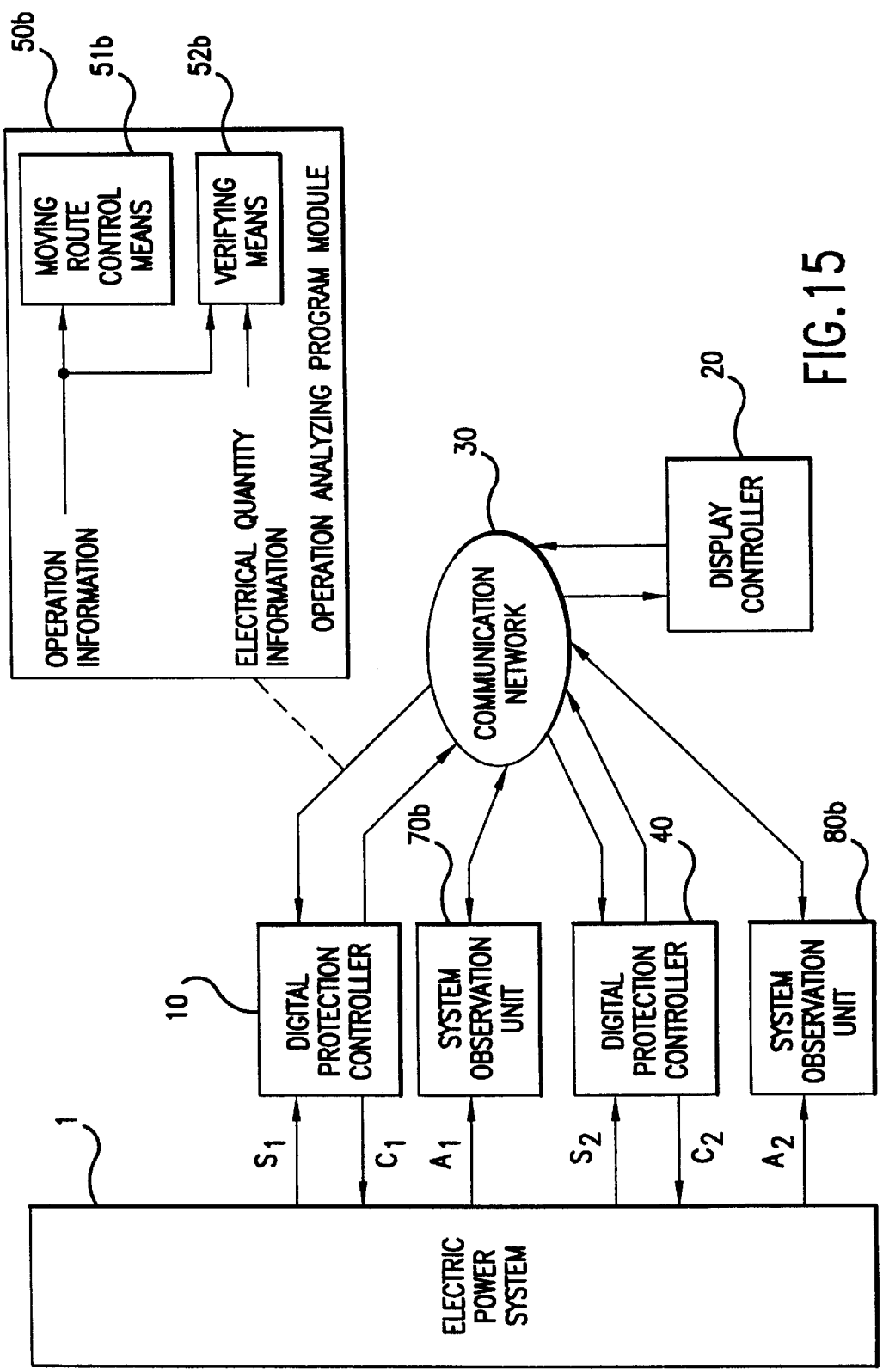
FIG. 15 is a diagram showing the construction of an electric power system protection and control system according to a fifth embodiment of this invention.

FIG. 15 is a block diagram showing the construction of an electric power system protection and control system according to a fifth embodiment of this invention. In FIG. 15, 10 and 40 are digital protection controllers to perform the protection and control of electric power system 1 with inputs of status quantities S1, S2 from electric power system 1 which is an object of the protection and control and with protection and control outputs C1, C2 to electric power system 1. Further, display controller 20 is to remotely operate digital protection controllers 10, 40 via communication network 30. These are the same as in the second embodiment and the explanation will be omitted.

System observation units 70b, 80b are units to take and accumulate electrical quantities A1, A2, respectively from electric power system 1 that is an object of the protection and control, and an oscillograph equipment is a representative unit therefor. The detailed construction of these units is the same as the construction of the digital relay shown in FIG. 4.

Further, operation analyzing program module 50b is a program module that is sent out of display controller 20, received and executed by protection controllers 10, 40 and system observation units 70b, 80b. The basic construction of this program module is the same as the construction of the second embodiment. In this embodiment, this program module is provided with route control means 51b to controls the route to system observation unit 70b or 80b with which this program module 50b is related based on the operating information obtained from protection controllers 10, 40 when system faults occur, and a verifying means 52b to verify the validity by comparing the electrical quantities collected from system observation units 70b, 80b with the above operating information.

So far, when system faults occur, operator makes the state of the faults clear by obtaining current and voltage waveforms at the time of fault from the system observation unit to know the state of faults, and further, checks validity between the electrical quantities obtained by of the system observation unit and the operating state of the protection controllers by obtaining them.

For instance, operator recognized whether a fault was an earth-fault or a short-circuit fault and a continued time of the fault from instantaneous waveforms of current, voltage obtained from the system observation unit and checked the validity whether the relay operating state of each protection controller was valid, unnecessary relay elements were operated or relay elements to be operated were properly operable.

Therefore, operator was needed to obtain data from both of the system observation units and the protection controllers and make the judgment. In particular, if a fault occurs in a wide range and is complicated, the data analysis from many system observation units and protection controllers becomes necessary and workload may increase and human error may result.

This embodiment is to solve such problems and its operation will be described below. First, when a system fault occurs, operator sends out the operation analyzing program module of this embodiment to a protection controller that has been operated for the system fault. This is the same method as that shown in the second embodiment.

This sent operation analyzing program module obtains the operating information from each protection controller. When assuming that, for instance, a fault occurred in the system in FIG. 10 shown in the above embodiment and such the operating information as shown in FIG. 14(B) was obtained. Generally, the system observation unit is started by the relay operation of the protection controller and the electrical quantities before and after the system fault are accumulated.

Accordingly, this program module is able to know that related system observation units were started by obtaining the operating information of the protection controllers. By providing a table correlating the operating information with the system observation units to the route control means, this program module, by referring to this table, moves to a corresponding system observation unit and collects the accumulated electrical quantity.

Further, validity of the operation of the protection controllers is verified by the verifying means by comparing the state of the collected system electrical quantities (magnitude of current, voltage and phases between electrical quantities) with the operating information of the protection controllers. For instance, in FIG. 14(B), the current differential relay (87G) is in operation and the setting value for operation of this relay is 1,000 amperes, if current at the fault obtained from the system observation unit is above this set value, the operation is judged to be valid. Thus, by providing a rule to be able to verify the validity in the verifying means by correlating the system electrical quantity and responded relay operation, it is possible to judge validity of the controller operations.

Figure 16:
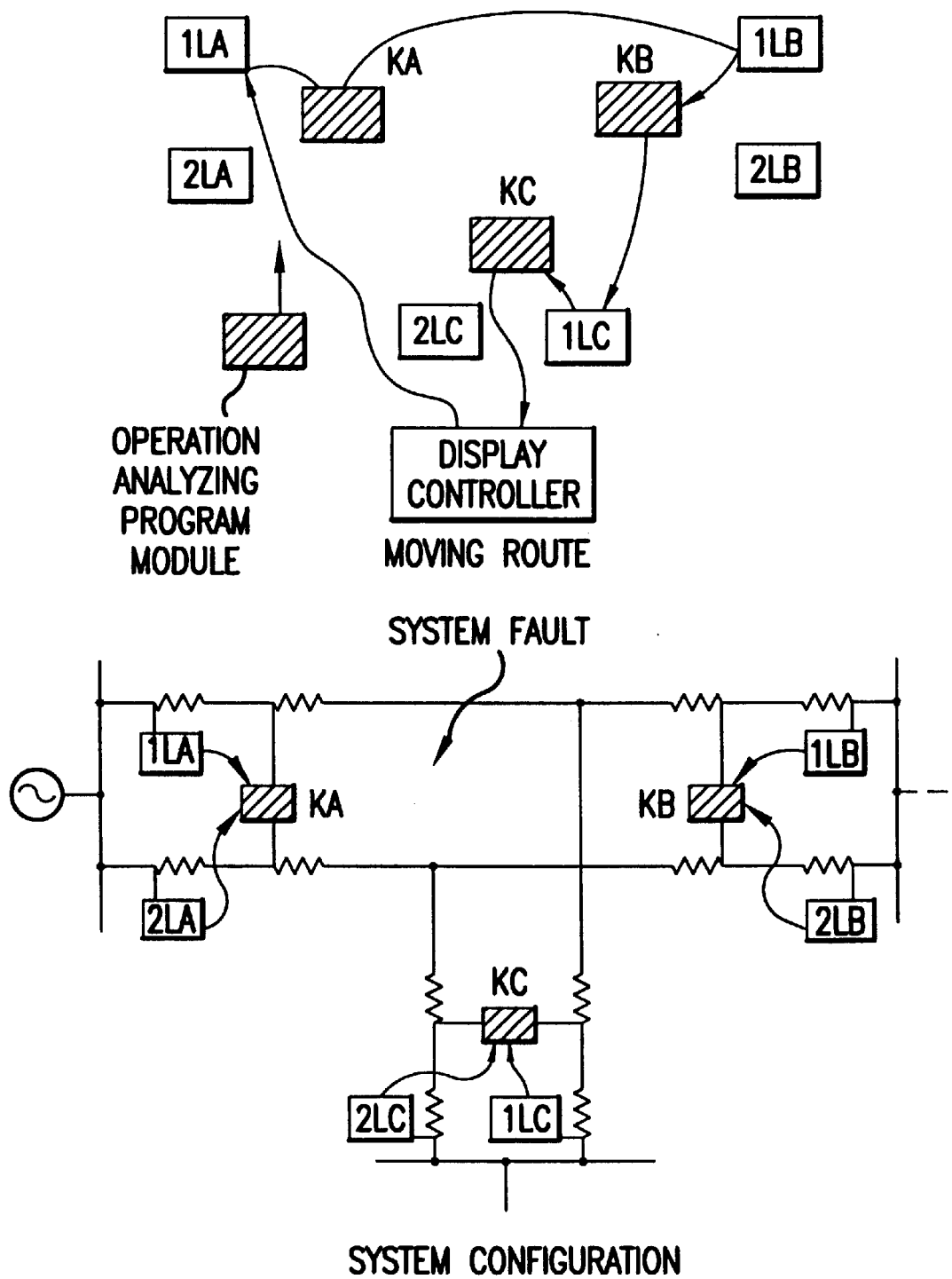
FIG. 16 is a diagram for explaining an action of the fifth embodiment.

An example of the installation of the system observation units when taking electrical quantities of No. 1 and 2 lines and the moving route of the operation analyzing program module are shown in FIG. 16. As shown in FIG. 12, the operation analyzing program module efficiently moves to the protection controller and the system observation unit at each terminal in order, collects the operating information and system electrical quantities, verifies validity between them and finally, informs operator the result by way of the display controller.

According to this embodiment, as the operation analyzing program module collects not only the operating information of the protection controllers but also electrical quantities of the system observation units and is able to decide its moving route autonomously. Further, it can verify the validity of the controller operation from the collected information and display the result to operator. Accordingly, it is possible to provide an electric power system protection and control system that is easy to operate, economical and capable of minimizing the workload of operator, as the required information is efficiently obtained by sending this program module only once.

Further, the moving route of the operation analyzing program module is so set that it is moved to the system observation unit installed at the same terminal as the protection controller in the above embodiment. But, when a specific relay element and the route control are combined, it becomes possible to collect electrical quantities of system observation units in a wider range. For instance, in the system shown in FIG. 16, it is registered in the route control means for the operation analyzing program module to move to system observation units KA, KB and KC by the operation of such relay elements having no directivity as an overcurrent relay and undervoltage relay of controller 12A. The operation analyzing program module is able to collect the electrical quantity information of 3 terminals autonomously when external system fault occurs and it becomes effective in the controller operation analysis. The effect of this modification is the same as the above embodiment.

Further, the operating state of the relay is used as the controller operating information for the validity verification in the above embodiment. But, when the electrical quantities obtained in the protection controllers are further used and compared with the electrical quantities of the system observation units, it becomes possible to make the verification up to the analog-to-digital conversion unit and the relay computation. As a result, the accuracy of the validity verification is increased and the effect of this modification is also the same as the above embodiment.

Further, this invention is not limited to an electric power system only. But this invention is also applicable to a distributed control system composed of plural distributed controllers to control equipments to be controlled by taking status quantities therefrom and a display controller connected to these distributed controllers via a communication network to display and control for monitoring the operations and status of distributed controllers (or a program storage unit to store an operation analyzing program module that is capable of operating on the distributed controllers). In this case, in the embodiments described above, the protection controllers should be read as the distributed controllers.

Figure 17:
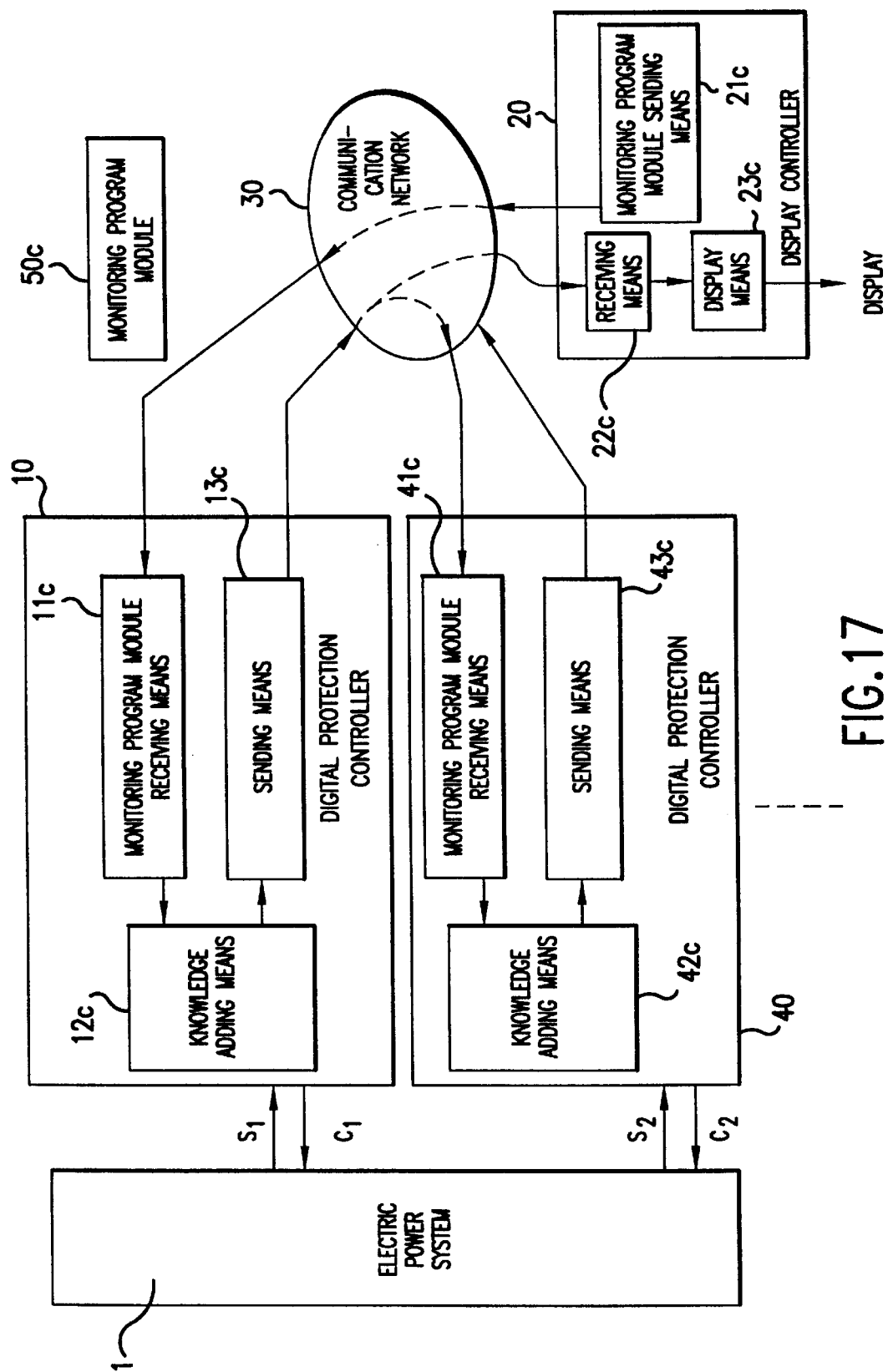
FIG. 17 is a diagram showing the construction of an electric power system protection and control system according to a sixth embodiment of this invention.

FIG. 17 is a block diagram showing the construction of an electric power system protection and control system according to a sixth embodiment of this invention.

In FIG. 17, 10 is digital protection controller to carry out the protection and control of electric power system 1 by inputting status quantity S1 from electric power system 1 that is a subject to the protection and control and outputting protection and control output C1 to electric power system 1. It is composed of a monitoring program module receiving means 11c, a knowledge addition means 12c and a sending means 14c.

Further, display controller 20 remotely operates a plurality of controllers like digital type protection controller 10, and controller 40 of same configuration, etc. via communication network 30. It is provided with a monitoring program module sending means 21c, a receiving means 22c and a display means 23c.

As its operation, first monitoring program module 50c is sent out via communication network 30 by monitoring program module sending means 21c in display controller 20. Monitoring program module 50c in this embodiment is a program module with function to perform the correspondent to patrolling work described above, which the description of data and to process it has been incorporated.

For instance, as functions the following are realized:
1. To acquire the automatic checking executing number of each controller, and to judge whether it is normal.
2. To acquire the electrical quantity fetched to each controller, and to judge whether it is normal.
3. To acquire the relay operating state of each controller, and to judge whether it is normal.
4. To acquire the abnormal contents (automatic supervising result) of each controller, and to judge whether it is normal.

The data and procedures to realize the above functions are as follows:
Data:
1. Automatic checking number validity standard (Whether the acquired value surpasses that in the former time, and whether it is the same automatic checking number of another controller which begins its operation at the same time)
2. Electrical quantity validity standard (Whether it is in the specified range and whether it is balanced in three phases)
3. Relay operating state validity standard (Whether or not the relay element other than the relay element which operates by the power flow.)
4. Abnormal contents validity standard (Whether or not even in other controllers a same failure is detected, that is to say, a failure factor is not outside the controller)

Procedure:
1. To acquire the automatic checking executing number, and to judge whether it is normal by comparing with the automatic checking number validity standard.
2. To acquire the electrical quantity fetched to each controller, and to judge whether it is normal in comparison with the electrical quantity validity standard.
3. To acquire the relay operating state of each controller, and to judge whether it is normal in comparison with the relay operating state validity standard.
4. To acquire the abnormality contents (automatic supervising result) of each controller, and to judge whether it is normal in comparison with the abnormality content validity standard.

In this respect, the data also include a moving route designated in what moving route the program module moves to a plurality of protection controllers. Monitoring program module 50c configured and sent out as described above, is received by monitoring program module receiving means 11c in digital type protection controller 10 via communication network 30. Thereafter, it is put in knowledge addition means 12c, where program module 50c is executed. Concretely, the procedure for the processing of monitoring program module 50c is executed.

This state is shown in a flow chart in FIG. 18. First, in S1-1c the state in object in the protective controller, that is to say, automatic checking executing number, electrical quantity, relay operating state, and abnormal contents are acquired. In S1-2c this acquisition result is compared with the above validity standard as to each item, and in S1-3c the judgment is carried out whether the acquisition state is in the validity standard by this comparison result.

For instance, as to the automatic checking executing number, the acquired state is executing number of 80. If the previous executing number in the data stored in monitoring program module 50c is 79, due to the fact that 1 is increased in this time, it is judged that the inspection is normally conducted. (In this respect, here it is a premise that a cycle in which monitoring program module 50c is sent out to carry out this execution is same as the cycle in which the protection controller executes the automatic checking.) Further, it is judged whether it is the same automatic checking executing number of another controller which begins its operation at the same time.

The monitoring program module can recognize that in such a way the protection controller normally carries out the automatic checking, and the automatic checking function normally functions.

Further, by judging whether the electrical quantity acquired similarly as described above is in the specified range stored in the monitoring program module, or equalized at three phases, the monitoring program module can recognize that the analog-digital conversion unit of the protection controller is normal.

Further, if the relay operating state similarly acquired is in accordance with the validity standard (for example, it is judged as normal that the relay element is now operating which is operated by the power flow, and so on), it is determined as normal. If it does not accord with the validity standard, the monitoring program module can recognize that the protection controller is abnormal.

Further, regarding the abnormality content similarly acquired, it is compared with the validity standard (for example, whether another controller does not detect the same failure) stored in the monitoring program module. If the same failure is not generated in another controller, the monitoring program module can recognize that there is an abnormality in the controller itself which is in object at present.

For four validity standards, they are compared with the acquired data, respectively, in S1-2c, and these comparison results are judged in S1-3c. If all the items are found in the validity standards, that the execution result of this monitoring program module is good is added as a knowledge of this monitoring program module in S1-4c. Concretely, it is added as one of the above data. Further, if even one of the items is found out of the validity standard, it is added as a knowledge of this monitoring program module in S1-5c that the execution result of this monitoring program module is defective.

Finally the automatic checking executing number, the electrical quantity, the relay operating state and the abnormality contents acquired in S1-1c are added as a knowledge of this monitoring program module in S1-8c. Concretely, they are added as a data of the monitoring program module. The monitoring program module is executed by the procedure as above described, its execution result is acquired, and the knowledge is added to the monitoring program module.

In this knowledge added, the automatic checking executing number, the abnormality contents, etc. are used also as the data of validity standards at the time this monitoring program module is transferred to another controller. In such a way this monitoring program module is transferred to each protection controller, executed at the transfer destination and acquired the result to add the knowledge sequentially,.

The execution result executed as mentioned above (the result whether the monitoring result is good or not) and the monitoring program module added by the knowledge are returned to display controller 20 or transferred to another protection controller 40 via communication work 30. Hereupon, as to whether the return to display controller 20 is carried out, or whether the transfer to protection controller 40 is carried out, the selection is possible by an instruction from an operator to the monitoring program module. That is to say, if the return is found each time the end of monitoring each protection controller in the display controller, an operator comes to know more quickly the monitoring result.

On the one hand, after being transferred to other controllers and ending the execution of the monitoring program module in all the controllers in object of the monitoring, if it is returned finally to the display controller, it is an advantage that an operator is enough with the display confirmation of only one time. Even in protection controller 40, the similar means to the above protection controller 10, that is to say, a monitoring program module receiving means 41c, knowledge addition means 42c and a sending means 43c are provided. First of all, the monitoring program module is received by monitoring program module receiving means 41c, it is executed similarly and the knowledge is added as above described in knowledge addition means 42c, and the execution result and the program module are returned to display controller 20 by sending means 43c, or further it is transferred to another protection controller, and then the processing similar as described above is carried out.

Hereupon it is possible that only the execution result is returned to the display controller every time, and the monitoring program module is transferred to another protection controller, by the designation of an operator. The monitoring result and the monitoring program module transferred between protection controllers and returned back in such a way are received and displayed by receiving means 22c and display means 23c of display controller 20. As the display, a list is displayed in display controller 20 composed of the monitoring result of each protection controller and contents (for example, automatic checking executing number, the electrical quantity, etc.) added by each protection controller as the knowledge of the monitoring program module.

A definite example of construction of this embodiment is shown in FIG. 4. Digital protection controller 10 is composed of analog-to-digital conversion unit 10-1, digital processor 10-2, input/output interface 10-3 with external equipments such as a circuit beaker, etc. communication interface 10-4 to interface, communication network 30 with this protection controller 10, and bus 10-5.

All units of 10-1 through 10-4 are connected to each other via bus 10-5. Here, the component elements other than communication interface 10-4 are the same as those described for prior art as shown in FIG. 44. This invention differs from a conventional protection controller in that a part of the program module (the monitoring program module in this embodiment) is sent to RAM 2-2 via communication interface 10-4 from communication network 30 and processed as a program in digital processor 10-2.

The present invention features that the monitoring program module is sent to RAM 2-2 via communication network 30 and transferred to a RAM of another protection controller, while in the conventional protection controller, programs are fixedly written in ROM 2-3. This digital processor 10-2 composes knowledge addition means 12c, and a part of receiving means 11c and sending means 13c.

Further, communication interface 10-4 is one of the features of this invention, and for instance, it connects an ethernet LAN with protection controller 10 as shown in this FIG. 4. Monitoring program module receiving means 11c and sending means 13c are partially achieved by this communication interface 10-4.

According to this embodiment, the work for a patrol which is conventionally carried out by an operator of protection controllers is carried out by substituting the monitoring program module. As a result, it becomes for any operator to go to each substation for a patrol of each protection controller, and a sharp labor saving becomes possible. Furthermore, as it is so constructed that the monitoring result and acquired data are added sequentially in the monitoring program module, a remote operator is able to confirm by acquiring easily details of monitoring contents. As a result, the operability can be improved.

Figure 46:
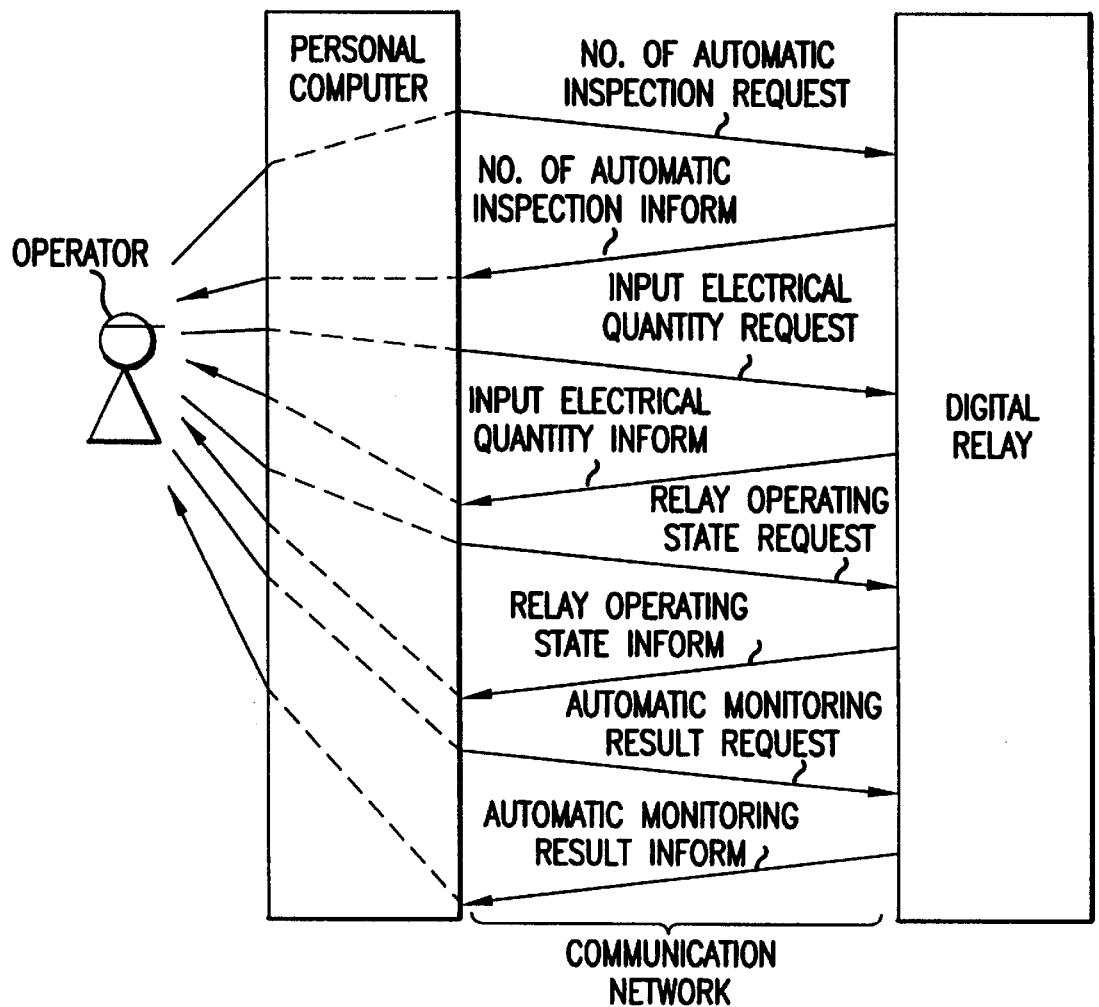
FIG. 46 is a diagram for explaining an action of another conventional electric power system protection and control system.

Further, in this embodiment, the program module itself, corresponding to the work which conventionally an operator for a patrol of protection controllers carries out, is sent from the display controller to the protection controller via the communication network, and executed in the protection controller. The communication procedure as shown in FIG. 46 is omitted, a traffic on the communication network can be made little, and the reliability can thereby be improved.

Further, according to this embodiment, the operation corresponding to each demand and the work to carry out the same job against a plurality of protection controllers as conventionally are-not necessary, and an operator only sends out the monitoring program module to the communication network. The monitoring program module itself autonomously acquires the state in each protection controller, judges the acquired result and adds it as knowledge, and then it transfers between protection controllers. Accordingly, no instruction or confirmation are required by one by one by an operator, and the workload of an operator can be reduced. As a result, an electric power system protection and control system of high economical efficiency and reliability can be offered.

Further, in comparison with the automatic supervising function mounted in the conventional protection controller, the monitoring program module described in this embodiment becomes the style to compare the states of a plurality of protection controllers. Accordingly, in comparison with the conventional automatic supervising function, the monitoring with high accuracy and in a wide range can be realized according to this embodiment.

FIG. 19 is a block diagram showing the construction of a part of an electric power system protection and control system according to a seventh embodiment of this invention. FIG. 19 shows the configuration of monitoring program module 50c sent out from display controller 20 to the protection controllers, and transfers between protection controllers. As shown in FIG. 19, it is characterized in that it is provided with a moving route control means 51c and an abnormality detection means 52c. By this, it comes to be possible to carry out the most suitable moving route control of the monitoring program module corresponding to the state of the protection controller.

Figure 20:
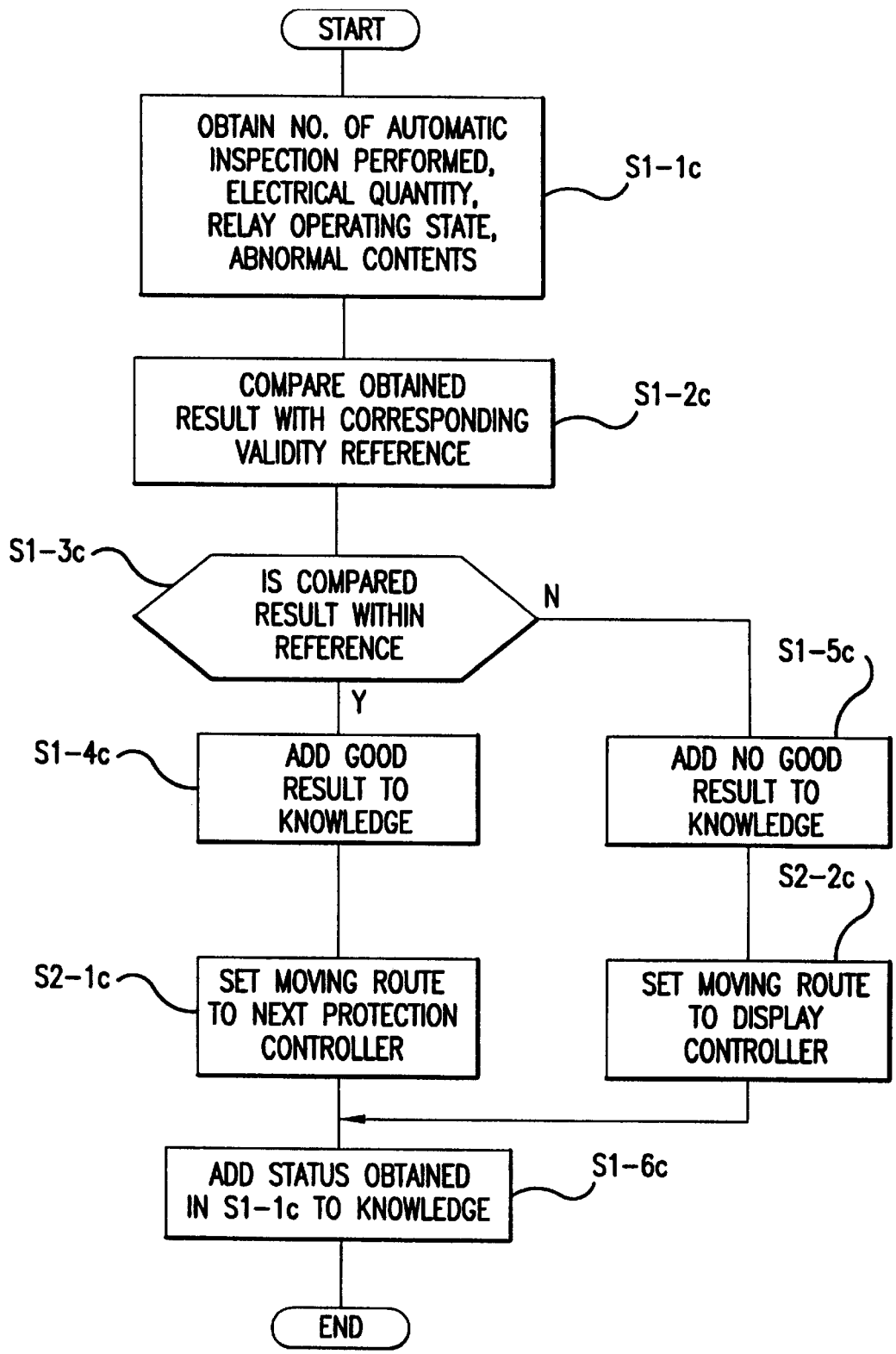
FIG. 20 is a flowchart showing the processing contents of the seventh embodiment.

The concrete operation is explained by employing a flowchart in FIG. 20. In FIG. 20, since steps S1-1c through S1-6c are knowledge addition means already indicated in the seventh embodiment, the explanation thereof is omitted. Among these, steps S1-2c and S1-3c correspond to abnormality detection means 52c of this embodiment. The judgment is carried out in S1-2c and S1-3c whether the acquired data in S1-1c are in the validity standard, and in case that the controller in object is judged as normal, the moving route is set to the next protection controller by S2-1c.

The monitoring program module is sent out to the following protection controller by sending means 13c shown in the sixth embodiment according to the moving route set. In case that it is judged as an abnormal in S1-3c, the moving route is set in the display controller by S2-2c. By this, the monitoring program module is returned to display controller 20 by sending means 13c. The control of the above moving route is realized in the monitoring program module.

Figure 21A:
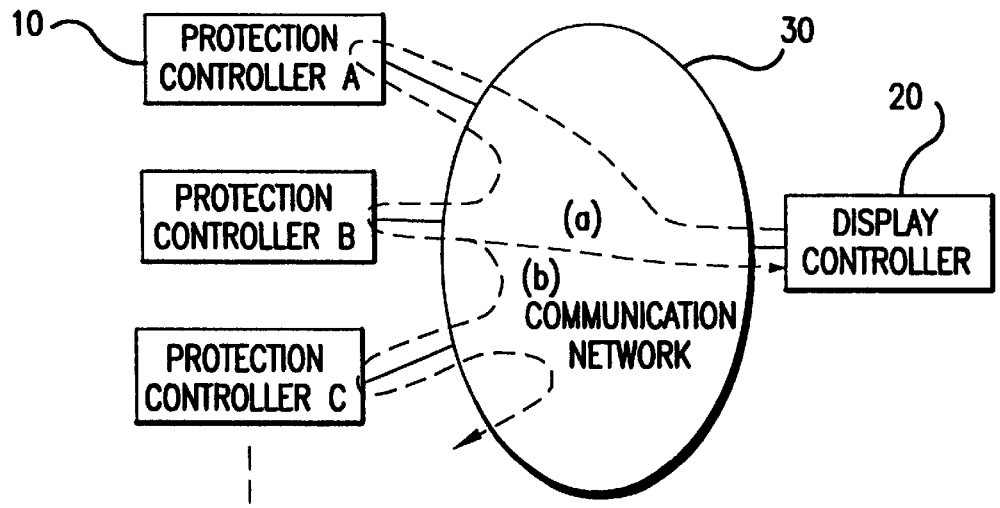
FIG. 21 is a diagram for explaining an action of the seventh embodiment.

The state of transfer of the monitoring program module in case the moving route is controlled in such a way is shown in FIG. 21(a). In FIG. 21(a), the monitoring program module sent from display controller 20 transfers along dotted lines in the figure. Here in case that a protection controller A is normal, it is transferred to a next protection controller B. Here in case that an abnormality of the protection controller is detected by above steps S1-2c and S1-3c, a route ("a") is selected by S2-2c, and the monitoring program module is returned to display controller 20. In case that the protection controller is normal, a path ("b") is selected by S2-1c, and the monitoring program module is transferred to a next protection controller C.

According to this embodiment, it has been designed so that a moving route may be changed by the state of the protection controller by providing means for controlling a moving route in the monitoring program module. By this, in case that an abnormality occurs in the controller, the monitoring program module is immediately returned to the display controller. Accordingly, it comes to be possible that an operator can quickly restore the controller by these contents, and the availability of the protection controller can be improved.

Figure 21B:
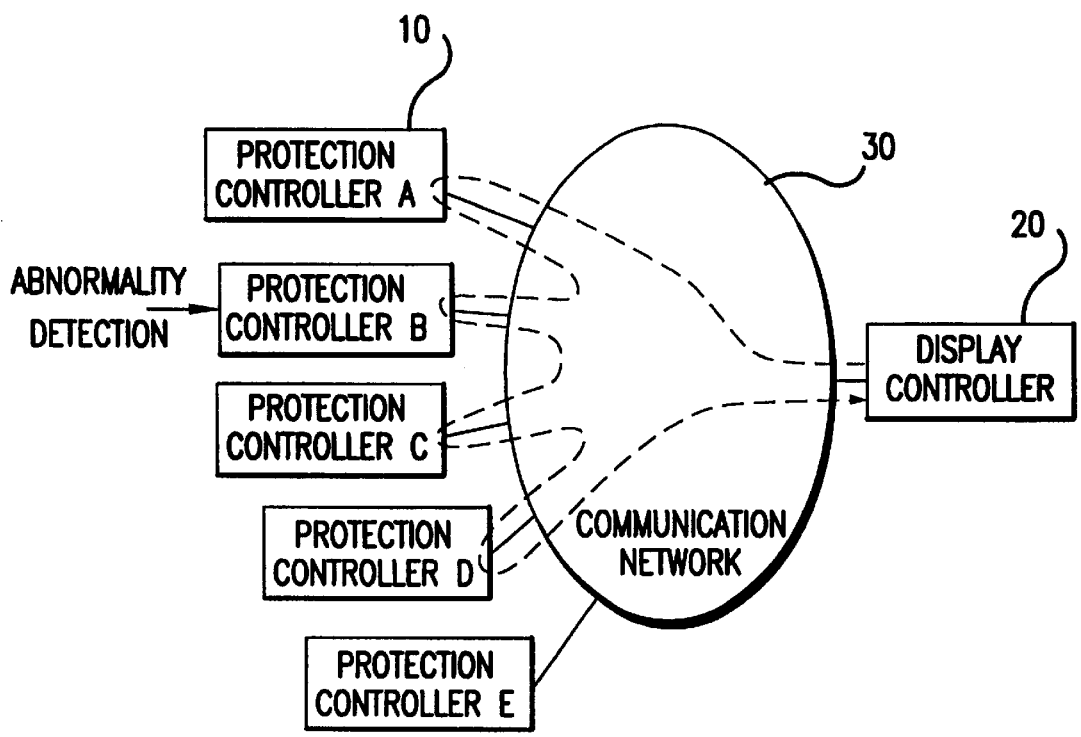

As a modification of the seventh embodiment, when the protection controller is abnormal, after acquiring the state of the related protection controller, the monitoring program module controls a moving path so as to return to display controller 20. This state is shown in FIG. 21(b). As shown in FIG. 21(b), in case that protection controller A is normal and protection controller B is abnormal, the moving route is transferred to a protection controller D related to protection controller B. After the state of protection controller D is acquired, the monitoring program module returns to display controller 20.

It is assumed that protection controllers B and D are connected to the same transmission line. In this case, as the electrical quantity is not included in the standard value in protection controller B, related protection controller D also acquires the electrical quantity. By this, in case that there are the similar abnormalities in the electrical quantity in the two protection controllers B, D, the probability that an abnormality is in the transmission line itself comes to be higher. In this case, by the fact that an operator obtains such information, it is possible to specify the defective portion quickly. Further, there is no need to stop the protection controller unnecessarily, resulting in enabling to improve the availability.

By changing a moving route automatically to the related controller in such a way, an operator can acquire quickly the necessary information. In this respect, this function can be realized by changing step S2-2c of FIG. 20 to the "setting the moving route to the related controlle"r. Here what controller is a related controller can be realized by adding the name of the related controller to the data in sending out the monitoring program module from the display controller.

According to the above embodiment, as it is made that the moving route can be controlled by the state of the protection controller, the monitoring result and the detailed information can be quickly known, the restoration of the controller is accelerated, and the reliability can be improved. Further, by adding the data of the related controller to the monitoring program module and carrying out the moving route control by the state of the protection controller along with these data, the state of the related controller can be efficiently collected. Further, by this, specifying a failure portion can be implemented quickly, and the improvement of the reliability can be realized.

Figure 22:
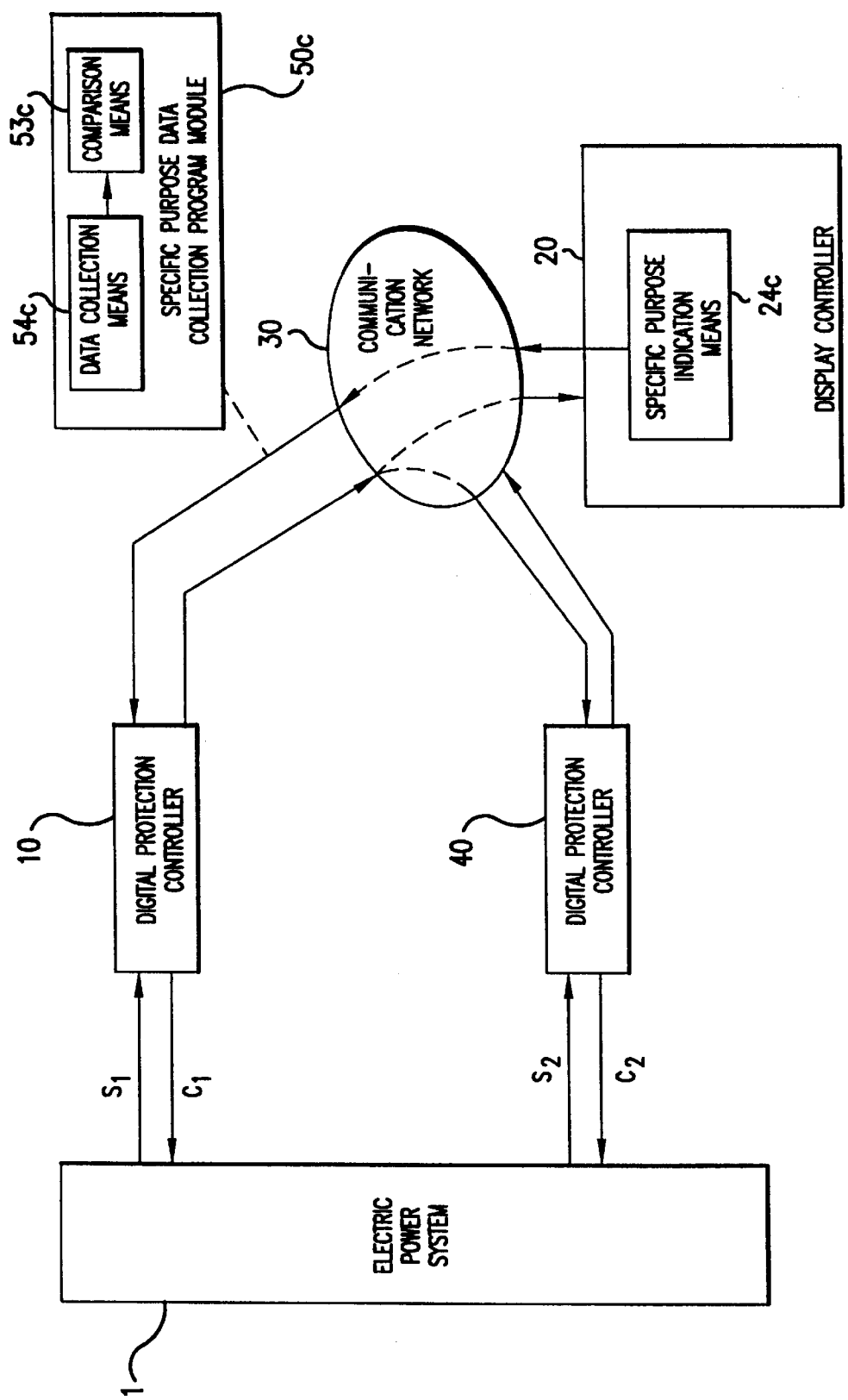
FIG. 22 is a diagram showing the construction of an electric power system protection and control system according to an eighth embodiment of this invention.

FIG. 22 is a block diagram showing the construction of an electric power system protection and control system according to an eighth embodiment of this invention. In FIG. 22, 10 and 40 are digital type protection controllers, 20 is display controller, and 30 is communication network. These are of the similar configuration to the above embodiment, and the detailed explanation is omitted. In this embodiment, a specific purpose indication means 24c is provided in display controller 20. By this, a specific purpose is given in display controller 20 to a specific purpose data collection program module 50c which transfers between a plurality of protection controllers.

Specific purpose data collection program module 50c to which the specific purpose is given is provided with a data collection means 54c to carry out the data collection in accordance with the specific purpose and a comparison means 53c to carry out the comparison statistics processing on the same item of the data of the plurality of protection controllers.

In the above sixth and seventh embodiments, they are constructed such that all items corresponding to the conventional work for a patrol are included in the monitoring program module which transfers between protection controllers. In this case, when there are many items which should execute on each controller and the number of protection controllers to go round is many, much time is required until the monitoring program module will be returned to the display controller.

According to the style of operation of the protection controller, there are many cases that are good with only the monitoring of specific items. Thereupon, this embodiment aims to provide an operator quickly with the state of a plurality of protection controllers which the operator wish to obtain, by configuring as above. For instance, in case that each protection controller compares the electrical quantities fetched from the electric power system, and it is desired to know the deterioration state of an analog-to-digital conversion unit of each controller, the specific purpose of "Electrical quantity data collection" by the display controller is given to the specific purpose data collection program module.

The program module to which the specific purpose is given is transferred to protection controller 10, and collects digital data which is obtained by analog conversion of the electrical quantity that is the output of the analog-digital conversion unit.

Similarly, the electrical quantity data of each protection controller is collected. After collection, by comparison means 53c installed in this program module 50c, electrical quantities of the same item are compared with each other with respect to the root mean square value and the phase, and the statics processing like its difference, dispersion, mean value calculation, etc. is carried out. This result is displayed. in display controller 20.

Figure 23:
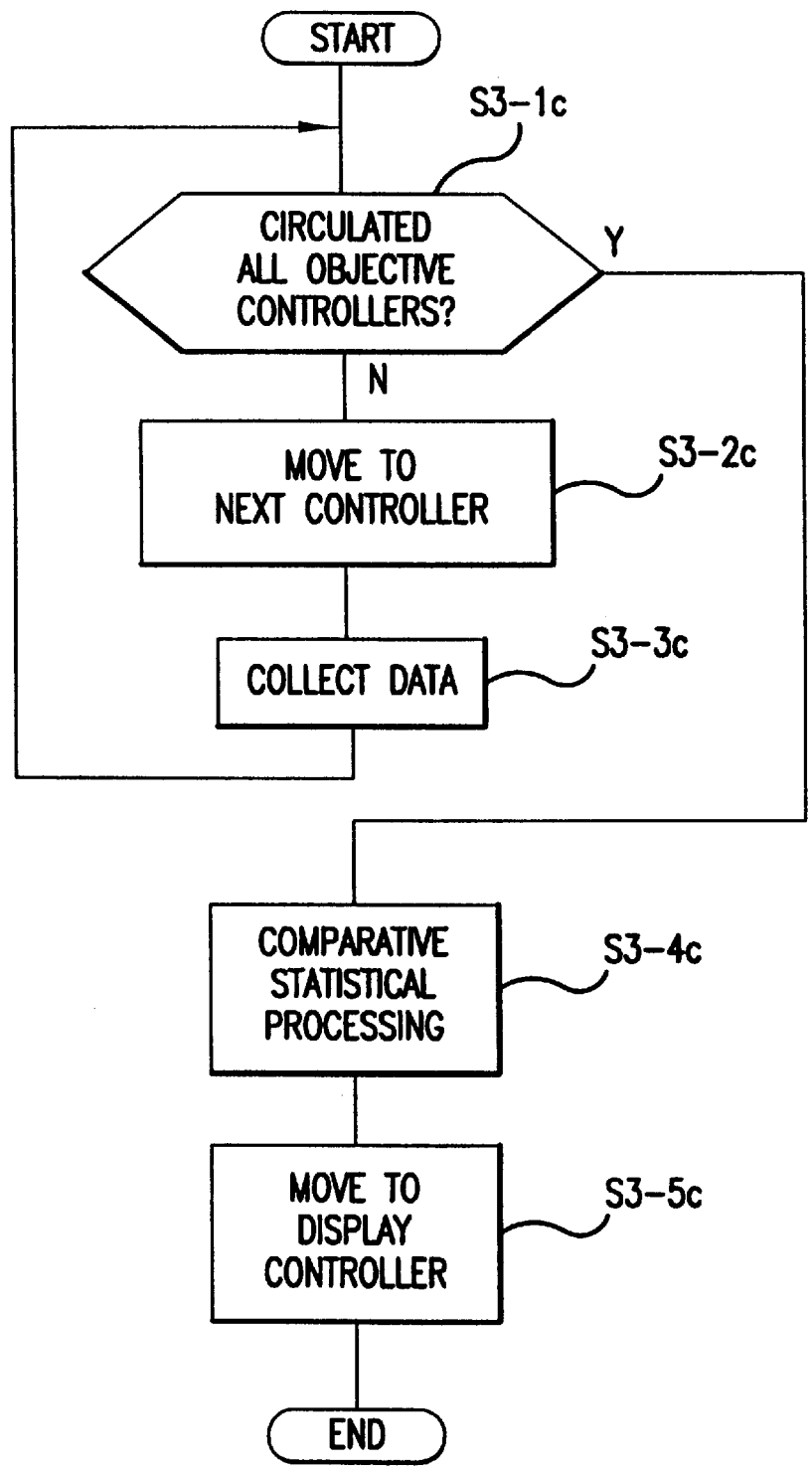
FIG. 23 is a flowchart showing the processing contents of the eighth embodiment.

The above operation is shown by a flowchart in FIG. 23. FIG. 23 is a figure to show the flow in case the electrical quantity is collected by the specific purpose data collection program module. First, whether all controllers in object are done for a patrol by S3-1c, and in case it does not end, the monitoring program module itself is transferred to the next controller by S3-2c. The electrical quantity data of the controller transferred by S3-3c is collected. After then, it returns to S3-1c. These steps are repeated until the data collection related to all controllers in object are finished.

When the patrol of all controllers in object ends, the comparative statistical processing of collected data is carried out in S3-4c, and it ends by transferring the program module to the display controller in S3-5c. In display controller 20, the above comparative statistical processing result is displayed. In FIG. 24, as an example of this, the root mean square values and the phases of the currents of protection controllers and their mean values and the dispersion values thereof from the mean values with statistic processing are shown, respectively.

By displaying the result made with the comparative statistical processing along with the data collected from each controller as described above, the deterioration of an analogto-digital conversion unit, etc. can be known at higher accuracy. In the above embodiment, the electrical quantity is explained as an instance, but the present invention can be applied as to a variety of contents like other data, for instance, the automatic checking executing number, relay operating state, state of a transmission system for protection and control, etc.

According to this embodiment, since the specific purpose is given to the program module, and it is designed to carry out the comparative statistical processing by going around this program module between related protection controllers, information required by an operator can be effectively obtained. As a result, protection controllers of high operability and economical efficiency can be offered.

In the above embodiment, the comparative statistical means is provided within the program module to transfer among the protection controllers. But, the effect is same even though it is provided within the display controller so as to acquire the collected data from the program module in which the data collection is ended. Further, in the above embodiment, it is so constructed that the specific purpose is given to the specific purpose data collection program module. But, even though a production means to produce every time the program module itself by the specific purpose is installed in the display controller, its effect is equal.

Figure 25:
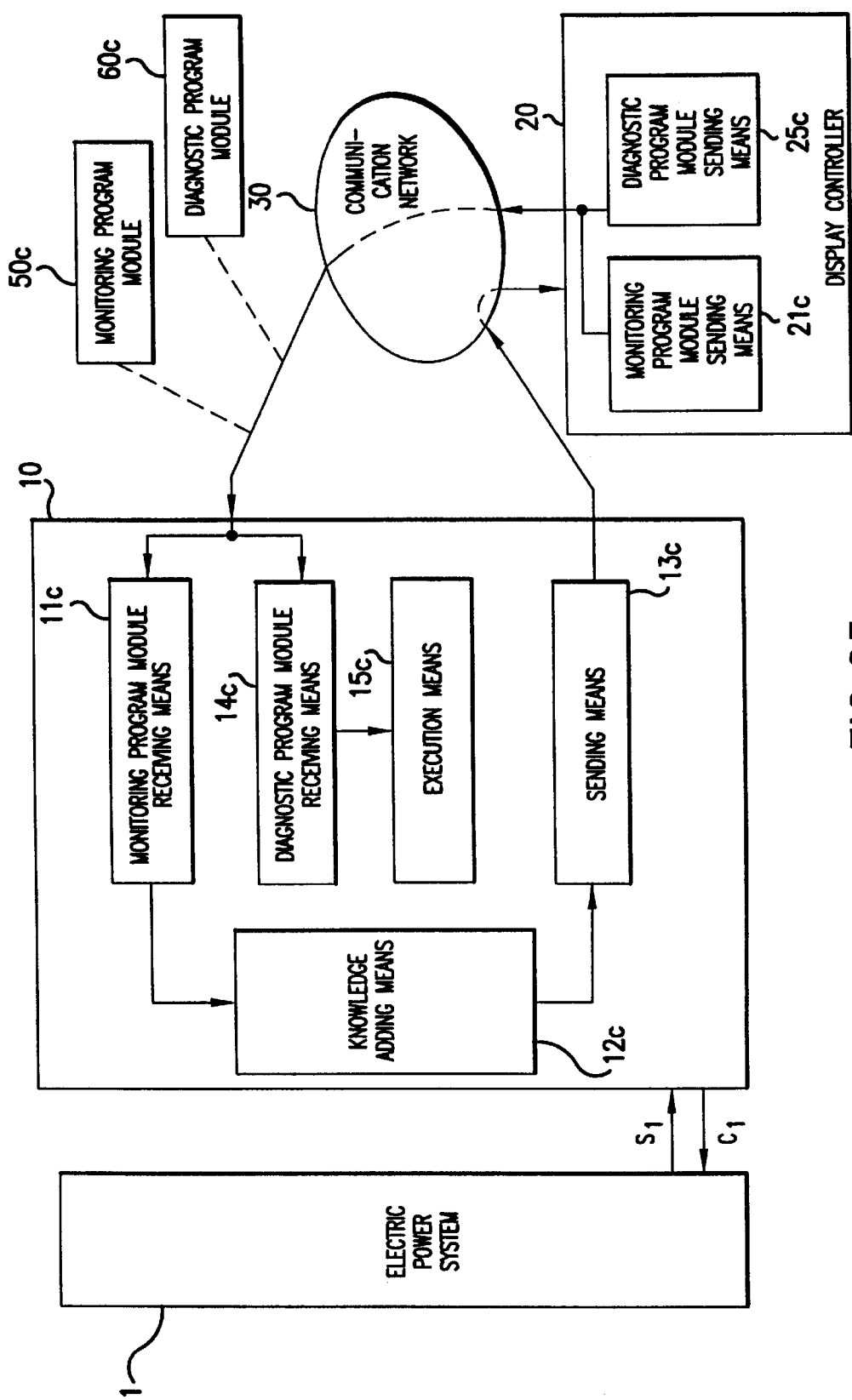
FIG. 25 is a diagram showing the construction of an electric power system protection and control system according to a ninth embodiment of this invention.

FIG. 25 is a block diagram to show the construction of an electric power system protection and control system according to a ninth embodiment of this invention. In FIG. 25, 10 is digital type protection controller to carry out the protection and control of electric power system 1 making status quantity S1 from electric power system 1 in object of protection and control as an input and making protection and control output C1 to electric power system 1 as an output. It is composed of monitoring program module receiving means 11c, knowledge addition means 12c, sending means 13c, a diagnostic program module receiving means 14c, and an execution means 15c.

Further, display controller 20 carries out the remote operation of digital type protection controller 10 via communication network 30. It is provided with monitoring program module sending means 21c, and a diagnostic program module sending means 25c. Monitoring program module 50c and a diagnostic program module 60c are program modules sent from the display controller, received by the protection controller, and executed therein.

Here monitoring program module receiving means 11c, knowledge addition means 12c, sending means 13c, monitoring program module sending means 21c, and monitoring program module 50c have been explained already in the sixth embodiment, the detailed explanation is omitted. The characteristic of this embodiment is in the configuration to handle the diagnostic program module, and its operation is explained below.

In case it is judged that there is an occurrence of abnormality of protection controller 10 or an omen of occurrence thereof by the monitoring program module as explained in the sixth embodiment, it is notified from the monitoring program module to diagnostic program module sending means 25c in display controller 20. When diagnostic program module sending means 25c is notified, diagnostic program module 60c is transferred to protection controller 10 via communication network 30. In protection controller 10, this diagnostic program module 60c is received by diagnostic program module receiving means 14c, and executed by execution means 15c.

In the monitoring program module as described formerly, the state of each controller is detected and the existence of an abnormality can be judged, but which portion is bad cannot be specified. For instance, in case that the electrical quantity is not an appropriate value, it can be supposed as failure of analog-digital conversion unit. But any portion of an A/D converter, multiplexer, sample hold circuit and filter in the analog-digital conversion unit cannot be specified.

A protection controller incorporating a diagnostic rule in advance as a technique for such diagnostic has been offered (Japanese Patent Application No. Hei-6-336280). By this, for instance, if all electrical quantities are abnormal, it can be supposed as a failure of an A/D converter or a multiplexer which are the common portions. The program module including such a diagnostic rule is a diagnostic program module, which diagnoses by obtaining a variety of information at the time of abnormality occurrence from the monitoring program module, and specifies the failure part. The result is notified to an operator. By this, for an operator, the replacement of a failure part comes to be possible quickly.

Conventionally, such a diagnostic function has been incorporated in each controller in a style of ROM. However, accompanied by the complicity and high functionality of protection controllers, it is in a trend that the diagnostic function becomes complicated, resulting the increase in the required memory. Further, in case the diagnostic rule is further made of high functionality by reflecting a variety of diagnostic results, since a diagnostic function is stored in an ROM conventionally, it is necessary to stop the controller and replace an ROM. As a result, there is a problem in the point of availability of the controller.

According to this embodiment, the diagnostic function is transferred from the display controller only to a controller in which an abnormality is recognized by the monitoring program module, and is executed without stationing the diagnostic function always in each protection controller. Accordingly, excessive equipment of hardware resources like memory of each protection controller, etc. comes not to be necessary, and protection controllers of highly economical efficiency can be offered.

Further, in case the change in diagnostic rule or the highly functional implementation thereof is carried out, since the diagnosis is executed by sending a diagnostic program module to RAM of protection controller, the stop of the controller is required, with the result that a protection controller of high availability can be offered. Further, as to the diagnostic program module, similarly to the monitoring program module, the sending it to a plurality of controllers is also possible. The diagnostic rules as to a plurality of controllers (for example, when a plurality of controllers detect abnormalities in the electrical quantities, it diagnoses that all controllers are sound and that there are failure factors at the electric power system side) can be applied, with the result that the diagnosis of high accuracy and specifying quickly a failure part come to be possible.

Figure 26:
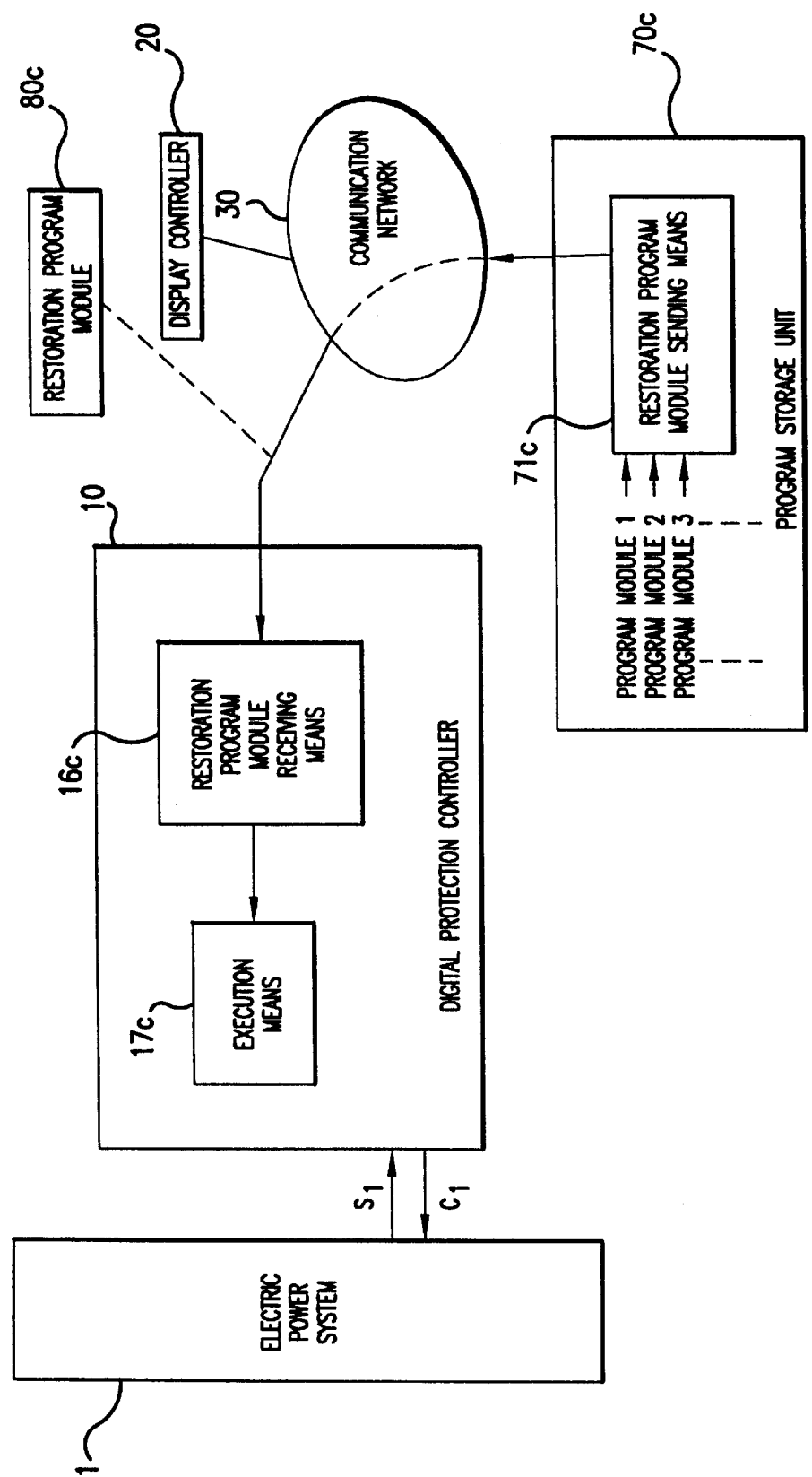
FIG. 26 is a diagram showing the construction of an electric power system protection and control system according to a tenth embodiment of this invention.

FIG. 26 is a block diagram showing the construction of an electric power system protection and control system according to a tenth embodiment of this invention. In FIG. 26, 10 is digital type protection controller to carry out the protection and control of electric power system 1 making status quantity S1 from electric power system 1 in object of the protection and control as an input. In addition to FIG. 25, in this embodiment, it is characterized in that a restoration program module receiving means 16c and an execution means 17c are installed. A program storage unit 70c supplies a restoration program module 80c to digital type protection controller 10 via communication network 30, and is provided with a restoration program module sending means 71c. In this respect, program storage unit 70c is realized by a work station or a personal computer.

As its operation, in the configuration shown in FIG. 25, first in case it is judged that there is an occurrence of abnormality of the controller or an omen of occurrence thereof by the monitoring program module, the diagnosis is carried out by the diagnostic program module, and a failure part is specified. Next, restoration program module 80c corresponding to the failure part is sent, in order to continue the operation without stopping this controller, from program storage device 70c. By receiving and executing it at the protection controller side, this protection controller shall be normally operated after the restoration.

For instance, it is considered as to a failure part, by the diagnostic program module in FIG. 25, that only the specified filter in the analog-to-digital conversion unit is specified as a failure portion. In this case, an operator continues its operation as a protection controller, by sending out restoration program module 80c realizing the protection and control processing without using this specified filter, resulting in not using the electrical quantity obtained from this defective filter.

Concretely, it is assumed that there are two filters inputting the same system electrical quantities, of different accuracy, and they are employed as the inputs of different relay elements, respectively. In case a filter at the side of high accuracy became defective, a program of relay elements utilizing this filter is changed so as to use another filter of low accuracy which is sound in this relay element. For this purpose, a program module to carry out the relay operation for the restoration is sent. Further, for a different example, in case a clock realized by the hardware of the protection controller has became defective, a program module to realize the clock function by the software in place is sent out for restoration purpose.

According to this embodiment, since it is designed so that the restoration program module corresponding to a failure part that can be specified by the diagnostic program module is sent out from the program storage device, without carrying out a hardware replacement in the failure part, it comes to be possible to continue the operation of the protection controller. As a result, the availability of the controller is not lowered, and a sharp labor saving of the restoration work of the controller is obtained, thereby it is possible to provide an electric power system protection and control system of highly economical efficiency.

Figure 27:
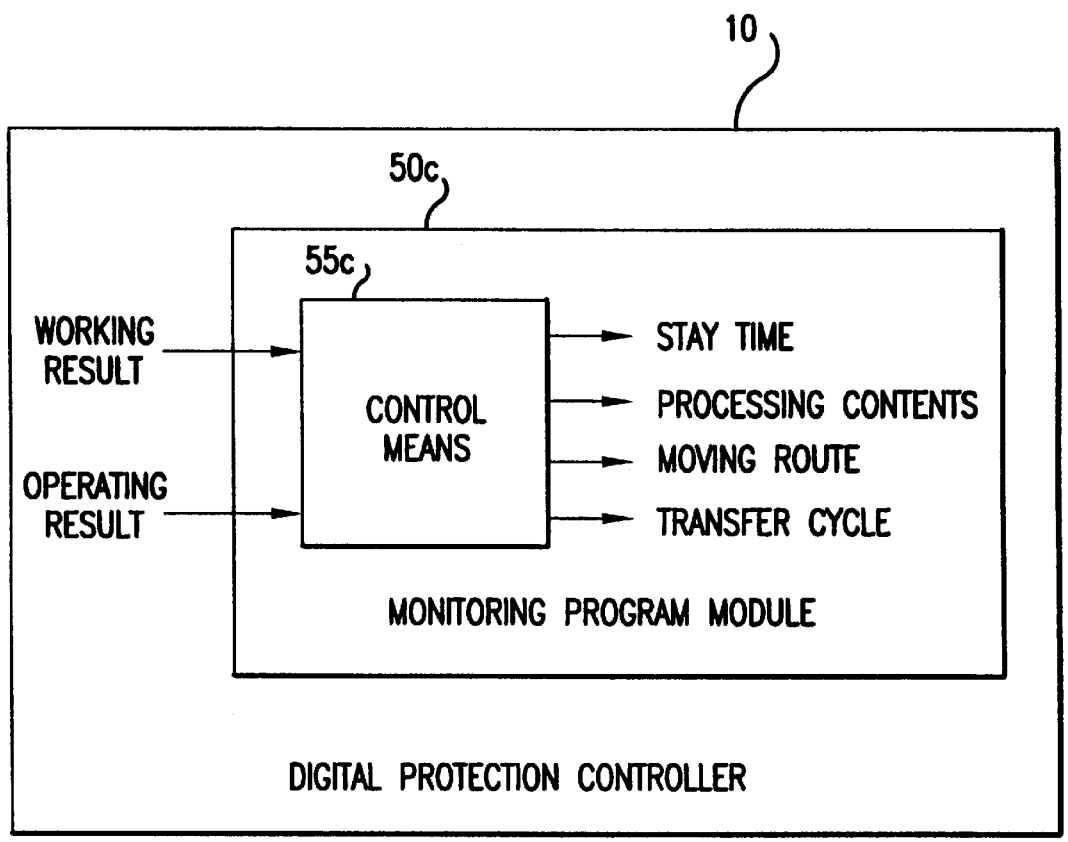
FIG. 27 is a diagram showing the construction of a part of an electric power system protection and control system according to an eleventh embodiment of this invention.

FIG. 27 is a block diagram showing the construction of a part of an electric power system protection and control system according to an eleventh embodiment of this invention. In FIG. 27, 10 is digital type protection controller of the same configuration shown in FIG. 17, and monitoring program module 50c is sent via communication network 30. The characteristic of this embodiment is to provide a control means 55c in monitoring program module 50c to input the history of working results and operating results of the protection controller, and to control the transfer cycle, stay time, processing contents and moving route of the monitoring program module itself. FIG. 27 is a diagram showing that working results and operating results are input to monitoring program module 50c in digital type protection controller 10.

Conventionally, in many cases, a patrol, periodical inspection, etc. of a protection controller are determined from the working time and operating results of the controller. That is to say, for the controller in which a specified time has not elapsed after starting the operation of the controller, the inspection work is carried out, since an initial failure of the hardware in the controller is foreseen. Further, when an electric power system fault occurs and the protection function works normally in the protection controller, it is considered that there are operating results, in this protection controller. In this case, since there is no anxiety of the failure to operate and the protection function is also correct, there is a case in which the above inspection is omitted, or a case to omit a part of a patrol work item.

Further, in case the abnormality, etc. occur in the controller and it is considered that there are problems also in the controller operation, there is a case to carry out a patrol work by shortening the regular patrol cycle. As described above, by the working state and operating results of the controller, an operator judges conventionally to do a patrol, etc. every time. In this case, if the number of controllers in object is many, an operator judges these every time and carries out the inspection work, which results extremely complicated, and the reliability is also lowered.

In order to solve these problems, this embodiment is configured to give the hysteresis of the working state and operating results to the monitoring program module, and to carry out therein the transfer and execution adequate to this. Concretely, the monitoring program module has a control table shown in FIG. 28 in the control means 55c and referring to this, it determines the transfer cycle, processing contents, stay time and moving route.

As shown in FIG. 28, in case working results are little, the cycle for the monitoring program module of transferring and monitoring is shortened, the stay time is made longer for the enough inspection, and monitored repeatedly. Further, for the controller with the operating results, the detailed monitoring of electrical quantity, and relay operating state confirmation, etc. is omitted. For the controller in which abnormality has occurred, since there is a probability to occur an abnormality again, the monitoring program module is returned to the display controller every time of the monitoring, thereby an operator can confirm the details.

In this embodiment, as to the working time and operating results, the values which each protection controller has are given to the monitoring program module. But, in case all values of protection controllers are gathered in the display controller, the values may be given to the monitoring program module by the display controller.

As explained above, according to this embodiment, by the use of the working results and operating results of the protection controller, it becomes possible to adopt the monitoring style corresponding to these results. As a result, in case versatile controllers exist and their hysteresis are also different, the most suitable style of the monitoring as a whole can be realized. That is to say, without increasing the load of communication, the time and contents necessary for each controller can be supplied, and an electric power system protection and control system of excellent reliability, economical efficiency and response performance can be offered.

Further, this invention is not limited to an electric power system only. But this invention is also applicable to a distributed control system composed of plural distributed controllers to control equipments to be controlled by taking status quantities therefrom and a display controller connected to these distributed controllers via a communication network to display and control for monitoring the operations and status of distributed controllers (or a program storage unit to store a monitoring program module that is capable of operating on the distributed controllers). In this case, in the embodiments described above, the protection controllers should be read as the distributed controllers.

Figure 29:
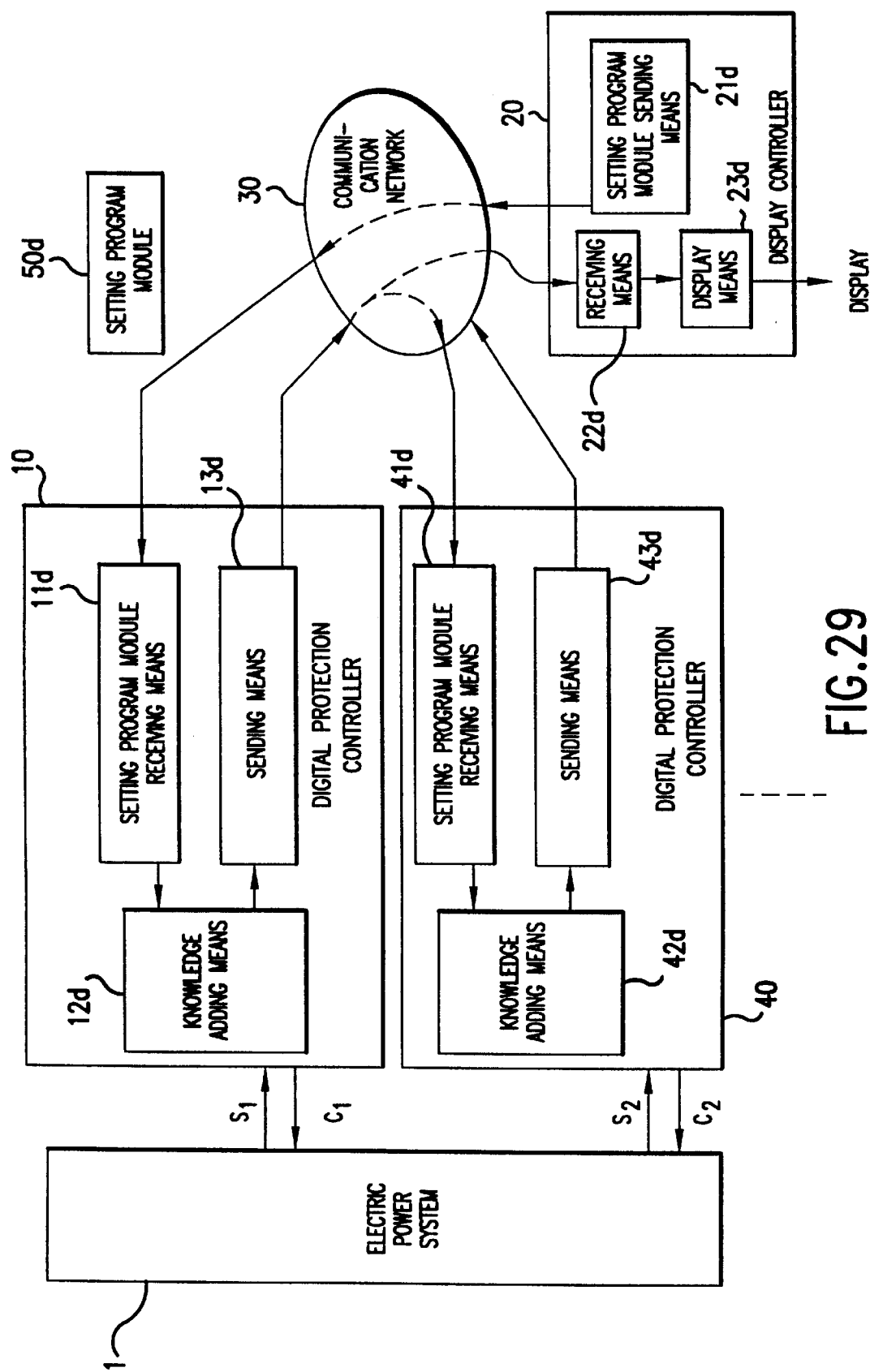
FIG. 29 is a diagram showing the construction of an electric power system protection and control system according to a twelfth embodiment of this invention.

FIG. 29 is a block diagram showing an electric power system protection and control system according to a twelfth embodiment of this invention. In FIG. 29, 10 is digital protection controller which carries out the protection and control of electric power system 1 subject to the protection and control by inputting status quantity S1 from electric power system 1 and making the protection and control output to electric power system 1 as C1. It is composed of a setting program module receiving means 11d, a knowledge addition means 12d and a sending means 13d.

Further, display controller 20 performs remote operation of plural controllers such as digital protection controller 10, other controller 40 of the same configuration, etc. via communication network 30. It is provided with a setting program module sending means 21d, a receiving means 22d, and a display means 23d.

As its operation, first a setting program module 50d is sent out via communication network 30 by setting program module sending means 21d is display controller 20. Setting program module 50d in this embodiment is a program module with a function to perform setting processing as above described, and the data and the description on the procedure to process them are incorporated therein.

In the setting program module, the data are setting values corresponding to each protection system, the procedure may be said as the step to store those setting values to the specified memory of a protection controller. In this respect, to move between plural protection controllers, a moving route of setting program module is also included in the data.

Setting program module sent is received by program module receiving means lid in digital protection controller 10 via communication network 30, is executed by knowledge addition means 12d, and its executed result is added as knowledge therein. When summarizing up the flow of program sending, reception, knowledge addition and execution processing in this case, the flow will be shown in FIG. 30.

Since the setting program module sent out from the display controller as shown here consists of setting value data to be set and its procedure (for instance, in what memory the set value is stored, and to which processing in the protection controller a request is submitted, and so on), the detailed processing as to the setting processing in the protection controller is performed.

Figure 30:
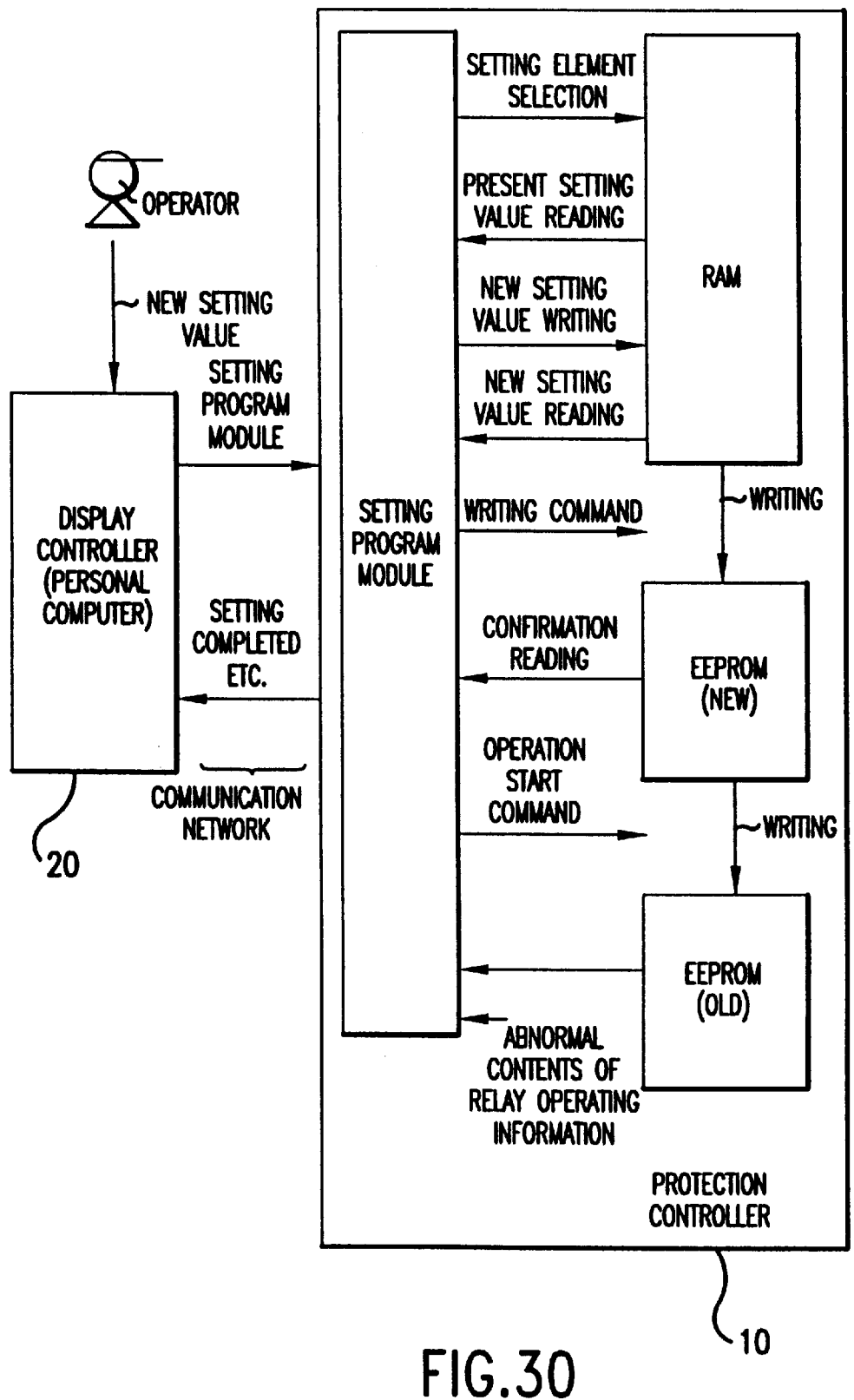
FIG. 30 is a diagram for explaining an action of the twelfth embodiment.

In other words, the processing is performed against each hardware resource in the protection controller like RAM, EEPROM (New), EEPROM (Old), etc. As shown in FIG. 30, since the setting program module transferred in the protection controller performs processing between various hardware resources, such as RAM etc. and other programs in the protection controller, it is enough that an operator gives the moving route to the setting program module on the display controller. Therefore, the request data and response data do not mutually come and go, in a complicated way on the communication network as shown in FIG. 47.

Figure 47:
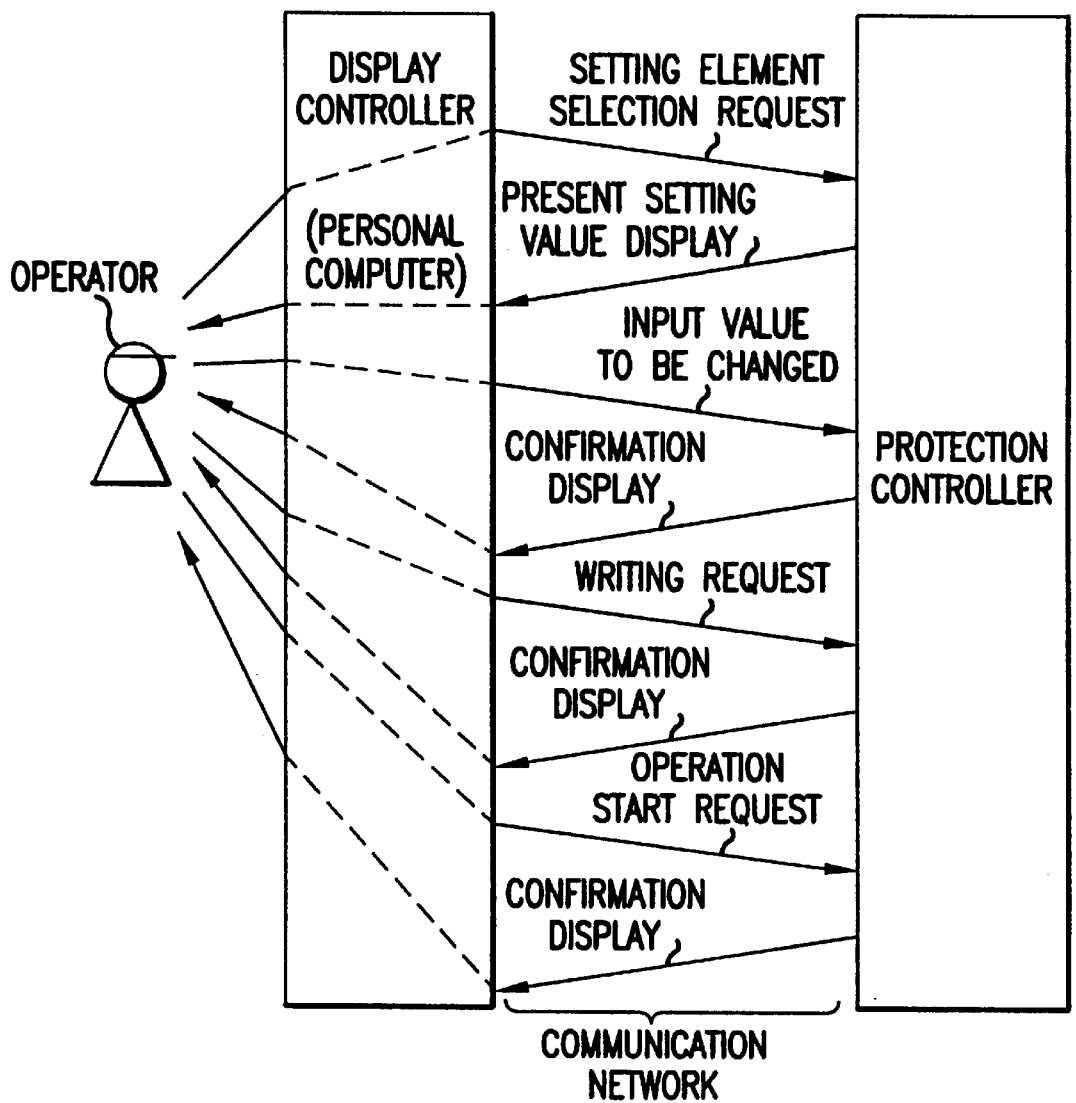
FIG. 47 is a diagram for explaining an action of another conventional electric power system protection and control system.

Conventionally, such a communication as shown in FIG. 47 is performed between the display controller and the protection controller. In this embodiment, as the setting program module incorporating the processing of these is transferred to the protection controller side and executed, the load of the communication network is reduced in comparison with the conventional system. Further, it is enough that an operator only gives a new setting value to the display controller, and an operation to send out each request to the protection controller as conventionally becomes not to be required.

As the knowledge, whether setting is normally completed, what is a new setting value?, what are defective setting elements and setting values in case the setting is not completed?, and whether there is other abnormality or relay operation are treated, and the knowledge is added to setting program module 50d. In this respect, by adding an abnormality of the controller and relay operating state here as knowledge, whether the relation between the state where the controllers is operated, such as system state, etc. and the setting value is proper is possible to know indirectly.

Concretely, the above knowledge is added as one of data in the setting program module. It becomes such a style that this setting program module is moved to each protection controller, executed at the destination moved, the result is obtained, and further, knowledge is sequentially added, as described above.

The setting program module executed and added with knowledge as described above is returned to display controller 20, or is transferred to other protection controller 40 via the communication network by sending means 13d. Hereupon, whether it is returned to display controller 20 or transferred to other protection controller 40, is determined by the data designating the above described moving route. The data of this moving route is given to the setting program module by an operator who decides the controller needed with the setting service.

After being transferred to other controller, and the execution of the setting program module is finished in all the controller subject for the setting, if it is finally returned to the display controller, there is an advantage that an operator is enough to confirm the displayed contents only once. Here, protection controller 40 is provided with the similar means in protection controller 10, a setting program module receiving means 41*d*, a knowledge addition means 42*d*, and a sending means 43*d*. In protection controller 40, first the setting program module is received by setting program module receiving means 41*d*, it is executed and the knowledge is added as described above, and its execution result and the setting program module are returned to display controller 20, or transferred further to other protection controller by sending means 43*d*. Then, the same processes follow as described above.

The setting program module transferred between protection controllers and returned as described above is received and displayed by receiving means 22*d* and display means 23*d* of display controller 20. As the display, the contents added as knowledge of the setting program module by the protection controller is displayed as a list (for instance, setting completion normally, setting abnormality, relay operation, etc.).

This state is shown in FIG. 31. FIG. 31 displays in a comprehensible way to an operator the data which the setting program module transferred to two transverse differential protection relay units for parallel lines provided at both ends of a resistance grounding system parallel 2-circuit transmission line and obtained. In the conventional system, since it is made of picture display per each controller and each item, the confirmation work is complicated.

In FIG. 4 a concrete configuration of the embodiment of the present invention is shown. Digital protection controller 10 is composed of analog-to-digital conversion unit 10-1, digital processing unit 10-2, input/output interface 10-3 to connect external equipments like breaker, etc. and communication interface 10-4 to perform the interface between communication network 30 and this protection controller 10, and bus 10-5.

In this respect, units 10-1 through 10-4 are mutually connected via bus 10-5. Here, components other than 10-4 are the same as components in FIG. 44 described in the prior art. But in digital processing unit 10-2 in the embodiment, what is different from the conventional protection controller is that a part of program (setting program module in this embodiment) is sent to RAM 2-2 via communication interface 10-4 from communication network 30, and it is processed as a program in digital processing unit 10-2.

Conventionally, a program is fixedly written in ROM 2-3. But it is a characteristic of the embodiment of the present invention that setting program module 50*d* is sent from communication network 30 to RAM 2-2, further, it is transferred to RAM of other controller. This digital processing unit 10-2 constitutes knowledge addition means 12*d* and a part of receiving means 11*d* and sending means 13*d*.

Further, communication interface 10-4 is one of the characteristics of the embodiment of the present invention and, for example as shown in this FIGURE, it performs the connection between the ethernet LAN and the protection controller. A part of the setting program module receiving means 11*d* and sending means 13 is realized by this communication interface 10-4.

In other words, the setting program module from communication network 30 is received here in communication network 10-4, and transferred to above RAM 2-2. Further, the setting program module executed in digital processing unit 10-2 is sent to communication network 30 via this communication interface 10-4, and it is transferred to display controller 20 or other protection controller. The above is a concrete configuration of an electric power system protection and control system according to the twelfth embodiment of this invention.

Further, as an example of communication network 30, it is composed of a network connecting protection controllers in a local range such as substation by an ethernet LAN, a network connecting personal computers and work stations in attended substation and a wide area network connecting both the networks in a wide area, as shown in FIG. 4.

In this respect, the configuration of an ethernet LAN is general, and its explanation is omitted. Further, as a wide area network, switching networks, such as telephone circuits etc. are used.

Display controller 20 is realized by a personal computer in this FIGURE. Setting program module sending means 21*d* is realized by an interface circuit between the software in a personal computer and the ethernet LAN.

According to this embodiment, since the setting work conventionally performed by an operator can be realized, in substitution, by the setting program module. As it becomes not necessary for an operation to go to each substation for the setting work, a sharp labor saving is made possible. Further, since it is made that various result data as to the setting work can be sequentially added to the setting program module, a distant operator can acquire and confirm easily details of the setting result. As a result, the operability can be improved.

Further, the setting program module itself corresponding to the setting work conventionally performed by an operator of the protection controller is sent from the display controller to the protection controller via the communication network, and executed in the protection controller. As a result, the communication procedure shown in FIG. 47 can be neglected, and the traffic on the communication network can be made a little. Accordingly the reliability is improved.

Further, conventionally, the operation corresponding to each request and the work to perform the same operation against plural controllers have been necessary. But in this embodiment, these works become unnecessary. An operator only sends the setting program module to the communication network. The setting program module itself autonomously performs the setting processing in each protection controller, collects the result and related data, and moves between protection controllers adding them as knowledge. As a result, the designation and confirmation by an operator one by one is not required, and a workload of an operator can be reduced. Accordingly, an electric power system protection and control system of highly economical efficiency and reliability can be offered.

Further, the setting result of each protection controller can be reflected to the setting program module. The state where a new setting value is not proper for the controller can be quickly known (for example, a relay works unnecessarily, or an abnormality is generated in a controller). As a result, it becomes possible that the setting program module controls a moving route by itself, and communicates the result to an operator, resulting in not giving unproper setting values to plural protection controllers. In such a way, even though a moving route is controlled from the setting result, its effect is equal to the above embodiment.

Figure 32:
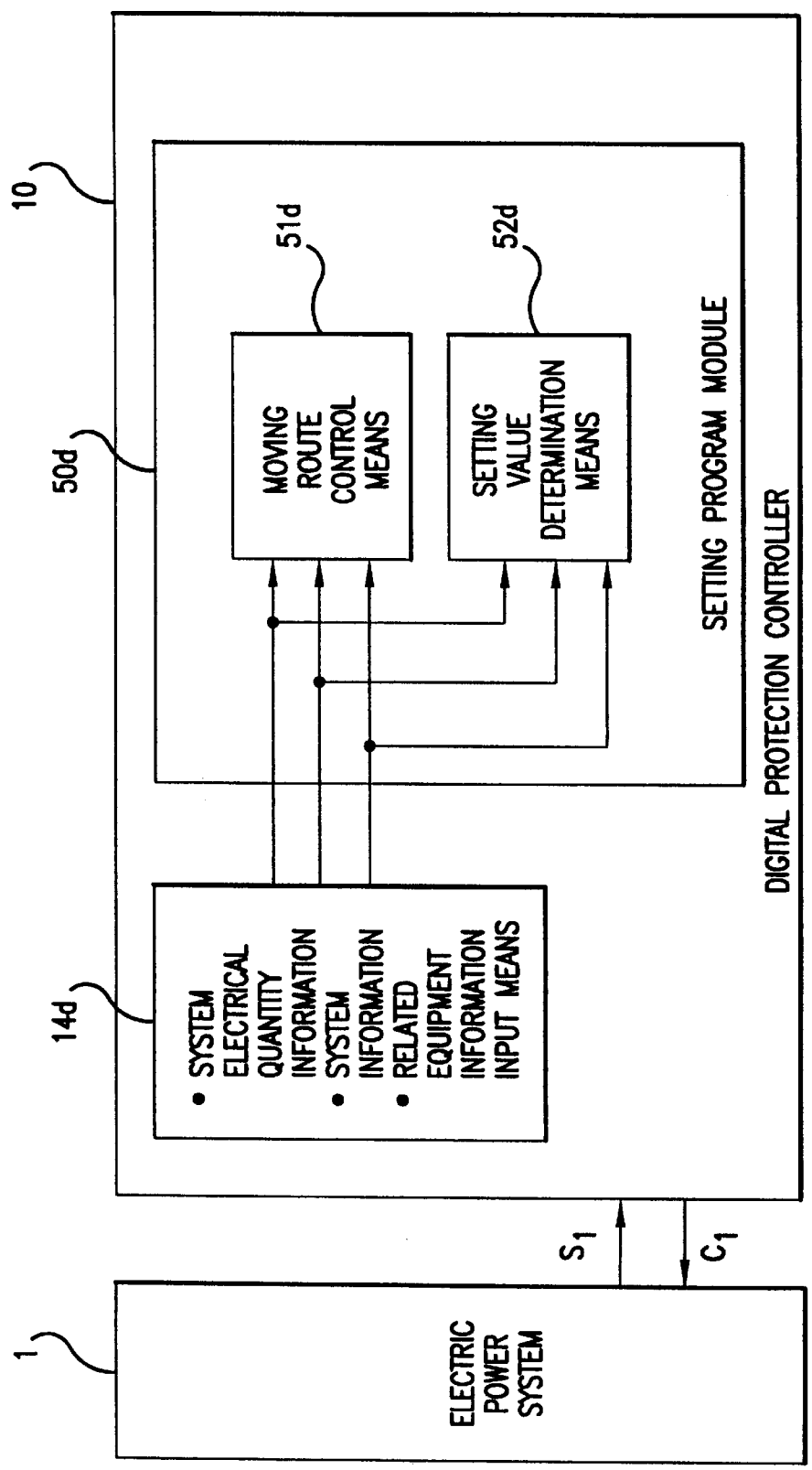
FIG. 32 is a diagram showing the construction of a part of an electric power system protection and control system according to a thirteenth embodiment of this invention.

FIG. 32 is a block diagram showing the construction of an electric power system protection and control system according to a thirteenth embodiment of this invention. In FIG. 32, the configuration of setting program module 50*d* moving between protection controllers is indicated. Further, in digital protection controller 10 an input means 14*d* is provided to give system electrical quantity information, system information, and related equipment information to this setting program module 50*d*.

A moving route control means 51*d* controls a moving route of setting program module 50*d*, and performs revision of the moving route based on the system electrical quantity information, the system information, and the related equipment information of each controller at the moving destination. Further, a setting value determination means 52*d* determines a setting value to be changed similarly from the information obtained from input means 14*d*. By this, it is made possible to perform an optimum moving route control of the setting program module corresponding to the system electrical quantity information, the system information, and the related equipment information of the protection controller, and it is made possible to perform the operation of the protection controller in the optimum setting value.

Conventionally, for setting of a protection controller an operator determines a setting value taking into account a state of an electric power system, functions of a protection controller, and an installation state thereof etc., and then the operator performs the setting work. However, accompanied with increase in demand of the electric power system in these years, a trend of gigantic implementation and complication in a system have been progressed. Conventionally, the system conditions are considered fixedly, and it has been made difficult to determine a setting value, in taking the worst state into consideration. For instance, if a setting value is made of a low sensitivity in taking the worst system conditions in account too much, a problem is produced that an accident can not be distinguished, and the protection controller can not operate at the time when performing the protection and control is required.

Against such a problem, in recent years, a concept of adaptive relays has been proposed. This is, the protective relay is provided with functions automatically adjusting the operating characteristic, setting and state of the protective relay corresponding to the change in conditions of the electric power system. It is detailed in the 1994 National Meeting of The Institute of the Electrical Engineers of Japan, Lectured Theses s15-1, etc. By the addition of such a function, even though how the system state is changed, it becomes more possible that a protective relay surely distinguishes the existence of the fault.

Figure 33:
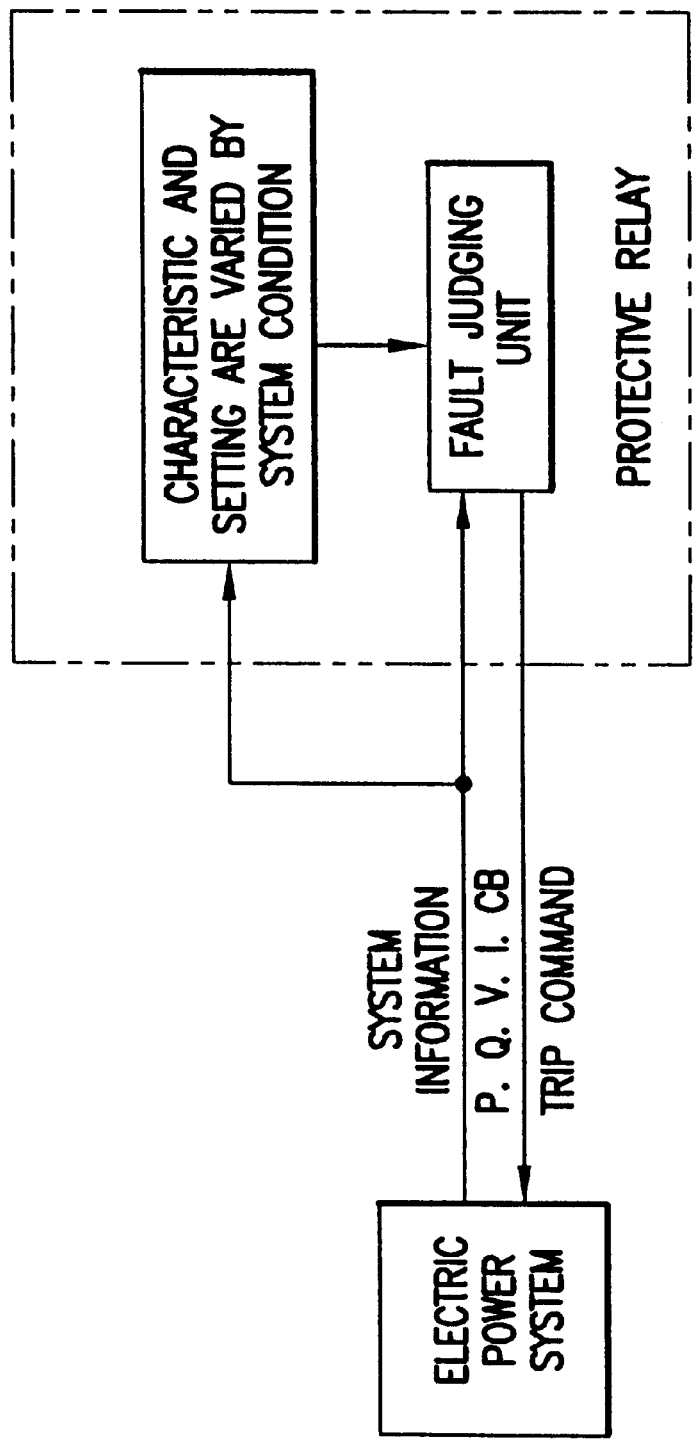
FIG. 33 is a diagram for explaining the concept of an adaptive relay.

The concept diagram of an adaptive relay is shown in FIG. 33. In FIG. 33 information directly input from the electric power system to the protective relay is the system electrical quantity information, system information, and related equipment information, such as voltage and current of the system and active/reactive power induced therefrom, conditions of breaker and disconnecting switch, etc. The protective relay unit identifies a system fault based on these informations, and outputs a trip command of breaker to the system side.

In the conventional protective relay, the characteristic, setting value, control sequence, etc. of the protective relay have been fixed to those set in advance. But in adaptive relays, they have become variable corresponding to the input of the data from the system, as illustrated. As an example of the application of adaptive relays, FIG. 34(A) shows the case in which the distance measuring characteristic of the distance relay at a terminal A is influenced by the magnitude of branch current from a terminal B, in a 3-terminal transmission line, for a fault which occurred further than the branch point.

Conventionally, a relay performs the setting such that the protection section as the proper protection section when the branch current from terminal B is zero. In case the branch current from terminal B flows in, the protective relay decides it as out of section (called as the under-reach phenomenon). This error becomes large in proportion to the magnitude of branch current. Originally, even though the system state changes and the current value from terminal B changes at the time of a fault, it is desirable to measure the distance correctly of the fault section.

Figure 34A:
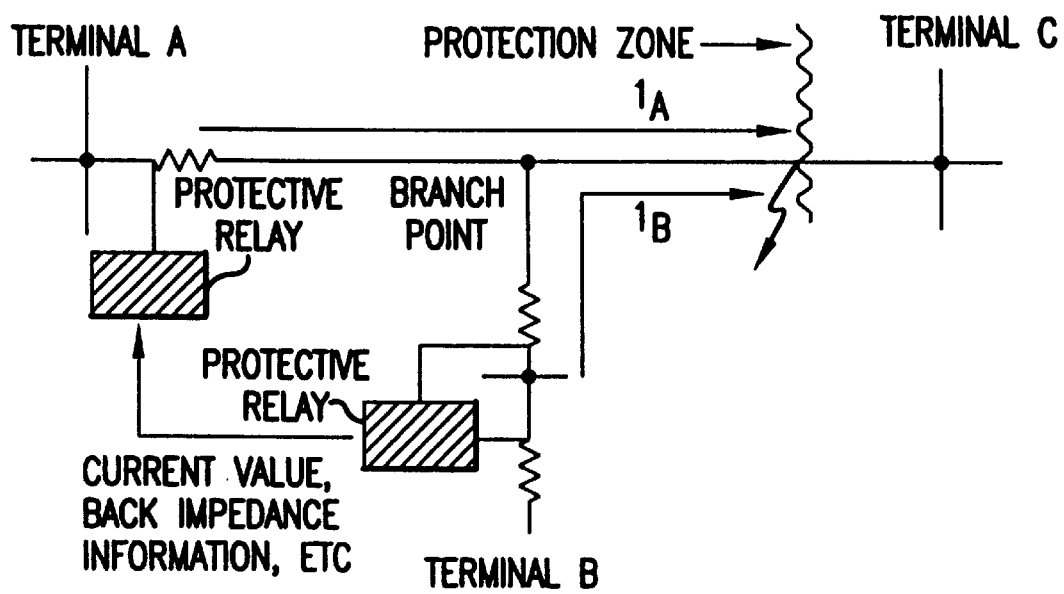
FIG. 34 is a diagram for explaining an action of the adaptive relay.

To avoid this, in the adaptive relays as shown in FIG. 34(A), necessary information is transmitted toward a protective relay of terminal A from the protective relay installed in terminal B. For instance, the connection state of the rear power supply of terminal B at the time of occurrence of a fault is transmitted in advance, and the setting of the distance relay of terminal A is adjusted by supposing the rear impedance of terminal B.

Or else, the magnitude of the current at terminal B is transmitted to the protective relay at terminal A, and the measuring impedance operation is correctly performed by making the current further than the branch point as the synthesis value of the currents at both terminals. At any rate, by taking the information at terminal B into the relay at terminal A, the change in branch effect from terminal B accompanied with the change in system is reflected, and the measuring impedance accuracy of a distance relay at terminal A can be improved.

Figure 34B:
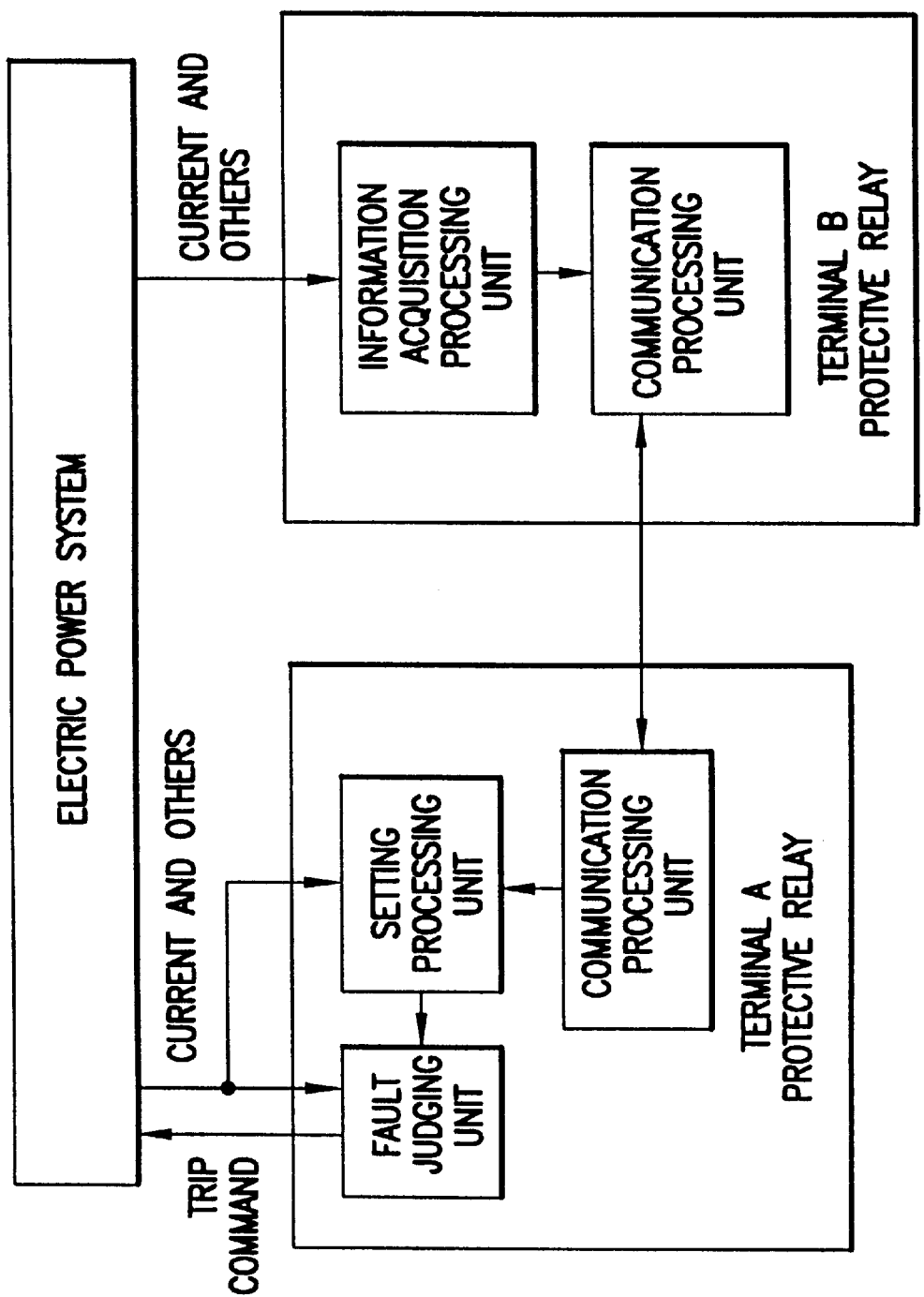

As a configuration in case such adaptive relays are realized in the prior art, it becomes the form as shown in FIG. 34(B). In the protective relay at terminal B, an information acquisition processing unit to take the information (the branch current and the connection state of the rear power supply) of the system to terminal B and a communication processing unit to perform communication with terminal A are installed. Further, in the protective relay at terminal A, a communication processing unit to send out and receive the information to and from terminal B, a setting processing unit to determine an optimum setting value by making the system information of its own terminal and this information from terminal B as its inputs, and a fault decision processing unit to perform the correct distance measurement from the setting value obtained from the setting processing unit are installed.

If an adaptive relay determines the setting value from the system information at its own terminal, it is good with the configuration shown in FIG. 33. But in a case shown in FIG. 34, the information of other substation becomes also necessary. Considering that the system becomes gigantic and complex, for adaptive relays the communication and utilization of information between protective relays installed in the electric stations in a wide range become indispensably a main stream.

However, as described above in the conventional technique, a configuration of the protective relay which acquires the system information, communicates with protective relays in other electric station, determines its setting value to an optimum value becomes complicated and of a large scale. This causes the drop in economical efficiency and reliability. FIG. 34(B) is of configuration to utilize the information from terminal B at terminal A. But conversely there is also a case to send information from terminal A to the relay at terminal B, and the configuration is complicated further. In case that there are provided N terminals, and N is large, it becomes complicated further.

Figure 35:
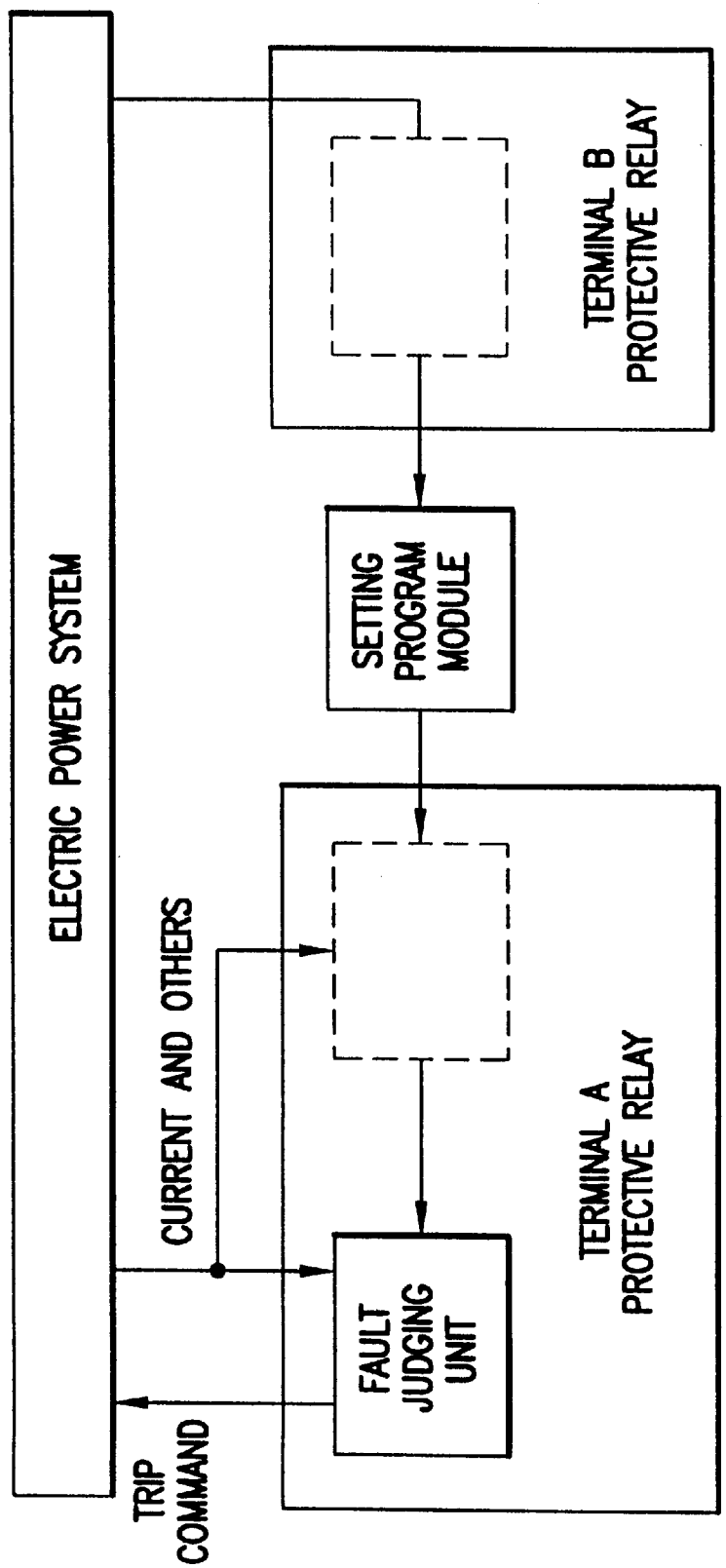
FIG. 35 is a diagram for explaining an action of the thirteenth embodiment.

FIG. 35 is a block diagram to realize the adaptive function described above in this embodiment. The setting program module provided with the moving route control means and the setting value determination means stays in the protective relay of terminal B, and moves to terminal A by the moving route control means, by the change in the system electrical quantity information because of an occurrence of a system fault.

Here, various system information and system electrical quantity information of terminal B have been taken into the setting value determination means in this setting program module. Also in terminal A of the moving destination, similarly various system information and system electrical quantity information of terminal A are similarly taken in the setting value determination means. Then by means of the above procedure found in the setting value determination means (By supposing the rear impedance of terminal B, the setting value of the distance relay of terminal A is adjusted. Or else, by making the current further than the branch point as the synthesis value of the currents at both terminals, the distance measurement operation is correctly performed.), the setting value is changed to the optimum value, or the current value being an operating quantity of the distance relay is adjusted. (In other words, as the operating quantity of the distance relay, the current value from terminal B is added to the current value of its own terminal).

In the setting value determination means described in this embodiment the determination of the setting value as so-called sensitivity of the relay characteristic in included. In addition, the selection of what is used as the operating quantity as described above (here, the selection to add the current of terminal B when there is a branch), the adjustment, further the change of the characteristic, the sequence control selection and change, are included in the setting work in a wide meaning. Accordingly, these are also a subject to the determination by this setting value determination means.

The setting value or operating quantity (current value) determined by the above setting value determination means is given to the fault decision processing unit. By this, the distance relay operation of terminal A is performed, and a trip command is given to a breaker.

To realize the configuration described above, other than the fault decision processing unit, it is enough if there is provided one setting program module. The setting program module, accompanied with the occurrence of a system fault, collects the necessary data by itself and is transferred, and the value necessary for the fault decision of setting value, etc. and handling are determined. Accordingly, in this embodiment, it becomes not necessary to provide many complicated processing units in each protective relay, as shown in FIG. 34(B).

Further, since the linking and communication between individual processing units have not be required, but capsulated in this embodiment, there is no generation of trouble, and it is preferable on the reliability. In particular, in many cases, it is enough that such an adaptive function is operated in case of the occurrence of a system fault or the change in system conditions. To store many processing units for such processings in the protective relay unit, when not using, requires the unnecessary hardware resource, resulting in worsening economical efficiency. But in this embodiment, while setting program module is moved, the necessary processing is performed. Accordingly, an extremely high economical efficiency is achieved. Further, this embodiment is in the case of 2 terminals, but in case of many terminals, its effect becomes to be more distinguished.

According to this embodiment, by installing the moving route control means and setting value determination means in the setting program module, the protection controller can be realized which is able to operate in an adaptive way to the change in system conditions, and change in system electrical quantity. Further, since the configuration and processing in this case can be simplified, when realizing the adaptive relay function by communicating each other the informations between many protection controllers in particular, an electrical power system protection and control system of high economical efficiency and high reliability can be offered.

Figure 36:
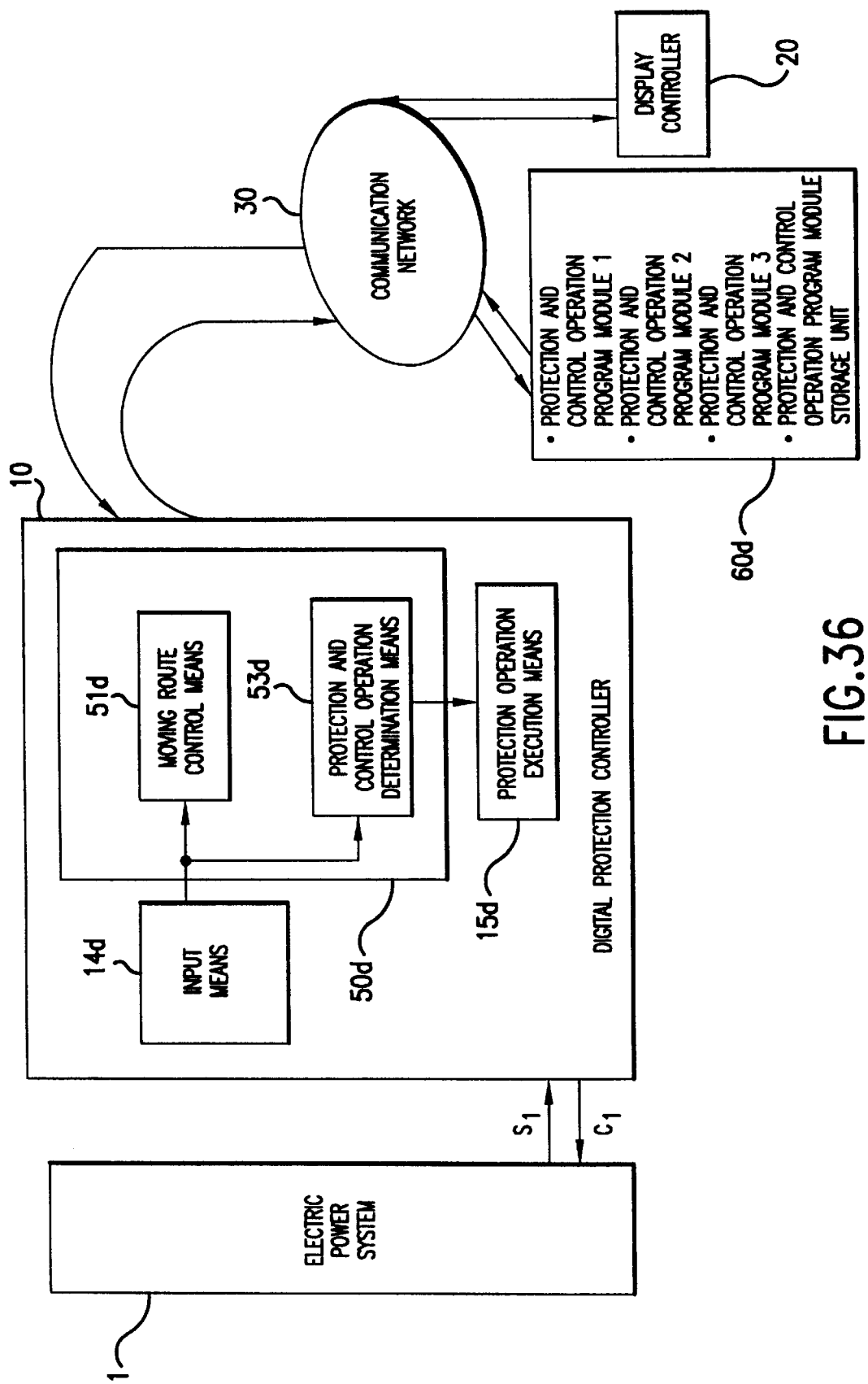
FIG. 36 is a diagram showing the construction of an electric power system protection and control system according to a fourteenth embodiment of this invention.

FIG. 36 is a block diagram showing the construction of an electric power system protection and control system according to a fourteenth embodiment of this invention. In FIG. 36, setting program module 50 is provided with moving route control means 51*d* as described in FIG. 32. Further, protection controller 10 is provided with input means 14*d* as described in FIG. 32.

The characteristics of this embodiment is to install a protection and control operation determination means 53*d* to determine a protection and control operation program module to be used by this information from input means 14*d*. Further, a protection and control operation program module storage unit 60*d* to store the protection and control operation program module is provided. Further, a protection and control operation program module necessary for each protection controller is called out and executed by a protection and control operation execution means 15*d* installed in protection controller 10. In this respect, the concrete configuration of this embodiment is similar to that shown in FIG. 4, and protection and control operation program module storage unit 60*d* employs such hardware as a workstation, and a personal computer, etc.

For the adaptive function to automatically adjust the characteristic and setting corresponding to the change in the conditions of the electric power system has been described in the embodiment described above, and such an adaptive function is that the setting processing unit acts against the protection and control operation (for instance, the processing of the fault decision unit shown in FIGS. 33, 34 and 35 provided in advance in the protective relay unit. Therefore, according to the adaptive relay conventionally proposed, the fundamental configuration for the protection and control operation processing itself is fixed in advance.

However, accompanied with the gigantic implementation and complex implementation of the system, the protection and control operation processing is installed in a fixed way in advance by considering all of these has a limit, even though the setting processing corresponds adaptively to the system condition. Further, that all the processings thinkable in advance are taken in a fixed way, is to have many functions not used in the protective relay, which is not preferable economically.

This embodiment offers a configuration to solve this problem, and it becomes possible that only the optimum protection and control operation required every time, by being adaptive to the change in the conditions of the electric power system, can be distributed to each protective relay unit.

Below, this embodiment is explained by showing a concrete example. FIG. 37 shows high-resistance grounding system parallel 2-circuit transmission lines. In such the high-resistance grounding system parallel 2-circuit transmission lines, it is known that by the current inducted from the other circuit a zero-phase-sequence circulating current is always produced, and influences the earth-fault transverse differential protection relay grounded at both terminals of the circuit at the time of occurrence of a system fault, and there are bad influences like a failure to operate of a healthy circuit, etc.

As this measure, it is a general practice that by making a change component of the zero-phase-sequence at the point of occurrence of a fault as the operating quantity, the magnitude of change of transverse differential protection relay that can perform the protection at high sensitivity is applied to a system in which the zero-phase-sequence circulating current is large. Such a relay is also called one of adaptive relays.

Figure 37A:
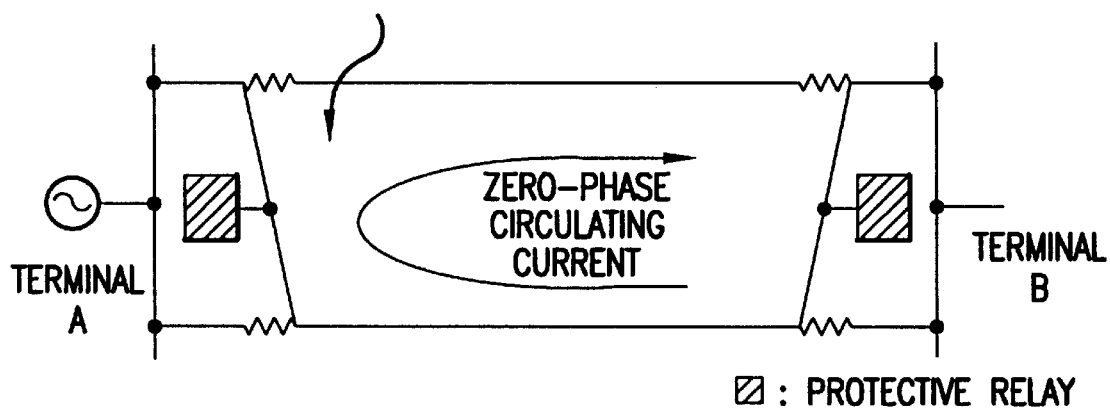
FIG. 37 is a diagram for explaining an action of the fourteenth embodiment.
Figure 37B:
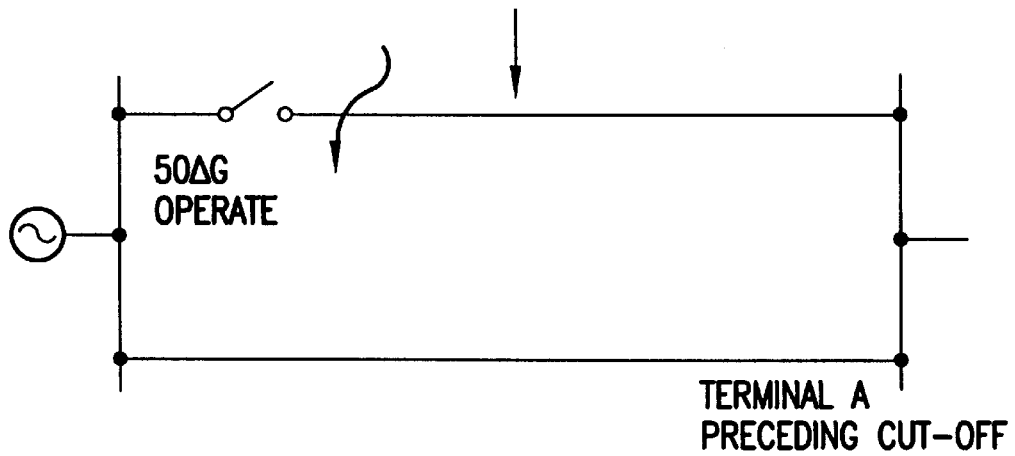
Figure 37C:
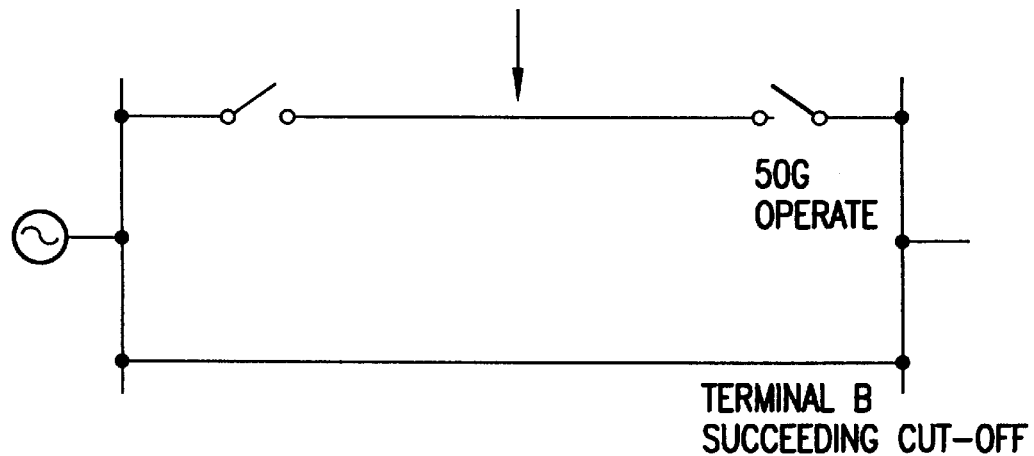

In FIG. 37, an example of the operation of the protective relay in this case is explained. In FIG. 37(a), in a system of a large zero-phase-sequent circulating current, if a fault occurs very near at terminal A of a parallel 2-circuit No. 1 line, first, terminal A is cut off by a change component type circuit selective relay (50ΔG) of terminal A in FIG. 37(b). Since the zero-phase-sequence circulating current does not circulate at this point of time, terminal B can be cut off by a simple earth-fault transverse differential protection relay (50G) as shown in FIG. 37(c).

Figure 38:
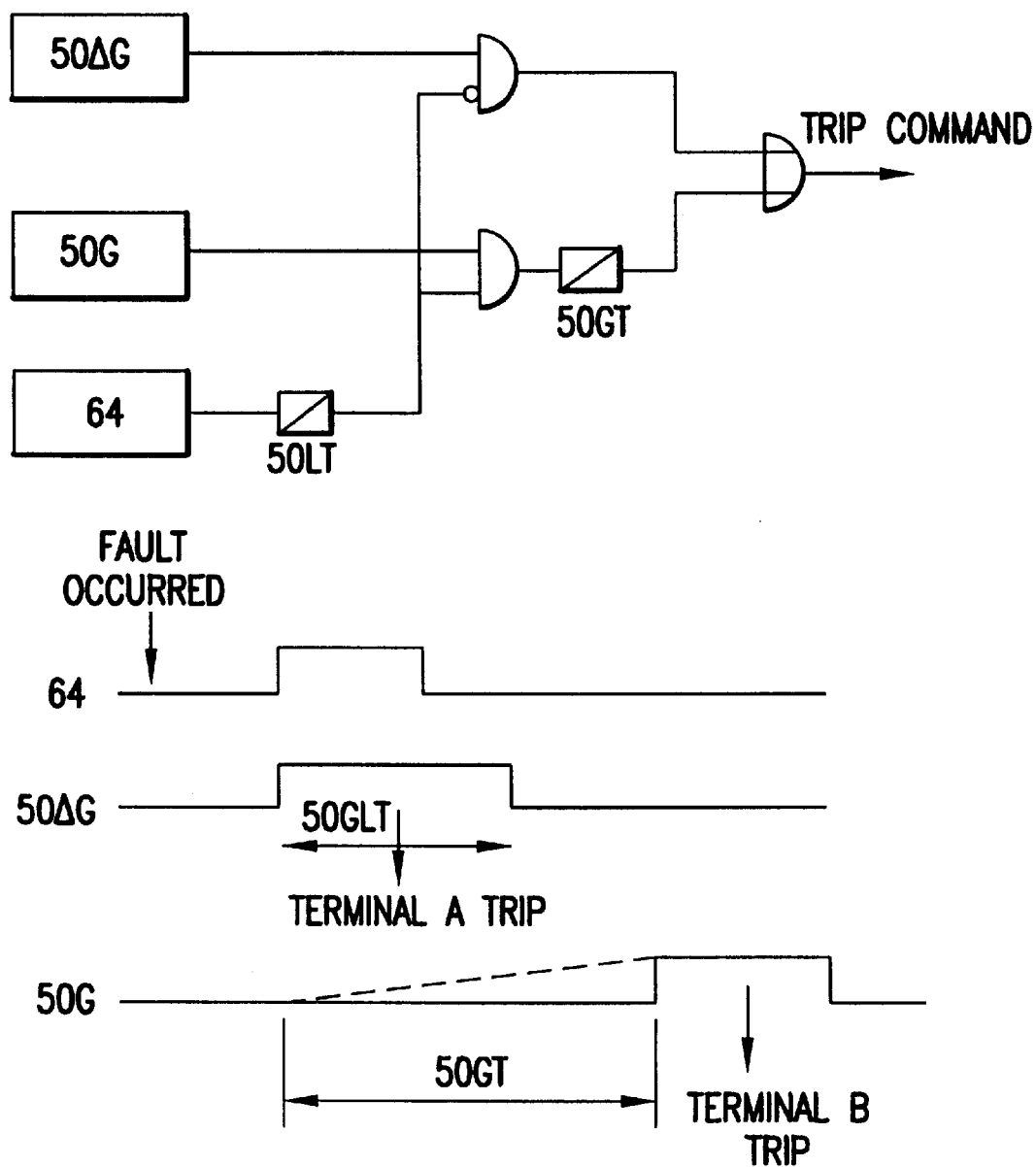
FIG. 38 is a diagram for explaining an action of the fourteenth embodiment.

Shown in FIG. 38 is the protection and control sequence to realize such an operation. Here the operation as above described is realized by the combination of an earth-fault overvoltage relay (64) and the above 2 relay elements (50ΔG, 50G). Here, 50LT and 50GT are timers to coordinate the relay operations of both terminals. By these the sequential cut-off can be performed, for terminal A by change component type circuit selective relay (50ΔG), and for terminal B simple earth-fault circuit selective relay (50G).

In the conventional relay unit as described above, it is necessary to take in advance a change component type circuit selective relay (50ΔG) in the protective relay unit, in the system where a zero-phase-sequence circulating current is found. However, the magnitude of zero-phase-sequence circulating currents is largely influenced by the state of other transmission line framing in a combined way and the magnitude of the power flow. Therefore, there is a possibility that this relay is applied to the system where the protection is not required, or conversely the normal protection cannot be performed even though there arises a need for protection during operation, but this relay is not applied to the system where the protection is required. This has a problem in terms of economical efficiency and reliability.

According to this embodiment, this problem is solved. As shown in FIG. 36, the magnitude of zero-phase-sequence circulating current of the system is found by input means 14d. By this, by protection and control operation determination means 53d in setting program module, due to the fact that the zero-phase-sequence circulating current of the magnitude larger than a prescribed value continued to flow, from protection and control operation program module storage unit 60d, a protection and control operation program module of change component type circuit selective relay (50AG) is called, and is executed by protection operation execution means 15d. Concretely, this program module is stored in the RAM in the protective relay unit, in the CPU this is called as the code, and executed.

In such a way, only when a need arises, the protection and control operation program module is called and used. Accordingly the useless hardware resource is not used always, and the optimum protection and control system corresponding to the conditions of the system can be realized.

Further, in case both terminals in FIG. 38 above described are cut off by different relay elements, as shown in FUGURE 39 the moving route control means of the setting program module functions as follows.

First, setting program module calls out the program module of change component type circuit selective relay (50ΔG) from protection and control operation program module storage unit 60d by the occurrence of a system fault, which is then executed by relay unit A. In the meantime, the setting program module is moved to relay unit B, and judges that the succeeding cutoff is required from the knowledge obtained by terminal A and the system condition. Then, setting program module calls circuit selective relay (50G) program module and cuts off terminal B. In such a way, by moving route control means in the setting program module, it is moved to terminal B by the change in the system condition, that is the cut-off of terminal A, and necessary program module can be executed.

Figure 39:
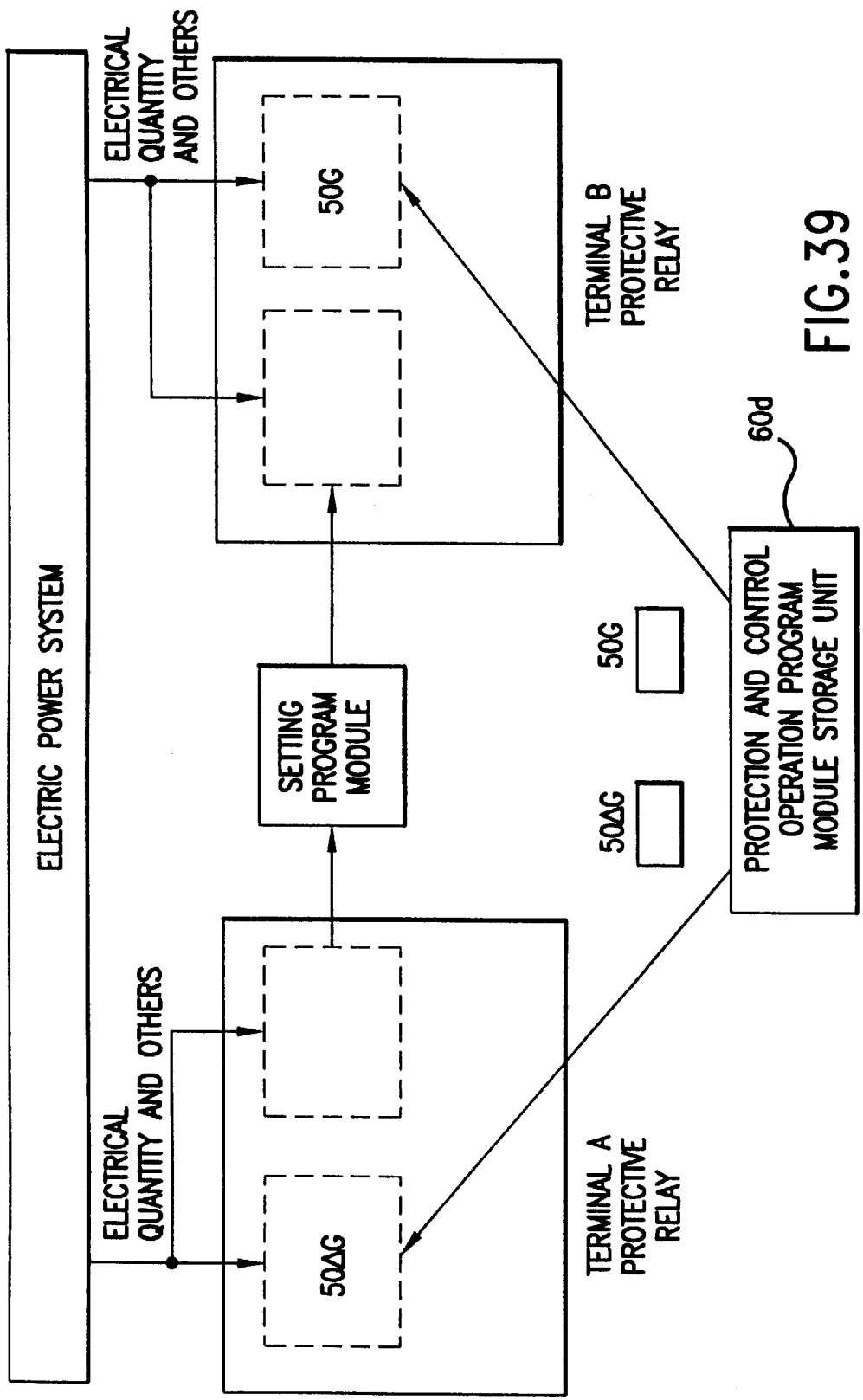
FIG. 39 is a diagram for explaining an action of the fourteenth embodiment.

As shown in FIG. 39 the function always staying in the protective relays at both terminals is one setting program module, and the fault decision unit becomes not to be required always. In particular, in spite of the fact that the relay elements required at both terminals are different, respectively as shown in FIG. 38, in the prior art the completely same relay elements had to be mounted at both terminals.

However, according to this embodiment, by recognizing the change in the system state occurring at each terminal, the setting program module moves. The optimum protection and control operation program module can be provided and executed in each protective relay. By this, an electric power system protection and control system of high economical efficiency and reliability can be offered. In this respect, in the above embodiment it is referred only to the operation of relay elements. But this embodiment is also applied to the sequence control operation, of such as the logic and timer processing, etc. and the similar effect can be expected.

Further, this invention is not limited to an electric power system only. But this invention is also applicable to a distributed control system composed of plural distributed controllers to control equipments to be controlled by taking status quantities therefrom and a display controller connected to these distributed controllers via a communication network to display and control for monitoring the operations and status of distributed controllers (or a program storage unit to store a setting program module that is capable of operating on the distributed controllers). In this case, in the embodiments described above, the protection controllers should be read as the distributed controllers.

Further, this invention is not limited to an electric power system only. But this invention is also applicable to a distributed control system composed of plural distributed controllers to control equipments to be controlled by taking status quantities therefrom and a display controller connected to these distributed controllers via a communication network to display and control for monitoring the operations and status of distributed controllers (or a program storage unit to store program modules that are capable of operating on the distributed controllers). In this case, in the embodiments described above, the protection controllers should be read as the distributed controllers.

In essence, this invention can be applied to a system composed of a plurality of units, each for operating an equipment which is the object to be operated by inputting a status quantity of the equipment, and a display controller connected to each of the units via a communication network for displaying and controlling an operation and status of each of the units for monitoring (or a program storage unit for storing a program module which can be operated in the units).

In addition, this invention can also be applied to a program storing medium readable by a computer, tangibly embodying a program of instructions executable by the computer to perform method steps as described above for a monitor and control system, an electric power system protection and control system or a distributed control system.

According to this invention, it is possible to provide an electric power system protection and control system composed of a plurality of protection controllers and a display controller connected via a communication network which is excellent in the operability, economical efficiency, maintainability and reliability, without increasing the load of the communication network, by utilizing the fact that the protection controllers are connected to the communication network and paying attention to the movement of a program module and the cooperation functions among protection controllers in the system.

According to this invention, it is also possible to provide an electric power system protection and control system composed of a plurality of protection controllers and a display controller connected via a communication network which is excellent in the operability, economical efficiency, maintainability and reliability, by eliminating the operation analyzing work which is conventionally performed and without increasing the load of the communication network, by utilizing the fact that the protection controllers are connected to the communication network and paying attention to the movement of. an operation analyzing program module.

According to this invention, it is further possible to provide an electric power system protection and control system composed of a plurality of protection controllers and a display controller connected via a communication network which is excellent in the operability, economical efficiency, maintainability and reliability, by eliminating the work for a patrol which is conventionally performed without increasing the load of the communication network, by utilizing the fact that the protection controllers are connected to the communication network and paying attention to the movement of a monitoring program module and the cooperation functions among protection controllers in the system.

According to this invention, it is still possible to provide an electric power system protection and control system composed of a plurality of protection controllers and a display controller connected via a communication network which is excellent in the operability, economical efficiency, maintainability and reliability, by eliminating the setting. work which is conventionally performed, extending further the range of the setting function, optimizing the setting value and the protection and control characteristics quickly and anonymously corresponding to the change in the electric power system, without increasing the load of the communication network, by utilizing the fact that the protection controllers are connected to the communication network and paying attention to the movement of a setting program module.

According to this invention, it is possible to provide a distributed control system composed of a plurality of distributed controllers and a display controller connected via a communication network which is excellent in the operability, economical efficiency, maintainability and reliability without increasing the load of the communication network, by utilizing the fact that the distributed controllers are connected to the communication network and paying attention to the movement of a program module and the cooperation functions among distributed controllers in the system.

According to this invention, it is also possible to provide a distributed control system composed of a plurality of distributed controllers and a display controller connected via a communication network which is excellent in the operability, economical efficiency, maintainability and reliability, by eliminating the operation analyzing work which is conventionally performed and without increasing the load of the communication network, by utilizing the fact that the distributed controllers are connected to the communication network and paying attention to the movement of an operation analyzing program module.

According to this invention, it is further possible to provide a distributed control system composed of a plurality of distributed controllers and a display controller connected via a communication network which is excellent in the operability, economical efficiency, maintainability and reliability, by eliminating the work for a patrol which is conventionally performed, without increasing the load of the communication network, by utilizing the fact that the distributed controllers are connected to the communication network and paying attention to the movement of a monitoring program module and the cooperation functions among distributed controllers in the system.

According to this invention, it is still possible to provide a distributed control system composed of a plurality Still a further object of this invention is to provide a distributed control system composed of a plurality of distributed controllers and a display controller connected via a communication network which is excellent in the operability, economical efficiency, maintainability and reliability, by eliminating the setting work which is conventionally performed, extending further the range of the setting function, optimizing the setting value and the distributed control characteristics quickly and anonymously corresponding to the change in the electric power system, without increasing the load of the communication network, by utilizing the fact that the distributed controllers are connected to the communication network and paying attention to the movement of a setting program module.

Obviously, numerous modifications and variations of the present invention are possible in light of the above teachings. It is therefore to be understood that within the scope of the appended claims, the invention may be practiced otherwise than as specifically described herein.

What is claimed is:

1. A monitor and control system, comprising:

a plurality of processing units, each configured to at least one of monitor and control an equipment by inputting a status quantity of said equipment; and a display controller connected to each of said plurality of processing units via a communication network and configured to at least one of display a status and control an operation of each of said plurality of processing units, wherein said display controller being provided with a program module sending means for sending a program module to each of said plurality of processing units via said communication network, said program module including computer-readable instructions that when executed by a processor implements at least one of a setting mechanism configured to store a data value in a memory of at least one of said plurality of processing units, an analyzing mechanism configured to acquire an operational status parameter of at least one of said plurality of processing units, and a monitoring mechanism configured to acquire a status parameter from respective of at least one of said plurality of processing units and compare said status parameter to a validity standard, and each of said plurality of processing units being provided with a program module receiving means for receiving said program module from at least one of said display controller and another one of said plurality of processing units, an executing means for executing a received program module, and a transfer means for transferring an execution result by at least one of said executing means and said program module to at least one of said display controller and at least one of said plurality of processing units via said communication network.

2. An electric power system protection and control system comprising:

a plurality of protection controllers, each configured to protect and control an electric power system by inputting a status quantity of said electric power system and by converting said status quantity into digital data; and a display controller connected to each of said plurality of protection controllers via a communication network and configured to at least one of display a status and control an operation of each of said plurality of protection controllers, wherein said display controller being provided with a program module sending means for sending a program module to one of said plurality of protection controllers via said communication network, respectively, said program module including computer-readable instructions that when executed by a processor implements at least one of a setting mechanism configured to store a data value in a memory of at least one of said plurality of protection controllers, an analyzing mechanism configured to acquire an operational status parameter of at least one of said plurality of protection controllers, and a monitoring mechanism configured to acquire a status parameter from respective of at least one of said plurality of protection controllers and compare said status parameter to a validity standard, and each of said plurality of protection controllers being provided with a program module receiving means for receiving said program module from at least one of said display controller and another one of said plurality of protection controllers via said communication network, an execution means for executing a received program module, and a transfer means for transferring an execution result by at least one of said execution means and said program module to at least one of said display controller and at least one of said plurality of protection controllers via said communication network.

3. An electric power system protection and control system, comprising:

a plurality of protection controllers, each configured to protect and control an electric power system by inputting a status quantity of said electric power system and by converting said status quantity into digital data; and a display controller connected to each of said plurality of protection controllers via a communication network and configured to at least one of display a status and control an operation of each of said plurality of protection controllers, wherein said display controller being provided with an operation analyzing program module sending means for sending said operation analyzing program module for analyzing an operation of at least one of said plurality of protection controllers to at least one of said plurality of protection controllers via said communication network, respectively, and each of said plurality of protection controllers being provided with, an operation analyzing program module receiving means for receiving said operation analyzing program module from at least one of said display controller and at least one of said plurality of protection controllers via said communication network, a knowledge adding means for executing a received operation analyzing program module and for giving an execution result as a knowledge of said operation analyzing program module, and a sending means for sending said operation analyzing program module after being added with said knowledge to at least one of said display controller and at least one of said plurality of protection controllers via said communication network; and said display controller being further provided with, a receiving means for receiving said operation analyzing program module after being added with said knowledge sent from at least one of said plurality of protection controllers, and a display means for displaying a received result in said receiving means.

4. The electric power system protection and control system according to claim 3:

wherein each of said protection controller is further provided with, operation information inputting means for giving an operation information to said operation analyzing program module moving among said protection controllers, and controller information inputting means for giving a controller information as to what range of said electric power system is made an object for protection and control by one of said protection controllers, respectively; and wherein said operation analyzing program module is provided with, moving route information inputting means for inputting an information to control a moving route autonomously upon receipt of said operation information and said controller information, and moving route control means for correcting said moving route based on said operation information and said controller information of one of said protection controllers of moving destination, respectively.

5. The electric power system protection and control system according to claim 3, further comprising:

an operating state prediction knowledge base which stores an operating state when a system fault occurs;

wherein said operation analyzing program module is provided with verifying means for verifying validity of an operation of one of said protection controllers by comparing said operation information collected by said operation analyzing program module with said operation sate prediction knowledge base, respectively.

6. The electric power system protection and control system according to claim 3, further comprising:

a plurality of system observation units, each for taking and accumulating electrical quantity from said electric power system;

wherein said operation analyzing program module is provided with, moving route control means for correcting a moving route based on an operation information collected by said operation analyzing program module moving among said protection controllers which may be related to a system fault of said electric power system, and verifying means for verifying validity of an operation of one of said protection controllers by comparing said operation information collected by said operation analyzing program module with said electrical quantity collected by said operation analyzing program module from one of said system observation units based on a result of said moving route control means.

7. An electric power system protection and control system, comprising:

a plurality of protection controllers, each configured to protect and control an electric power system by inputting a status quantity of said electric power system and by converting said status quantity into digital data; and a display controller connected to each of said plurality of protection controllers via a communication network and configured to at least one of display a status and control an operation of each of said plurality of protection controllers, wherein said display controller being provided with a monitoring program module sending means for sending said monitoring program module for monitoring a status of at least one of said plurality of protection controllers to at least one of said plurality of protection controllers via said communication network, respectively, and each of said plurality of protection controllers being provided with a monitoring program module receiving means for receiving said monitoring program module from at least one of said display controller and at least one of said plurality of protection controllers via said communication network, a knowledge adding means for executing a received monitoring program module and for giving an execution result as a knowledge of said monitoring program module, and a sending means for sending said monitoring program module after being added with said knowledge to at least one of said display controller and at least one of said plurality of protection controllers via said communication network; and said display controller being further provided with a receiving means for receiving said monitoring program module after being added with said knowledge sent from at least one of said plurality of protection controllers, and a display means for displaying a received result in said receiving means.

8. The electric power system protection and control system according to claim 7:

wherein said monitoring program module is provided with, abnormality detection means for detecting an abnormality of one of said protection controllers, respectively, and moving route control means for controlling a moving route of said monitoring program based on an output of said abnormality detection means.

9. The electric power system protection and control system according to claim 7:

wherein specific purpose data collection program module is provided as said monitoring program module;

wherein said display controller is provided with specific purpose indication means for giving a specific purpose to said specific purpose data collection program module; and wherein said specific purpose data collection program module is provided with, data collection means for collecting data in one of said protection controllers in accordance with said specific purpose, and comparison means for carrying out comparison statistics processing on the same item of said collected data of one of said protection controllers.

10. The electric power system protection and control system according to claim 7, further comprising:

diagnostic program module for diagnosing one of said protection controllers in detail and for specifying a failure part in one of said protection controllers, in which said monitoring program module judges that there is an occurrence of abnormality or an omen of and occurrence of abnormality;

wherein said display controller is provided with diagnostic program module sending means for sending out said diagnostic program module to one of said protection controllers via said communication network; and wherein each of said protection controllers is provided with, diagnostic program module receiving means for receiving said diagnostic program module, and execution means for executing said diagnostic program module.

11. The electric power system protection and control system according to claim 10, further comprising:

program storage means for storing a repair program module for repairing one of said protection controller in order to continue the operation of one of said protection controllers, respectively;

wherein said program storage means is provided with repair program module sending means for sending out said repair program module corresponding to said failure part to one of said protection controllers via said communication network in order to continue the operation of one of said protection controllers after said failure part is specified by said diagnostic program module; and wherein each of said protection controllers is further provided with, repair program module receiving means for receiving said repair program module, and execution means for executing said repair program module.

12. The electric power system protection and control system according to claim 7, wherein:

said monitoring program module is provided with control means for controlling a transfer cycle, stay time in one of said protection controllers, processing contents and moving route of said monitoring program in accordance with working results and operating results of one of said protection controllers.

13. An electric power system protection and control system, comprising:

a plurality of protection controllers, each configured to protect and control an electric power system by inputting a status quantity of said electric power system and by converting said status quantity into digital data; and a display controller connected to each of said plurality of protection controllers via a communication network and configured to at least one of display a status and control an operation of each of said plurality of protection controllers, wherein said display controller being provided with a setting program module sending means for sending said setting program module for setting at least one of said plurality of protection controllers to at least one of said plurality of protection controllers via said communication network, respectively, and each of said plurality of protection controllers being provided with a setting program module receiving means for receiving said setting program module from at least one of said display controller and at least one of said plurality of protection controllers via said communication network, a knowledge adding means for executing a received setting program module and for giving an execution result as a knowledge of said setting program module, and a sending means for sending said setting program module after being added with said knowledge to at least one of said display controller and another one of said plurality of protection controllers via said communication network; and said display controller being further provided with a receiving means for receiving said setting program module after being added with said knowledge sent from at least one of said plurality of protection controllers, and a display means for displaying a received result in said receiving means.

14. The electric power system protection and control system according to claim 13:

wherein each of said protection controller is further provided with input means for inputting, in each of said protection controller, system electrical quantity information, system information, and related equipment information to said setting module moving among said protection controllers; and wherein said setting program module is provided with, moving route control means for controlling a moving route autonomously, and setting value determination means for determining a setting value to be changed.

15. The electric power system protection and control system according to claim 13, further comprising:

protection and control operation program storage means for storing a protection and control operation program module which can be called out from said setting module moving among said protection controllers;

wherein said setting program module is provided with, moving route control means for controlling a moving route autonomously, and protection and control operation determination means for determining said protection and control operation program module necessary for one of said protection controllers and for calling out said determined protection and control operation program module from said protection and control operation program module storage means; and wherein each of said protection controller is further provided with, input means for inputting, in each of said protection controller, system electrical quantity information, system information, and related equipment information to said setting module moving among said protection controllers, and protection and control operation executing means for executing said determined protection and control operation program module collected by said protection and control operation determination means.

16. A distributed control system, comprising:

a plurality of distributed controllers, each for controlling an equipment to be controlled by inputting a status quantity of said equipment and for by converting said status quantity into digital data; and a display controller connected to each of said plurality of distributed controllers via a communication network and configured to at least one of display a status and control an operation of each of said plurality of distributed controllers, wherein said display controller being provided with a program module sending means for sending a program module to one of said plurality of distributed controllers via said communication network, respectively, said program module including computer-readable instructions that when executed by a processor implements at least one of a setting mechanism configured to store a data value in a memory of at least one of said plurality of distributed controllers, an analyzing mechanism configured to acquire an operational status parameter of at least one of said plurality of distributed controllers, and a monitoring mechanism configured to acquire a status parameter from respective of at least one of said plurality of distributed controllers and compare said status parameter to a validity standard, and each of said plurality of distributed controllers being provided with a program module receiving means for receiving said program module from at least one of said display controller and at least one of said plurality of distributed controllers via said communication network, an execution means for executing a received program module, and a transfer means for transferring an execution result by at least one of said execution means and said program module to at least one of said display controller and at least one of said plurality of distributed controllers via said communication network.

17. A distributed control system, comprising:

a plurality of distributed controllers, each for controlling an equipment to be controlled by inputting a status quantity of said equipment and by converting said status quantity into digital data; and a display controller connected to each of said plurality of distributed controllers via a communication network and configured to at least one of display a status and control an operation of each of said plurality of distributed controllers, wherein said display controller being provided with an operation analyzing program module sending means for sending said operation analyzing program module for analyzing an operation of at least one of said plurality of distributed controllers to at least one of said plurality of distributed controllers via said communication network, respectively, and each of said plurality of distributed controllers being provided with an operation analyzing program module receiving means for receiving said operation analyzing program module from at least one of said display controller and at least one of said plurality of distributed controllers via said communication network, a knowledge adding means for executing a received operation analyzing program module and for giving an execution result as a knowledge of said operation analyzing program module, and a sending means for sending said operation analyzing program module after being added with said knowledge to at least one of said display controller and at least one of said plurality of distributed controllers via said communication network; and said display controller being further provided with, a receiving means for receiving said operation analyzing program module after being added with said knowledge sent from at least one of said plurality of distributed controllers, and a display means for displaying a received result in said receiving means.

18. A distributed control system, comprising:

a plurality of distributed controllers, each for controlling an equipment to be controlled by inputting a status quantity of said equipment and by converting said status quantity into digital data; and a display controller connected to each of said plurality of distributed controllers via a communication network and configured to at least one of display a status and control an operation of each of said plurality of distributed controllers, wherein said display controller being provided with a monitoring program module sending means for sending said monitoring program module for monitoring a status of at least one of said plurality of distributed controllers to at least one of said plurality of distributed controllers via said communication network, respectively, and each of said plurality of distributed controllers being provided with a monitoring program module receiving means for receiving said monitoring program module from at least one of said display controller and at least one of said plurality of distributed controllers via said communication network, a knowledge adding means for executing a received monitoring program module and for giving an execution result as a knowledge of said monitoring program module, and a sending means for sending said monitoring program module after being added with said knowledge to at least one of said display controller and at least one of said plurality of distributed controllers via said communication network; and said display controller being further provided with a receiving means for receiving said monitoring program module after being added with said knowledge sent from at least one of said plurality of distributed controllers, and a display means for displaying a received result in said receiving means.

19. A distributed control system, comprising:

a plurality of distributed controllers, each for controlling an equipment to be controlled by inputting a status quantity of said equipment and by converting said status quantity into digital data; and a display controller connected to each of said plurality of distributed controllers via a communication network and configured to at least one of display a status and control an operation of each of said plurality of distributed controllers, wherein said display controller being provided with a setting program module sending means for sending said setting program module for setting at least one of said plurality of distributed controllers to at least one of said plurality of distributed controllers via said communication network, respectively, and each of said plurality of distributed controllers being provided with a setting program module receiving means for receiving said setting program module from at least one of said display controller and at least one of said plurality of distributed controllers via said communication network, a knowledge adding means for executing said a received setting program module and for giving an execution result as a knowledge of said setting program module, and a sending means for sending said setting program module after being added with said knowledge to at least one of said display controller and at least one of said plurality of distributed controllers via said communication network; and said display controller being further provided with, a receiving means for receiving said setting program module after being added with said knowledge sent from at least one of said plurality of distributed controllers, and a display means for displaying a received result in said receiving means.

20. A monitor and control device, comprising:

a plurality of processing units, each configured to at least one of monitor and control an equipment by inputting a status quantity of said equipment; and a display controller connected to each of said plurality of processing units via a communication network and configured to at least one of display a status and control an operation of each of said plurality of processing units, wherein said display controller being provided with a program module sending unit for sending a program module to each of said plurality of processing units via said communication network, said program module including computer-readable instructions that when executed by a processor implements at least one of a setting mechanism configured to store a data value in a memory of at least one of said plurality of processing units, an analyzing mechanism configured to acquire an operational status parameter of at least one of said plurality of processing units, and a monitoring mechanism configured to acquire a status parameter from respective of at least one of said plurality of processing units and compare said status parameter to a validity standard, and each of said plurality of processing units being provided with
a program module receiving unit for receiving said program module from at least one of said display controller and another one of said plurality of processing units,
an executing unit for executing a received program module, and
a transfer unit for transferring an execution result by at least one of said executing unit and said program module to at least one of said display controller and at least one of said plurality of processing units via said communication network.

21. An electric power system protection and control device, comprising:
a plurality of protection controllers, each configured to protect and control an electric power system by inputting a status quantity of said electric power system and by converting said status quantity into digital data; and
a display controller connected to each of said plurality of protection controllers via a communication network and configured to at least one of display a status and control an operation of each of said plurality of protection controllers, wherein
said display controller being provided with a program module sending unit for sending a program module to one of said plurality of protection controllers via said communication network, respectively,
said program module including computer-readable instructions that when executed by a processor implements at least one of
a setting mechanism configured to store a data value in a memory of at least one of said plurality of protection controllers,
an analyzing mechanism configured to acquire an operational status parameter of at least one of said plurality of protection controllers, and
a monitoring mechanism configured to acquire a status parameter from respective of at least one of said plurality of protection controllers and compare said status parameter to a validity standard, and
each of said plurality of protection controllers being provided with
a program module receiving unit for receiving said program module from at least one of said display controller and at least one of said plurality of protection controllers via said communication network,
an execution unit for executing a received program module, and
a transfer unit for transferring an execution result by at least one of said execution unit and said program module to at least one of said display controller and at least one of said plurality of protection controllers via said communication network.

22. An electric power system protection and control device, comprising:
a plurality of protection controllers, each configured to protect and control an electric power system by inputting a status quantity of said electric power system and by converting said status quantity into digital data; and
a display controller connected to each of said plurality of protection controllers via a communication network and configured to at least one of display a status and control an operation of each of said plurality of protection controllers, wherein
said display controller being provided with an operation analyzing program module sending unit for sending said operation analyzing program module for analyzing an operation of at least one of said plurality of protection controllers to at least one of said plurality of protection controllers via said communication network, respectively, and
each of said plurality of protection controllers being provided with
an operation analyzing program module receiving unit for receiving said operation analyzing program module from at least one of said display controller and at least one of said plurality of protection controllers via said communication network,
a knowledge adding unit for executing a received operation analyzing program module and for giving an execution result as a knowledge of said operation analyzing program module, and
a sending unit for sending said operation analyzing program module after being added with said knowledge to at least one of said display controller and at least one of said plurality of protection controllers via said communication network; and
said display controller being further provided with
a receiving unit for receiving said operation analyzing program module after being added with said knowledge sent from at least one of said plurality of protection controllers, and
a display unit for displaying a received result in said receiving unit.

23. An electric power system protection and control device, comprising:
a plurality of protection controllers, each configured to protect and control an electric power system by inputting a status quantity of said electric power system and by converting said status quantity into digital data; and
a display controller connected to each of said plurality of protection controllers via a communication network and configured to at least one of display a status and control an operation of each of said plurality of protection controllers, wherein
said display controller being provided with a monitoring program module sending unit for sending said monitoring program module for monitoring a status of at least one of said plurality of protection controllers to at least one of said plurality of protection controllers via said communication network, respectively, and
each of said plurality of protection controllers being provided with
a monitoring program module receiving unit for receiving said monitoring program module from at least one of said display controller and at least one of said plurality of protection controllers via said communication network,
a knowledge adding unit for executing a received monitoring program module and for giving an execution result as a knowledge of said monitoring program module, and
a sending unit for sending said monitoring program module after being added with said knowledge to at least one of said display controller and at least one of said plurality of protection controllers via said communication network; and
said display controller being further provided with, a receiving unit for receiving said monitoring program module after being added with said knowledge sent from at least one of said plurality of protection controllers, and a display unit for displaying a received result in said receiving unit.

24. An electric power system protection and control device, comprising:

a plurality of protection controllers, each configured to protect and control an electric power system by inputting a status quantity of said electric power system and by converting said status quantity into digital data; and a display controller connected to each of said plurality of protection controllers via a communication network and configured to at least one of display a status and control an operation of each of said plurality of protection controllers, wherein said display controller being provided with a setting program module sending unit for sending said setting program module for setting at least one of said plurality of protection controllers to at least one of said plurality of protection controllers via said communication network, respectively, and each of said plurality of protection controllers being provided with a setting program module receiving unit for receiving said setting program module from at least one of said display controller and at least one of said plurality of protection controllers via said communication network, a knowledge adding unit for executing a received setting program module and for giving an execution result as a knowledge of said setting program module, and a sending unit for sending said setting program module after being added with said knowledge to at least one of said display controller and at least one of said plurality of protection controllers via said communication network; and said display controller being further provided with, a receiving unit for receiving said setting program module after being added with said knowledge sent from at least one of said plurality of protection controllers, and a display unit for displaying a received result in said receiving unit.

25. A program storing medium readable by a computer, tangibly embodying a program of instructions executable by said computer to perform method steps for a monitor and control system, including a plurality of processing units, each configured to perform at least one of monitoring and controlling an equipment by inputting a status quantity of said equipment, and a display controller connected to each of said plurality of processing units via a communication network and configured to at least one of display a status and control an operation of each of said plurality of processing units, said method steps comprising:

receiving a program module corresponding to contents for display control in said display controller from said at least one of display controller and at least one of said plurality of processing units, at at least one of said processing units, said program module including computer-readable instructions that when executed by a processor implements at least one of a setting mechanism configured to store a data value in a memory of at least one of said plurality of processing units, an analyzing mechanism configured to acquire an operational status parameter of at least one of said plurality of processing units, and a monitoring mechanism configured to acquire a status parameter from respective of at least one of said plurality of processing units and compare said status parameter to a validity standard;

executing a received program module, at at least one of said processing units; and transferring at least one of an execution result by said execution step and said program module stored in at least one of said plurality of processing unit to at least one of said display controller and another one of said processing units via said communication network, at at least one of said plurality of processing units.

26. A program storing medium readable by a computer, tangibly embodying a program of instructions executable by said computer to perform method steps for a monitor and control system, including a plurality of processing units, each configured to perform at least one of monitoring and controlling an equipment by inputting a status quantity of said equipment, and a display controller connected to each of said plurality of processing units via a communication network and configured to at least one of display a status and control an operation of each of said plurality of processing units for monitoring, said method steps comprising:

sending a program module corresponding to contents for display control in said display controller to each of said plurality of processing units via said communication network, at said display controller, said program module including computer-readable instructions that when executed by a processor implements at least one of a setting mechanism configured to store a data value in a memory of at least one of said plurality of processing units, an analyzing mechanism configured to acquire an operational status parameter of at least one of said plurality of processing units, and a monitoring mechanism configured to acquire a status parameter from respective of at least one of said plurality of processing units and compare said status parameter to a validity standard.

27. A program storing medium readable by a computer, tangibly embodying a program of instructions executable by said computer to perform method steps for an electric power system protection and control system including a plurality of protection controllers, each configured to execute protection and control of an electric power system by inputting a status quantity of said electric power system and to convert said status quantity into digital data, and a display controller connected to each of said plurality of protection controllers via a communication network and configured to at least one of display a status and control an operation of each of said plurality of protection controllers for monitoring, said method steps comprising:

receiving a program module corresponding to contents for display control in said display controller from at least one of said display controller and at least one of said plurality of protection controllers via said communication network at at least one of said protection controllers, said program module including computer-readable instructions that when executed by a processor implements at least one of a setting mechanism configured to store a data value in a memory of at least one of said plurality of protection controllers, an analyzing mechanism configured to acquire an operational status parameter of at least one of said plurality of protection controllers, and a monitoring mechanism configured to acquire a status parameter from respective of at least one of said plurality of protection controllers and compare said status parameter to a validity standard, executing a received program module at at least one of said protection controllers; and transferring at least one of an execution result by said executing step and said program module stored in said plurality of protection controller to at least one of said display controller and at least one of said plurality of protection controllers via said communication network from at least one of said plurality of protection controllers.

28. A program storing medium readable by a computer, tangibly embodying a program of instructions executable by said computer to perform method steps for an electric power system protection and control system including a plurality of protection controllers, each configured to execute protection and control of an electric power system by inputting a status quantity of said electric power system and to convert said status quantity into digital data, and a display controller connected to each of said plurality of protection controllers via a communication network and configured to at least one of display a status and control an operation of each of said plurality of protection controllers for monitoring, said method steps comprising:

sending a program module corresponding to contents for display control in said display controller to at least one of said plurality of protection controllers via said communication network, at said display controller, said program module including computer-readable instructions that when executed by a processor implements at least one of a setting mechanism configured to store a data value in a memory of at least one of said plurality of protection controllers, an analyzing mechanism configured to acquire an operational status parameter of at least one of said plurality of protection controllers, and a monitoring mechanism configured to acquire a status parameter from respective of at least one of said plurality of protection controllers and compare said status parameter to a validity standard.

29. A program storing medium readable by a computer, tangibly embodying a program of instructions executable by said computer to perform method steps for an electric power system protection and control system including a plurality of protection controllers, each configured to execute protection and control of an electric power system by inputting a status quantity of said electric power system and to convert said status quantity into digital data, and a display controller connected to each of said plurality of protection controllers via a communication network and configured to at least one of display a status and control an operation of each of said plurality of protection controllers for monitoring, said method steps comprising:

sending an operation analyzing program module for analyzing an operation of at least one of said plurality of protection controllers to at least one of said plurality of protection controllers via said communication network, respectively, at said display controller; and receiving at said display controller an operation analyzing program module after addition of knowledge thereto sent from at least one of said plurality of protection controllers.

30. A program storing medium readable by a computer, tangibly embodying a program of instructions executable by said computer to perform method steps for an electric power system protection and control system including a plurality of protection controllers, each configured to execute at least one of protection and control of an electric power system by inputting a status quantity of said electric power system and to convert said status quantity into digital data, and a display controller connected to each of said plurality of protection controllers via a communication network and configured to display a status and control an operation of each of said plurality of protection controllers for monitoring, said method steps comprising:

receiving an operation analyzing program module for analyzing an operation of at least one of said plurality of protection controllers from at least one of said display controller and at least one of said plurality of protection controllers via said communication network at at least one of said plurality of protection controllers;

executing a received operation analyzing program module and to give an execution result as a knowledge of said operation analyzing program module at at least one of said plurality of protection controllers; and sending said operation analyzing program module after addition of said knowledge thereto to at least one of said display controller and at least one of said plurality of protection controllers via said communication network at at least one of said plurality of protection controllers.

31. A program storing medium readable by a computer, tangibly embodying a program of instructions executable by said computer to perform method steps for an electric power system protection and control system including a plurality of protection controllers, each configured to execute protection and control of an electric power system by inputting a status quantity of said electric power system and to convert said status quantity into digital data, and a display controller connected to each of said plurality of protection controllers via a communication network and configured to display a status and control an operation of each of said plurality of protection controllers, said method steps comprising:

sending a monitoring program module for monitoring a status of at least one of said plurality of protection controllers to at least one of said plurality of protection controllers via said communication network, at said display controller; and receiving said monitoring program module after addition thereto of a knowledge sent from at least one of said plurality of protection controllers, at said display controller.

32. A program storing medium readable by a computer, tangibly embodying a program of instructions executable by said computer to perform method steps for an electric power system protection and control system including a plurality of protection controllers, each configured to execute protection and control of an electric power system by inputting a status quantity of said electric power system and configured to convert said status quantity into digital data, and a display controller connected to each of said plurality of protection controllers via a communication network, configured to display a status and control an operation of each of said plurality of protection controllers, said method steps comprising:

receiving a monitoring program module for monitoring a status of at least one of said plurality of protection controllers from at least one of said display controller and another at least one of said plurality of protection controllers via said communication network at at least one of said plurality of protection controllers;

executing a received monitoring program module; and
outputting an execution result as a knowledge of said monitoring program module at at least one of said plurality of protection controllers; and
sending said monitoring program module after addition thereto of said knowledge to at least one of said display controller and at least one of said plurality of protection controllers via said communication network, at at least one of said plurality of protection controllers.

33. A program storing medium readable by a computer, tangibly embodying a program of instructions executable by said computer to perform method steps for an electric power system protection and control system including a plurality of protection controllers, each configured to execute protection and control of an electric power system by inputting a status quantity of said electric power system and convert said status quantity into digital data, and a display controller connected to each of said plurality of protection controllers via a communication network and configured to display a status and control an operation of each of said plurality of protection controllers, said method steps comprising:
sending a setting program module for setting at least one of said plurality of protection controllers to at least one of said plurality protection controllers via said communication network; and
receiving, at said display controller, said setting program module after addition thereto of knowledge sent from at least one of said plurality of protection controllers.

34. A program storing medium readable by a computer, tangibly embodying a program of instructions executable by said computer to perform method steps for an electric power system protection and control system including a plurality of protection controllers, each configured to execute protection and control of an electric power system by inputting a status quantity of said electric power system and to convert said status quantity into digital data, and a display controller connected to each of said plurality of protection controllers via a communication network and configured to display a status and control an operation of each of said plurality of protection controllers, said method steps comprising:
receiving a setting program module for setting at least one of said plurality of protection controllers from at least one of said display controller and at least one of said plurality of protection controllers via said communication network at at least one of said plurality of protection controllers;
executing a received setting program module and to give an execution result as a knowledge of said setting program module at least one of said plurality of protection controllers; and
sending said setting program module after addition of said knowledge thereto to at least one of said display controller and at least one of said plurality of protection controllers via said communication network at at least one of said plurality of protection controllers.

35. A program storing medium readable by a computer, tangibly embodying a program of instructions executable by said computer to perform method steps for a distributed controls system including a plurality of distributed controllers, each configured to control an equipment to be controlled by inputting a status quantity of said equipment and to convert said status quantity into digital data, and a display controller connected to each of said plurality of distributed controllers via a communication network and configured to display a status and control an operation of each of said plurality of distributed controllers, said method steps comprising:
receiving a program module corresponding to contents for display control in said display controller from at least one of said display controller and at least one of said plurality of distributed controllers via said communication network at at least one of said plurality of distributed controllers,
said program module including computer-readable instructions that when executed by a processor implements at least one of
a setting mechanism configured to store a data value in a memory of at least one of said plurality of distribution controllers,
an analyzing mechanism configured to acquire an operational status parameter of at least one of said plurality of distribution controllers, and
a monitoring mechanism configured to acquire a status parameter from respective of at least one of said plurality of distribution controllers and compare said status parameter to a validity standard,
executing a received program module at at least one of said plurality of distributed controllers; and
transferring at least one of an execution result by said execution step and said program module stored in said plurality of distributed controllers to at least one of said display controller and at least one of said plurality of distributed controllers via said communication network at at least one of said plurality of distributed controllers.

36. A program storing medium readable by a computer, tangibly embodying a program of instructions executable by said computer to perform method steps for a distributed control system including a plurality of distributed controllers, each configured to control an equipment to be controlled by inputting a status quantity of said equipment and to convert said status quantity into digital data, and a display controller connected to each of said plurality of distributed controllers via a communication network and configured to display a status and control an operation of each of said plurality of distributed controllers, said medium storing a program comprising the step of:
sending a program module corresponding to contents for display control in said display controller to at least one of said plurality of distributed controllers via a communication network, at said display controller,
said program module including computer-readable instructions that when executed by a processor implements at least one of
a setting mechanism configured to store a data value in a memory of at least one of said plurality of distribution controllers,
an analyzing mechanism configured to acquire an operational status parameter of at least one of said plurality of distribution controllers, and
a monitoring mechanism configured to acquire a status parameter from respective of at least one of said plurality of distribution controllers and compare said status parameter to a validity standard.

37. A storing medium readable by a computer, tangibly embodying a program of instructions executable by said computer to perform method steps for a distributed control system including a plurality of distributed controllers, each configured to control an equipment to be controlled by inputting a status quantity of said equipment and to convert said status quantity into digital data, and a display controller connected to each of said plurality of distributed controllers via a communication network and configured to display a status and control an operation of each of said plurality of distributed controllers, said method steps comprising:

sending an operation analyzing program module for analyzing an operation of one of said plurality of distributed controllers to at least one of said plurality of distributed controllers via said communication network, at said display controller; and receiving at said display controller said operation analyzing program module after addition thereto of a knowledge sent from one of said plurality of distributed controllers.

38. A program storing medium readable by a computer, tangibly embodying a program of instructions executable by said computer to perform method steps for a distributed control system including a plurality of distributed controllers, each for controlling an equipment to be controlled by inputting a status quantity of said equipment and to convert said status quantity into digital data, and a display controller connected to each of said plurality of distributed controllers via a communication network and configured to display a status and control an operation of each of said plurality of distributed controllers, said method steps comprising:

receiving an operation analyzing program module for analyzing an operation of at least one of said plurality of distributed controllers from at least one of said display controller and at least one of said plurality of distributed controllers via said communication network at at least one of said plurality of distributed controllers;

executing a received operation analyzing program module; and outputting an execution result as a knowledge of said operation analyzing program module at at least one of said plurality of distributed controllers; and sending said operation analyzing program module after addition thereto of said knowledge to at least one of said display controller and at least one of said plurality of distributed controllers via said communication network at at least one of said plurality of distributed controllers.

39. A program storing medium readable by a computer, tangibly embodying a program of instructions executable by said computer to perform method steps for a distributed control system a plurality of distributed controllers, each configured to control an equipment to be controlled by inputting a status quantity of said equipment and to convert said status quantity into digital data, and a display controller connected to each of said plurality of distributed controllers via a communication network and configured to display a status and control an operation of each of said plurality of distributed controllers, said method steps comprising:

sending a monitoring program module for monitoring a status of at least one of said plurality of distributed controllers to at least one of said plurality of distributed controllers via said communication network, at said display controller, and receiving at said display controller said monitoring program module after addition thereto of a knowledge sent from at least one of said plurality of distributed controllers.

40. A program storing medium readable by a computer, tangibly embodying a program of instructions executable by said computer to perform method steps for a distributed control system including a plurality of distributed controllers, each configured to control an equipment to be controlled by inputting a status quantity of said equipment and to convert said status quantity into digital data, and a display controller connected to each of said plurality of distributed controllers via a communication network and configured to display a status and control an operation of each of said plurality of distributed controllers, said method steps comprising:

receiving a monitoring program module for monitoring a status of at least one of said plurality of distributed controllers from at least one of said display controller and at least one of said plurality of distributed controllers via said communication network at at least one of said plurality of distributed controllers;

executing said received monitoring program module;

outputting an execution result as a knowledge of said monitoring program module at at least one of said plurality of distributed controllers; and sending said monitoring program module after addition thereto of said knowledge to at least one of said display controller and [another] at least one of said plurality of distributed controllers via said communication network at at least one of said plurality of distributed controllers.

1. A program storing medium readable by a computer, tangibly embodying a program of instructions executable by said computer to perform method steps for a distributed control system including a plurality of distributed controllers, each configured to control an equipment to be controlled by inputting a status quantity of said equipment and to convert said status quantity into digital data, and a display controller connected to each of said plurality of distributed controllers via a communication network and configured to display a status and control an operation of each of said plurality of distributed controllers, said method steps comprising:

sending a setting program module for setting at least one of said plurality of distributed controllers to at least one of said plurality of distributed controllers via said communication network, respectively, and receiving said setting program module after addition thereto of a knowledge sent from at least one of said plurality of distributed controllers.

42. A program storing medium readable by a computer, tangibly embodying a program of instructions executable by said computer to perform method steps for a distributed control system including a plurality of distributed controllers, each configured to control an equipment to be controlled by inputting a status quantity of said equipment and to convert said status quantity into digital data, and a display controller connected to each of said plurality of distributed controllers via a communication network and configured to display a status and control an operation of each of said plurality of distributed controllers, said method steps comprising:

receiving step a setting program module for setting at least one of said plurality of distributed controllers from at least one of said display controller and at least one of said plurality of distributed controllers via said communication network at at least one of said plurality of distributed controllers;

executing a received setting program module;

outputting an execution result as a knowledge of said setting program module at at least one of said plurality of distributed controllers; and sending said setting program module after addition thereto of said knowledge to at least one of said display controller and at least one of said plurality of distributed controllers via said communication network at at least one of said plurality of distributed controllers.

* * * * *